United States Patent [19]
Shinoda et al.

[11] Patent Number: 6,064,640
[45] Date of Patent: May 16, 2000

[54] OPTICAL DISK APPARATUS AND MEDIUM CARRIER AND MEDIUM TURNTABLE FOR OPTICAL DISK APPARATUS

[75] Inventors: Takao Shinoda, Kawasaki; Shigeo Sekine, Inagi; Masahiko Kataoka, Kawasaki, all of Japan

[73] Assignee: Fujitsu Limited, Kawasaki, Japan

[21] Appl. No.: 08/710,166

[22] Filed: Sep. 12, 1996

[30] Foreign Application Priority Data

Dec. 15, 1995 [JP] Japan .................................. 7/327631

[51] Int. Cl.⁷ .................................................. G11B 33/02
[52] U.S. Cl. ........................................................ 369/75.2
[58] Field of Search .................................. 369/75.1–75.2, 369/77.1–77.2, 191–192, 178, 270–271, 291

[56] References Cited

U.S. PATENT DOCUMENTS

| | | | |
|---|---|---|---|
| 4,510,592 | 4/1985 | Kanamaru et al. | 369/270 |
| 4,541,086 | 9/1985 | Tanaka | 369/271 |
| 4,788,677 | 11/1988 | Ikedo et al. | 369/215 |
| 5,331,627 | 7/1994 | Childers et al. | 369/291 |
| 5,539,717 | 7/1996 | Choi | 369/75.2 |
| 5,572,498 | 11/1996 | Choi | 369/77.2 |
| 5,610,902 | 3/1997 | Childers et al. | 369/191 |
| 5,615,197 | 3/1997 | Choi | 369/77.2 |
| 5,724,332 | 3/1998 | Ogusu | 369/291 |
| 5,812,511 | 9/1998 | Kawamura et al. | 369/77.2 |

FOREIGN PATENT DOCUMENTS

| | | |
|---|---|---|
| 0518360 | 10/1985 | European Pat. Off. . |
| 0366118 | 5/1989 | European Pat. Off. . |
| 0 403 266 | 12/1990 | European Pat. Off. . |
| 0431966 | 6/1991 | European Pat. Off. . |
| 0518259 | 12/1992 | European Pat. Off. . |
| 0526204 | 2/1993 | European Pat. Off. . |
| 0623441 | 1/1995 | European Pat. Off. . |
| 697694 | 2/1996 | European Pat. Off. . |
| 61-283088 | 12/1986 | Japan . |
| 1315091 | 12/1989 | Japan . |
| 03185689 | 8/1991 | Japan . |
| 0536184 | 2/1993 | Japan . |
| 05274837 | 10/1993 | Japan . |
| 06223534 | 8/1994 | Japan . |
| 06295514 | 10/1994 | Japan . |
| 06309753 | 11/1994 | Japan . |
| 07201113 | 8/1995 | Japan . |

OTHER PUBLICATIONS

Japanese patent abstract of 62124666, published Jun. 5, 1987 to Iwao et al.
Japanese patent abstract of 04–362,561, published Dec. 15, 1992 entitled Disk Player.
Japanese patent abstract of 05–36,182, published Feb. 12, 1993 entitled Disk Player.
Japanese patent abstract of 05–334782, published Dec. 17, 1993 to Takegawa.
Japanese patent abstract of 06–275047, published Sep. 30, 1994 to Koizumi.
Japanese patent abstract of 06–275048, published Sep. 30, 1994 to Fujiwara et al.
IBM Technical Disclosure Bulletin, vol. 38, No.11, Nov. 1, 1995, pp. 339–340, XP000547380, "Bezel and Cartridge Interlocking Feature for a Tape Drive".

*Primary Examiner*—Allen T. Cao
*Attorney, Agent, or Firm*—Greer, Burns & Crain, Ltd.

[57] ABSTRACT

A CD is mounted in a CD carrier and is inserted and ejected to/from a recording and reproducing mechanism of an optical disk drive for commonly performing both of a reproduction of the CD and recording and reproduction of an MO cartridge. The CD carrier has a holder to enclose the CD and a CD turntable which is enclosed in a holder and mounts the CD to an upper portion and attaches a lower portion to a spindle motor of the recording and reproducing mechanism. The CD turntable has a first hub for attaching the CD to an upper portion of a disk on which the CD is mounted and a second hub for attaching a lower portion of the disk to a spindle motor of the recording and reproducing mechanism.

37 Claims, 46 Drawing Sheets

$D_5 = 4.004^{+0.012}_{0}$ mm $D_6 = 15.0^{0}_{-0.2}$ mm $h_1 = 1.2^{0}_{-0.2}$ mm $h_2 = 1.2^{0}_{-0.15}$ mm $h_3 \geqq 0.8$ mm $h_4 \geqq 0.15$ mm $D_9 \geqq 13.0$ mm $D_{10} \leqq 6.0$ mm $D_7 \geqq 21.0$ mm $D_8 \leqq 16.0$ mm

FIG. 19

| MEDIUM ID CONTENTS | PIN SWITCH | | |
|---|---|---|---|
| | 222 | 224 | 226 |
| MO CLEANING DISK | 1 | 0 | 0 |
| MO WRITE INHIBITION | 1 | 0 | 1 |
| MO WRITABLE | 1 | 1 | 0 |
| MO HIGH LUMINANCE SPECIFICATION | 1 | 1 | 1 |
| CD | 0 | 1 | 1 |
| NO MEDIUM | 0 | 0 | 0 |

FIG. 36

| MODE | CODE | SPEED CONTROL | ROTATIONAL SPEED | MEDIUM |
|---|---|---|---|---|
| 1 | 111 | CAV | N1 | 90mm-MO |
| 2 | 110 | CAV | N2 | 90mm-MO |
| 3 | 101 | CAV | N3 | 90mm-MO |
| 4 | 100 | CAV | N4 | 120mm-CD |
| 5 | 011 | CLV | 6-TIMES SPEED | 120mm-CD |
| 6 | 010 | CLV | 4-TIMES SPEED | 120mm-CD |
| 7 | 001 | CLV | NORMAL | 120mm-CD |
| 8 | 000 | CLV | NORMAL | 80mm-CD |

FIG. 37

| MODE | CODE | FREQUENCY DIVIDING RATIO | FILTER CONSTANT | GAIN |
|---|---|---|---|---|
| 1 | 111 | DV1 | Fc1 | G1 |
| 2 | 110 | DV2 | Fc2 | G2 |
| 3 | 101 | DV3 | Fc3 | G3 |
| 4 | 100 | DV4 | Fc4 | G4 |

FIG. 38

| MODE | CODE | TIMES-SPEED DESIGNATION | FILTER CONSTANT | GAIN |
|---|---|---|---|---|
| 5 | 011 | 6-TIMES SPEED | Fc5 | G5 |
| 6 | 010 | 4-TIMES SPEED | Fc6 | G6 |
| 7 | 001 | NORMAL | Fc7 | G7 |
| 8 | 000 | NORMAL | Fc8 | G8 |

OPTICAL DISK APPARATUS AND MEDIUM CARRIER AND MEDIUM TURNTABLE FOR OPTICAL DISK APPARATUS

BACKGROUND OF THE INVENTION

The invention relates to an optical disk apparatus for enabling both of an exposed media such as a CD-ROM or the like and a cartridge enclosed media such as an optical disk cartridge with a hub or the like to be used by one drive. More particularly, the invention relates to an optical disk apparatus in which a cartridge enclosed medium is loaded as it is and an exposed medium is installed to a carrier and is loaded and also relates to a medium carrier and a medium turntable for the optical disk apparatus.

A compact disc (CD) starting from an audio-use has been remarkably developed about ten years and can presently be regarded as a primary multimedia component. Particularly, in recent years, a personal computer having therein a compact disc read only memory (hereinafter, simply referred to as a "CD-ROM") has rapidly spread. It is regarded that the position of a CD player for reproducing a CD-ROM has been established as a third file device subsequent to a floppy disk drive (FDD) and a hard disk drive (HDD). On the other hand, a rewritable type optical disk apparatus using a magneto-optical disk enclosed in a cartridge is also gradually spread by using advantages such that it has a large capacity and it is removable. The use of such a rewritable optical disk apparatus is also being progressed as a file device using a magneto-optical disk cartridge (MO cartridge) of 5 or 3.5 inches with a motor hub according to the ISO.

In a device using such a conventional optical disk media, however, an exclusive-use drive exists for every kind of the optical disk media such as CD-ROM or MO cartridge. Therefore, when the user wants to use both the CD-ROM and the MO cartridge, a CD player and an MO drive have to be separately prepared. Particularly, in recent years, in many cases, the CD player or MO drive is built in the apparatus main body as a peripheral device of a personal computer. In such a case, it is difficult in terms of the space to build two devices and there is an inconvenience such that only either one of the two devices can be built in the apparatus main body. Toward a full-scale multimedia age, with respect to the CD player, it is not limited to a function as a simple reproducing apparatus of the CD-ROM but a necessity of a rewriting function which has already been realized in the MO drive is strongly demanded. With regard to the MO drive, on the other hand, it is not limited to the use as a simple file device but it is strongly demanded that the MO drive can cope with a CD-ROM, a video CD, and the like which are provided as a part of the multimedia.

Particularly, when considering the MO drive, it is an indispensable condition to make it possible to fetch CD resources provided in the field of a personal computer which is rapidly being spread. In the CD player, in addition to a conventional CD-DA for music and a CD-ROM for reproducing dictionary data, an image data program, and the like, the edition and storage of a large capacity of data using those media simultaneously become the necessary conditions. On the other hand, the MO drive using the readable, writable, and further removable MO cartridge having a large capacity according to the ISO is also a device that is indispensable for processes of a large amount of data which is provided by the CD-ROM or the like.

SUMMARY OF THE INVENTION

According to the invention, by paying attention to not only a point that each of a CD player and an MO drive uses a laser diode for an optical system but also a point that there are many similarities in a pickup, a servo control system, and the like, there is provided an optical disk apparatus of the CD/MO common use type in which functions of both of them, particularly, functions regarding a mechanism structure are made common and both a CD as an exposed medium and an MO cartridge as a cartridge enclosed medium can be used by one apparatus.

According to the invention, a medium carrier and a medium turntable which are used in the optical disk apparatus of the invention are provided.

According to the invention, there is provided an optical disk apparatus having a common processing mechanism for commonly performing both a process of a cartridge enclosed medium and a process of an exposed medium which is not enclosed in a cartridge, and a carrier for loading the exposed medium and for inserting and ejecting the medium to/from the common processing mechanism is provided. The cartridge enclosed medium is, for example, a medium with a hub and the exposed medium is a non-hub medium having no hub. For example, a compact disc (hereinafter, simply referred to as a "CD") is used as a non-hub exposed medium. An optical disk cartridge (hereinafter, simply referred to as an "MO cartridge") is used as a cartridge enclosed medium with a hub. Therefore, the common processing mechanism operates as a CD player when the CD is loaded and operates as an optical disk drive when the MO cartridge is loaded.

With respect to such an optical disk apparatus, the invention is characterized in that a CD is mounted to a CD carrier (medium carrier) and is inserted and ejected. By using the CD carrier, the CD can be inserted and ejected into/from an inserting/ejecting port of an optical disk drive in a manner similar to the MO cartridge without directly touching the CD with the hand. The CD carrier has: a holder for enclosing and protecting the CD; and a CD turntable which is enclosed in the holder and sets the CD to the upper portion and installs the lower portion to a spindle motor of a recording and reproducing mechanism. The CD turntable has: a first hub for setting the CD to the upper portion of a disk for mounting the CD; and a second hub for setting the lower portion of the disc mounted disk to the spindle motor (rotation driving unit) of the recording and reproducing mechanism. The first hub of the CD turntable has a shaft portion for fitting an attaching hole of the CD. Latch balls which are buried at a plurality of portions around the shaft portion through springs so as to freely appear and disappear are arranged so as to be partially exposed. The CD set to the first hub is sandwiched between the latch balls and the disk, thereby fixing the CD upon the shaft. The disk of the CD turntable has a nonslip structure on the mounting surface of the CD, thereby preventing a slip of the CD when it is rotated by the spindle motor. The second hub on the spindle motor side of the CD turntable has an attaching hole of the rotary shaft of the spindle motor. A magnet hub on the spindle motor side and a magnetic hub member for adsorption are provided around the attaching hole. The second hub has the same structure and dimensions as those of the hub of the magneto-optical disk enclosed in the MO cartridge. Therefore, when using the MO cartridge according to the ISO, the second hub of the CD turntable has the same structure and dimensions as those of the hub according to the ISO. The holder of the CD carrier has: an opening window for exposing a disk seeking region to the lower portion in the mounting state of the CD; one or a plurality of positioning holes formed at the same positions as the positioning holes of the MO cartridge; one or a plurality of detecting holes which are formed at the same positions as those of the MO cartridge and indicate medium information; and a turntable enclosing unit for vertically exposing the CD turntable and rotatably enclosing it. In the holder of the CD carrier, a guide spring portion which is elastically comes into contact with the guide surface of the upper portion at the time of the insertion and ejection to/from the recording and reproducing mechanism, thereby holding the position and positioning is arranged so as to be projected to the upper portion of the holder. Further, the holder has a reverse insertion preventing pin to prevent that the CD carrier from being reversely inserted. As an MO cartridge, for example, an MO cartridge of 3.5 inches according to the ISO is used. As a CD, a CD-ROM having a diameter of 120 mm or a CD-DA having a diameter of 120 mm is used. A CD-DA having a diameter of 80 mm can be also used. Further, a digital versatile disc (DVD) can be also used as a CD.

According to the invention, the CD carrier (medium carrier) itself which is used for insertion and ejection for the apparatus of the CD is provided. A fundamental structure of the CD carrier can be widely used for the CD/MO common use apparatus using the MO drive as a base. The invention is not limited to the CD but can be also widely used as an adapter for attaching the non-hub medium to a rotation driving mechanism of the apparatus.

Further, according to the invention, the CD turntable, which is (medium turntable) itself attached to the CD carrier, is provided. When the CD is attached to the spindle motor which can set the MO cartridge, the structure of the CD turntable of the invention is suitable. The invention can be obviously applied to the case where the CD turntable is attached to an arbitrary CD carrier having a structure adapted to the apparatus and is used. The sole CD turntable can be also directly attached to the CD and can be used by the MO drive. The CD turntable is provided as a part which is certainly necessary for a common apparatus of the MO cartridge and the CD. The CD turntable is not limited to the medium turntable for CD but can be also widely used as an adapter to attach and detach the non-hub medium to/from the rotation driving portion such as a spindle motor or the like of the apparatus.

The above and other objects, features, and advantages of the present invention will become more apparent from the following detailed description with reference to the drawings.

BRIEF DESCRIPTION OF THE DRAWINGS

FIG. 19 is a correspondence diagram of a detection signal of the pin switch in FIG. 10 and an identified medium;

FIG. 36 is an explanatory diagram of mode information for designating the CAV/CLV switching and a speed switching in accordance with the kind of medium according to the invention;

FIG. 37 is an explanatory diagram of a frequency dividing ratio, a filter constant, and a gain which are used in the CAV control;

FIG. 38 is an explanatory diagram of a times-speed designation, a filter constant, and a gain which are used in the CLV control;

DETAILED DESCRIPTION OF THE PREFERRED EMBODIMENT

[Construction of apparatus]

Figure 1:
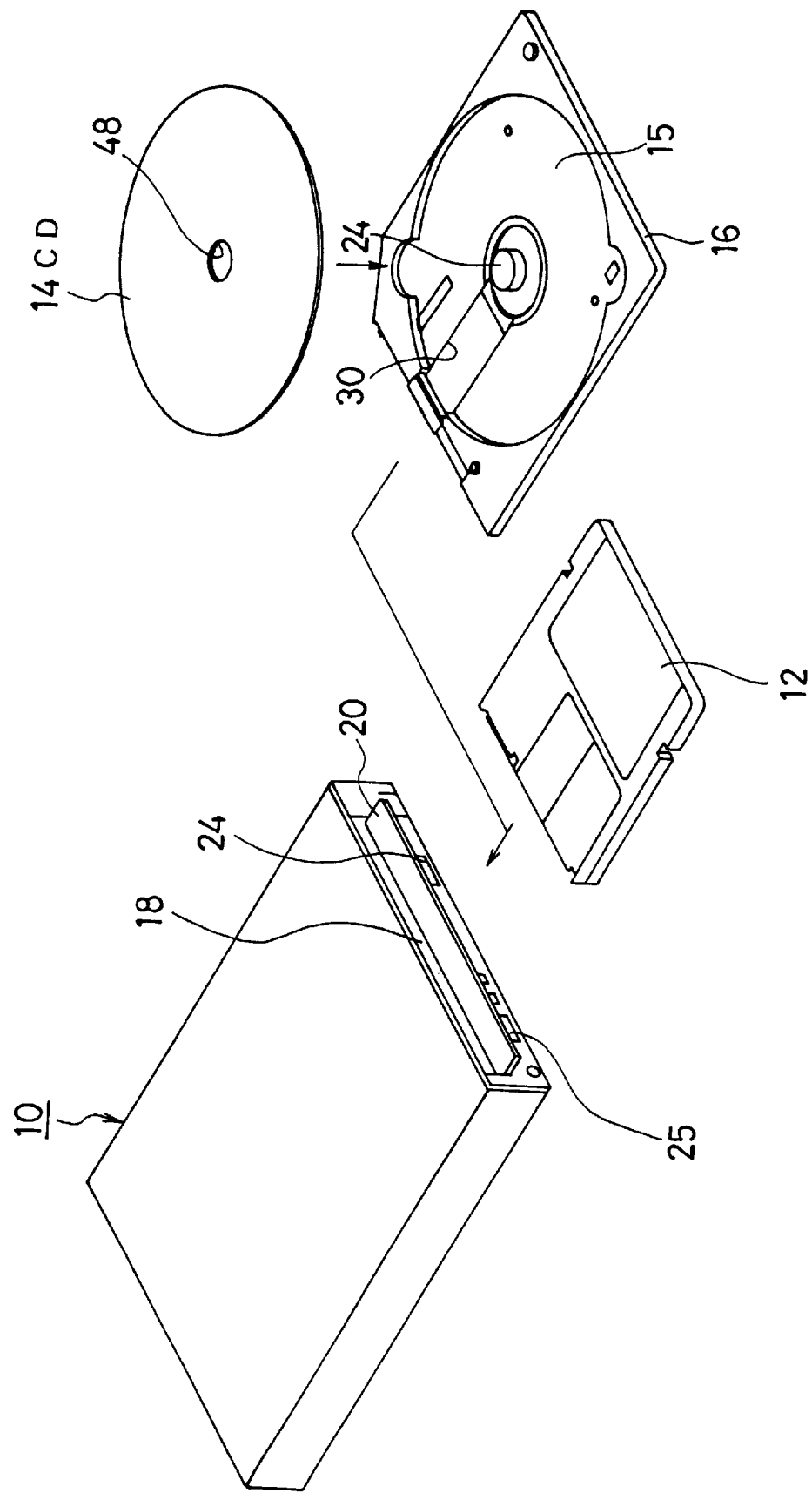
FIG. 1 is an explanatory diagram of a construction of an apparatus of the invention.

FIG. 1 is an explanatory diagram of an optical disk apparatus of the invention. The optical disk apparatus of the invention has an optical disk drive 10 serving as an apparatus main body and can use either one of a magneto-optical disk cartridge (hereinafter, simply referred to as an "MO cartridge") 12 and a compact disc (hereinafter, simply referred to as a "CD") 14 as a medium by the optical disk drive 10. The optical disk drive 10 has a size of, for example, a height of 25.4 mm, a width of 146 mm, and a depth of 190 mm. For example, a rewritable cartridge according to the ISO can be used as an MO cartridge 12 and any one of capacities of 128 MB, 230 MB, 540 MB, 640 MB, and the like can be used. As a cartridge other than those, a cartridge of 230 MB, 540 MB, 640 MB, or the like of a 3.5-inch MSR cartridge (1 GB) or a 3.5-inch MO overwrite cartridge (which will conform with the ISO) can be used. For example, as an MO cartridge 12, there is used a cartridge according to "90 mm rewritable and read-only type optical disk cartridge" of JIS X 6272 (settled on Sep. 1, 1992) according to ISO/IEC 10090 (Information technology—90 mm optical disk cartridges, rewritable and read only, for data interchange issued 1990). As a CD 14, a CD-ROM (model 1, 2) of 120 mm, a CD-DA of 120 mm, and a photo CD of 120 mm (single session and multi-session) can be used. Further, a CD-DA of 80 mm can be also reproduced. In the future, a DVD (digital versatile disk in which the united standard was determined on Dec. 8, 1995) as a video disk of the next generation of digital motion picture can be also used. For example, a disk according to "Compact disc read only memory system description" (May, 1985, Sony Corporation and N.V. Philips Co., Ltd.) published as an internal reference of Sony Corporation and Philips Co., Ltd. is used.

Figure 9:
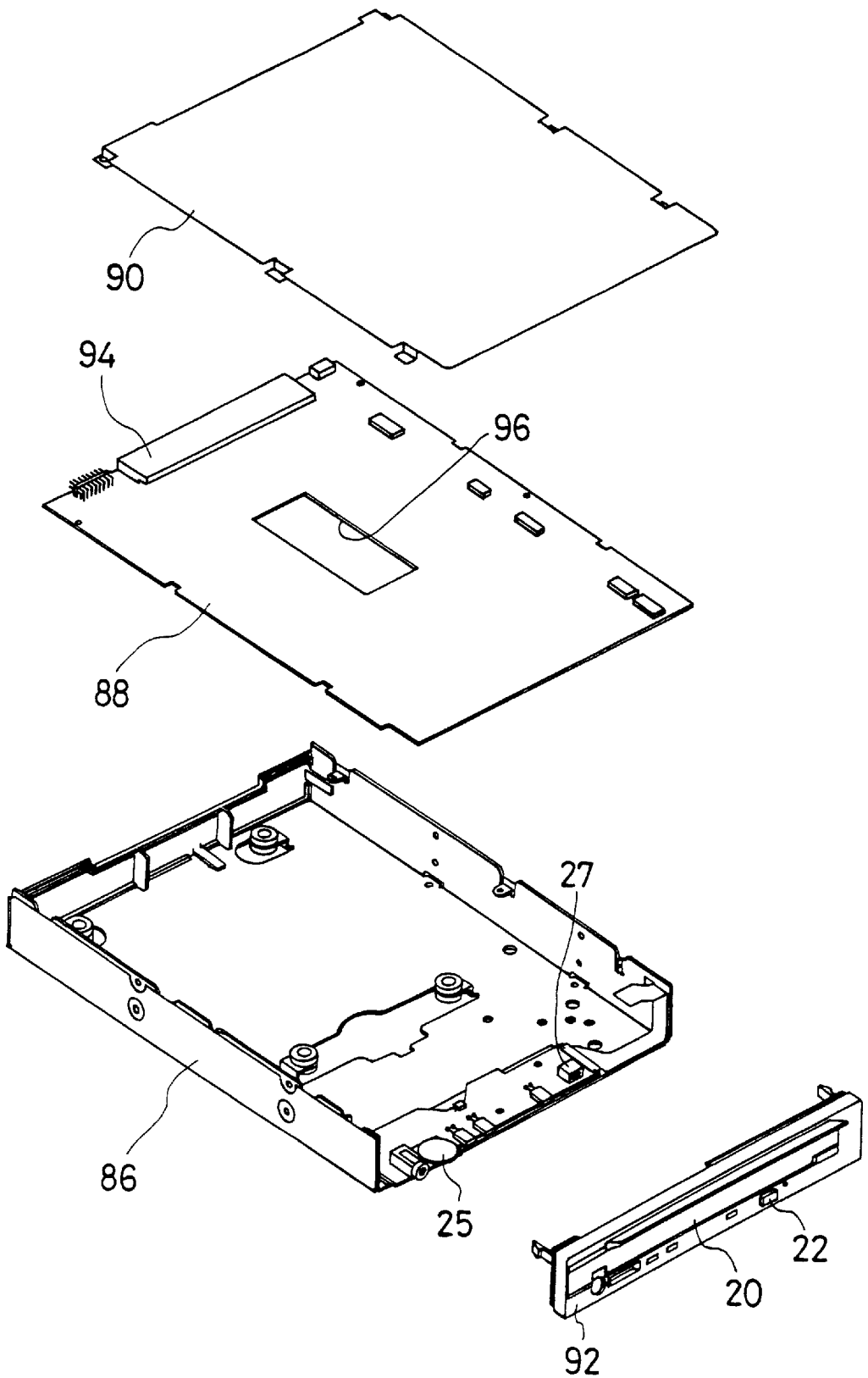
FIG. 9 is an assembly exploded diagram of a casing of the apparatus.

A door 20 which is rotatable around a lower portion as a rotational center is provided in the front side of the optical disk drive 10. By opening the door 20, an inserting/ejecting port 18 is opened. As shown in FIG. 9, an ejection switch knob 22, a volume dial 25 for adjusting a sound volume upon reproduction of the CD 14, and further a necessary indicator are provided for the front panel portion of the optical disk drive 10. The MO cartridge 12 can be inserted as it is into the optical disk drive 10 and can record and reproduce. On the other hand, the CD 14 is mounted to a CD carrier 16 and is inserted into the optical disk drive 10. The CD carrier 16 is a holder member which is opened to the upper portion. The CD carrier 16 rotatably has the CD turntable 24 at the center of a CD enclosing unit 15 having a circular concave portion. The CD 14 is mounted onto the CD turntable 24 so that an attaching hole 48 of the CD 14 is fitted to the CD turntable 24. A rectangular opening portion 30 corresponding to a seeking region of the CD 14 is opened at a predetermined position of the CD enclosing unit 15, thereby exposing a medium surface on the lower side of the CD 14.

Figure 2:
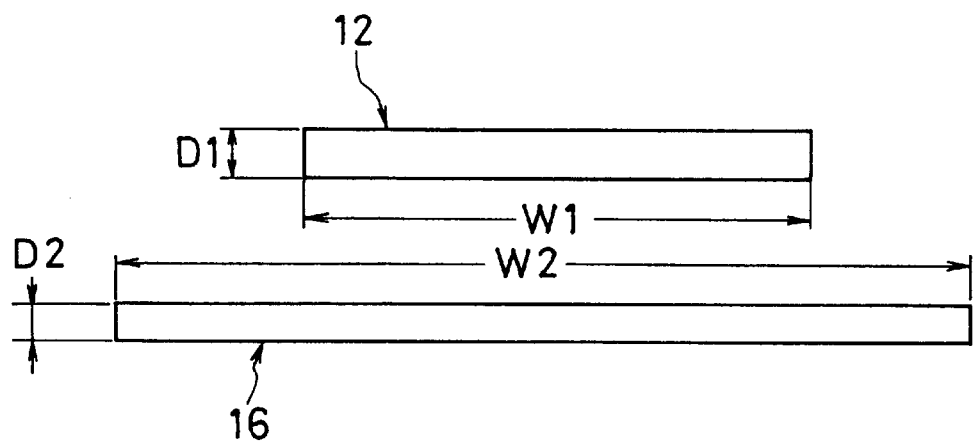
FIG. 2 is an explanatory diagram of the relation of the dimensions between an MO cartridge and a CD carrier.

FIG. 2 shows a comparison of edge surfaces on the inserting side of the CD carrier 16 for mounting the MO cartridge 12 and CD 14 in FIG. 1 for the optical disk drive 10. The MO cartridge 12 has standard dimensions based on the ISO of a thickness D1 (=6.0±0.2 mm) and a lateral width W1 (=90.0 mm) (tolerance lies within a range from 0 to −0.4 mm). On the other hand, the CD carrier 16 has a thickness D2 and a lateral width W2 in correspondence to the CD 14 having a diameter of 120 mm. There is the following dimensional relation of $$D1 > D2$$

between the thickness D1 of the MO cartridge 12 and the thickness D2 of the CD carrier 16. For example, the MO cartridge 12 has the thickness D1 (=6 mm) according to the ISO. On the other hand, a thickness of CD 14 which is mounted onto the CD carrier 16 is set to 1.2 mm on the basis of the united standard of Sony and Philips and D2 is set to 4.5 mm as a thickness such that the CD can be sufficiently enclosed in the CD carrier 16. Therefore, a dimensional difference of about 1 mm in the thickness direction exists between the thickness D1 of the MO cartridge 12 and the thickness D2 of the CD carrier 16.

Figure 3:
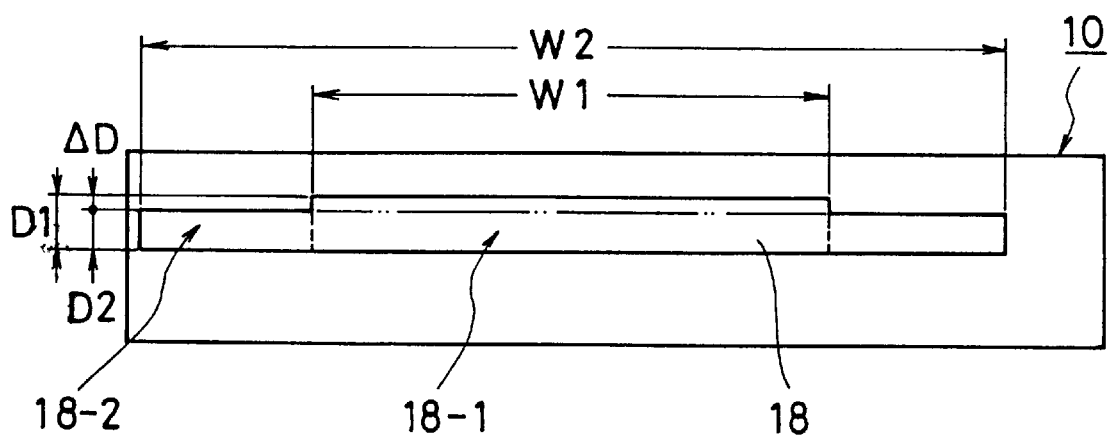
FIG. 3 is an explanatory diagram of a shape of an opening in an inserting/ejecting port of the invention.

As shown in FIG. 1, the MO cartridge 12 and CD carrier 16 (on which the CD 14 is mounted) whose sizes are different are inserted and ejected to/from the optical disk drive 10 of the invention by using the same inserting/ejecting port 18. Therefore, an opening portion of the inserting/ejecting port 18 has a shape, a position, and a dimensional relation as shown in FIG. 3. In FIG. 3, the inserting/ejecting port 18 of the optical disk drive 10 has an opening portion 18-2 for CD of the thickness D2 and lateral width W2 corresponding to the CD carrier 16 in FIG. 2. An opening portion 18-1 for MO having the thickness D1 and lateral width W1 of the MO cartridge 12 in FIG. 2 is overlappingly formed while making a center position coincide with the center in the lateral width direction of the opening portion 18-2 for CD. Thus, an effective opening portion of the inserting/ejecting port 18 for the MO cartridge 12 and CD carrier 16 has a stairway opening shape such that an upper portion has the lateral width W1, a lower portion has the lateral width W2, and a shape in the thickness direction is dented with the lateral width W1 by only a thickness of ΔD (=D1−D2) from the upper side and is widened to the lateral width W2 with the thickness D2 after that. In the actual apparatus, a rectangular opening portion having a height of the thickness D1 of the MO cartridge 12 and the lateral width W2 of the CD carrier 16 is provided.

With respect to such a rectangular opening portion, a guide member to form the opening portion 18-1 for MO which is dented with the lateral width W1 at the center by only ΔD is provided. By forming such an opening shape of the inserting/ejecting port 18 in FIG. 3 adapted to the thickness and lateral width in the inserting direction of the MO cartridge 12 and CD carrier 16, both of the MO cartridge 12 and the CD carrier 16 on which the CD 14 is mounted can be inserted and ejected to/from the inserting/ejecting port 18. At the same time, the MO cartridge 12 and CD carrier 16 can be unconditionally positioned at the inserting/ejecting port 18, respectively.

[CD carrier]

Figure 4:
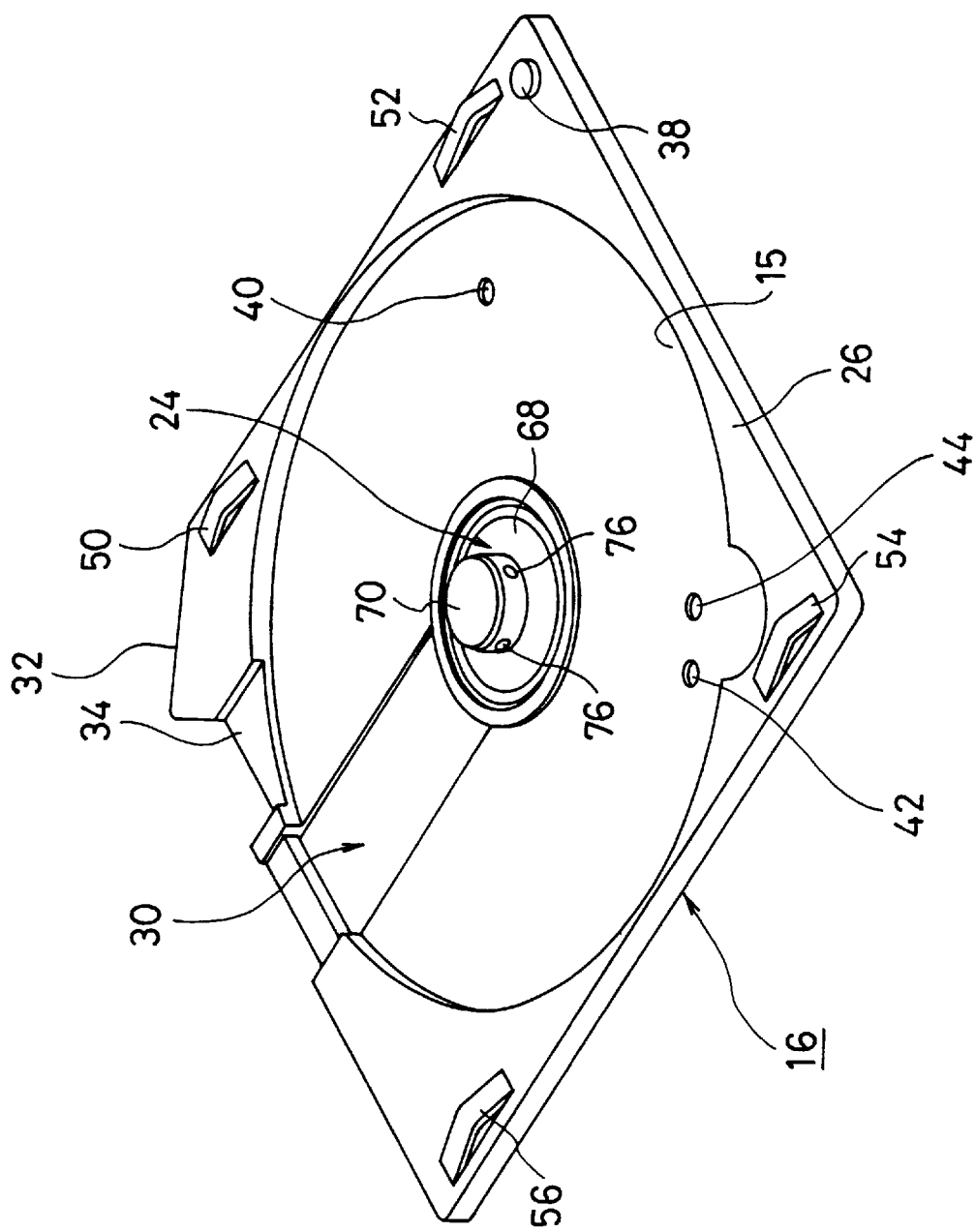
FIG. 4 is an explanatory diagram of the front side of the CD carrier of the invention.
Figure 5:
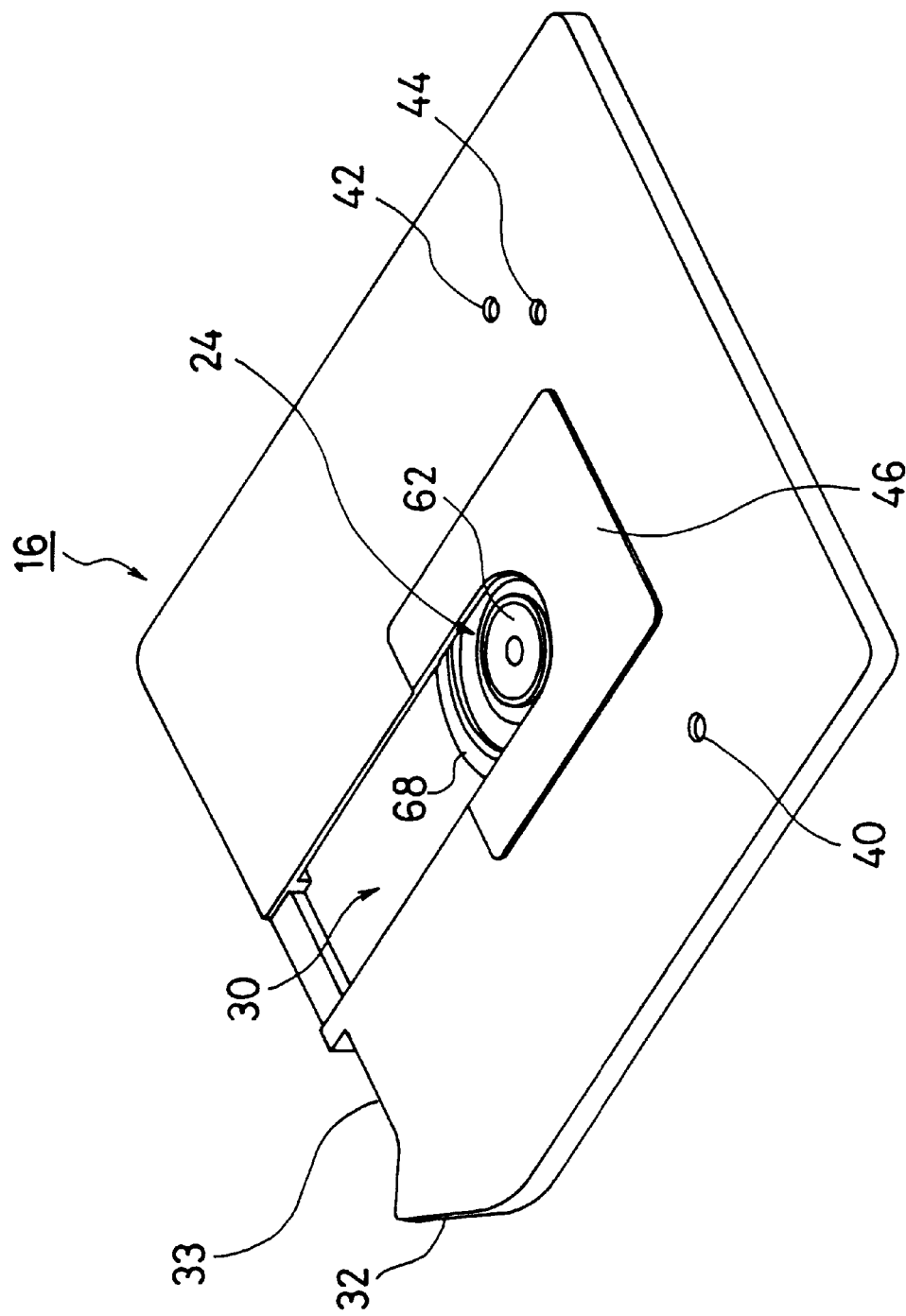
FIG. 5 is an explanatory diagram of the back side of the CD carrier of the invention.

FIG. 4 shows the CD carrier which is used in the invention. FIG. 5 shows the back side thereof. In FIGS. 4 and 5, in the CD carrier 16, a rectangular holder 26 formed by an injection molding of plastics is used as a main body and the CD enclosing unit 15 having a circular concave portion adapted to enclose the CD 14 is formed in the upper portion of the holder 26. The CD turntable 24 is rotatably enclosed at the center of the CD enclosing unit 15. An opening portion 30 is formed in the bottom surface on the inserting side of the CD enclosing unit 15, thereby exposing the recording surface of the CD 14 mounted to the CD turntable 24 to the lower side. In a state in which the CD carrier 16 is loaded to the optical disk drive 10 in FIG. 1, a pickup mechanism is located at the lower position which faces the opening portion 30. Guide spring portions 50, 52, 54, and 56 are projected at four upper corners of the holder 26 surrounding the CD enclosing unit 15. The guide spring portions 50, 52, 54, and 56 prevent shaking, floating, curving, or the like of the holder 26 when the CD carrier 16 is inserted to the optical disk drive 10 in FIG. 1 and enable the movement for loading or ejecting with the posture and position held in the optical disk drive 10. A taper guide portion 32 is provided for the right corner portion on the inserting side of the holder 26. The taper guide portion 32 forms a roller pull-in surface to pull in such that a loading roller of a loading mechanism first comes into contact with the taper guide portion 32 when the CD carrier 16 is inserted into the optical disk drive 10 and pulls in the CD carrier 16. An arm escaping groove 34 is formed on the left side of the taper guide portion 32. A function of the arm escaping groove 34 will be clarified in the description of the loading mechanism, which will be obviously explained hereinlater. A reverse insertion preventing pin 38 is projected and formed at one position of the corner portions on the inserting side and ejecting side of the holder 26. The reverse insertion preventing pin 38 prevents the CD carrier 16 from being inserted into the optical disk drive in a state in which the front and rear sides are reversed. At the time of the normal insertion, by pushing out the loading roller and moving to the outside by the oblique surface of the taper guide portion 32, the CD carrier 16 is loaded. However, at the time of the reverse insertion, since the CD carrier 16 collides with the loading roller by the corner portion of the left opposite surface of the taper guide portion 32, the loading cannot be performed, thereby preventing the reverse insertion. Positioning holes 40 and 42 and a carrier detecting hole (medium detecting hole) 44 are formed in the CD enclosing unit 15 of the holder 26. The positioning holes 40 and 42 are formed at the same positions and in the same shapes as those of the positioning holes formed similarly in the MO cartridge 12 when the rotational center of the MO cartridge 12 in FIG. 1 is positioned to a rotational center which is determined by the CD turntable 24. The carrier detecting hole 44 is a detecting hole that is peculiar to the CD carrier 16.

Therefore, the optical disk drive 10 side can identify whether the inserted medium is the MO cartridge 12 or the CD carrier 16 on which the CD 14 is mounted on the basis of the presence or absence of the carrier detecting hole 44. Namely, it will be understood that when the carrier detecting hole 44 can be detected, the inserted medium is the CD 14, and when the carrier detecting hole 44 cannot be detected, the inserted medium is the MO cartridge 12. Further, the rewritable MO cartridge has a slide knob to select the inhibition and permission of the rewriting operation. However, since the CD 14 is a read only disc, no hole is formed in the portion corresponding to the opening portion to decide the presence or absence of the permission of the writing operation in order to inhibit the rewriting operation. The CD turntable 24 arranged at the center of the CD enclosing unit 15 of the holder 26 integratedly has a CD side hub 70 in the upper portion of a disk 68 with a flange and also has latch balls 76 at three peripheral positions of the CD side hub 70. On the back side of the CD turntable 24, as shown in FIG. 5, a spindle side hub 62 is integratedly provided at the center of the disk 68 with the flange. As a spindle side hub 62, the same hub as the hub used in the magneto-optical disk enclosed in the MO cartridge 12 is used.

Figure 6:
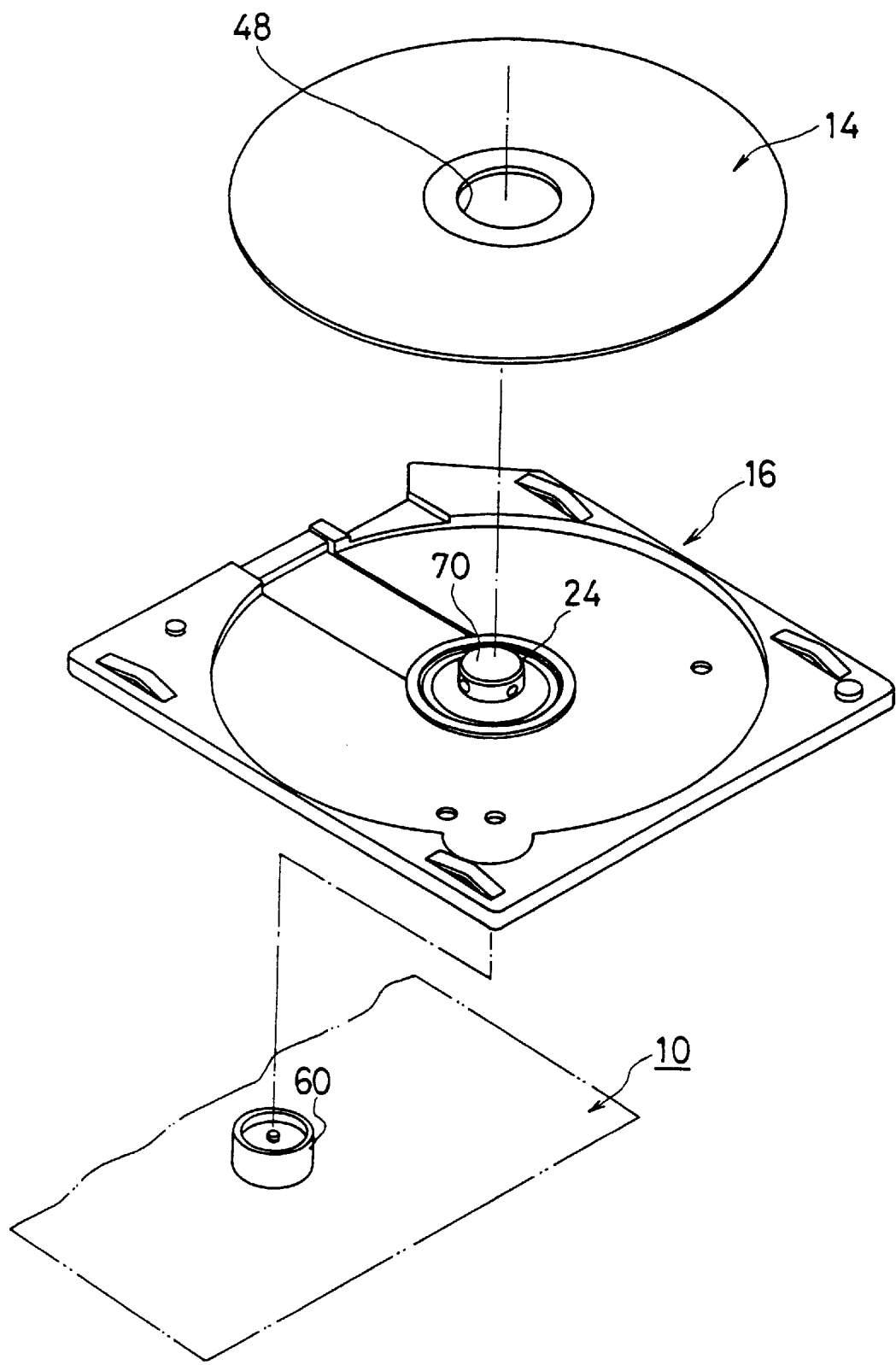
FIG. 6 is a diagram for explaining the correspondence among a CD, the CD carrier, and a spindle motor.

FIG. 6 shows a state in which the CD 14 is attached to the CD carrier 16 and also shows a coupling relation upon loading to a spindle motor 60 built in the optical disk drive 10. The CD 14 has the attaching hole 48 at the center and the attaching hole 48 is fitted to the CD side hub 70 of the CD turntable 24 provided at the center of the CD carrier 16. As mentioned above, when the CD carrier 16 is inserted into the optical disk drive 10 in an attaching state of the CD 14, the CD carrier 16 is automatically loaded to the spindle motor 60. When the CD carrier 16 is moved to the loading position corresponding to the rotational center of the spindle motor 60, the spindle motor 60 side is lifted up, thereby coupling with the spindle side hub 62 on the back side in FIG. 5 of the CD turntable 24 by a magnetic force of a magnet.

Figure 7A:
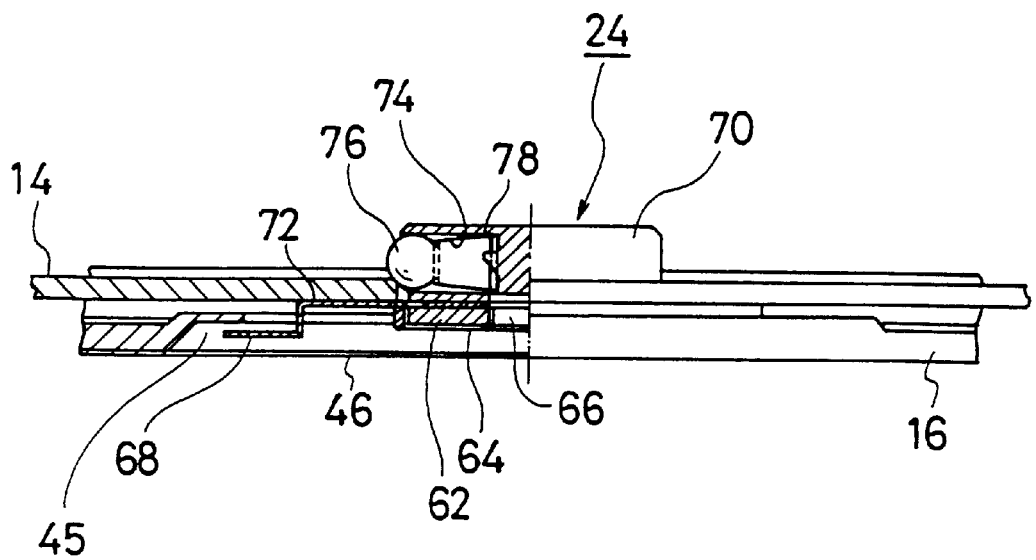
FIGS. 7A and 7B are explanatory diagrams of a CD turntable enclosed in the CD carrier.

FIG. 7A shows an enclosing state of the CD turntable 24 to the center of the holder 26 of the CD carrier 16 in which the CD 14 is mounted. The CD turntable 24 has the CD side hub 70 in the upper portion of the disk 68 with flange in which the flange is formed by the dented portion of the outer periphery. Enclosing holes 74 are opened at three positions of the side surface of the CD side hub 70 and only one enclosing hole 74 is shown as a representative. A latch ball 76 is enclosed in the enclosing hole 74 through a spring 78. The opening portion of the enclosing hole 74 is formed smaller than a diameter of latch ball 76, thereby enabling the latch ball 76 to be held in a state in which a front edge is removed. By depressing the attaching hole 48 of the CD 14 from the upper portion to the CD side hub 70 as mentioned above, the latch ball 76 is moved backward into the enclosing hole 74 against a force of the spring 78, so that the CD 14 comes into contact with a table surface 72 of the upper portion of the disk 68 with the flange shown in the diagram and is fixedly attached in a state in which the upper edge of the opening portion of the attaching hole is pressed by the latch ball 76. The table surface 72 of the disk 68 with the flange on which the CD 14 is mounted is coated with a rubber or the like in order to prevent slipping of the CD. A thickness of such a coating layer is extremely thin on the micron order. The coating layer prevents slipping of the CD 14 mounted on the disk 68 with the flange without losing surface precision of the table surface 72, thereby preventing deviation of the CD 14 due to the rotation of the CD turntable 24. The spindle side hub 62 is provided in the lower portion of the disk 68 with the flange provided for the CD turntable 24. A shaft inserting hole 66 to insert the rotary shaft of the spindle motor is formed at the center of the spindle side hub 62. A magnetic plate 64 using an iron plate is provided around the periphery of the hole 66. The spindle side hub 62 has the same structure, shape, and dimensions as those of the hub attached to the magneto-optical disk enclosed in the MO cartridge 12 in FIG. 1. A turntable enclosing unit 45 is formed in the center portion of the CD carrier 16 by a holding plate 46 attached to the lower side. The dented flange portion of the disk 68 with the flange is located in the vertical closed portion of the turntable enclosing unit 45, thereby preventing the CD turntable 24 from being dropped from the CD carrier 16.

Figure 7B:
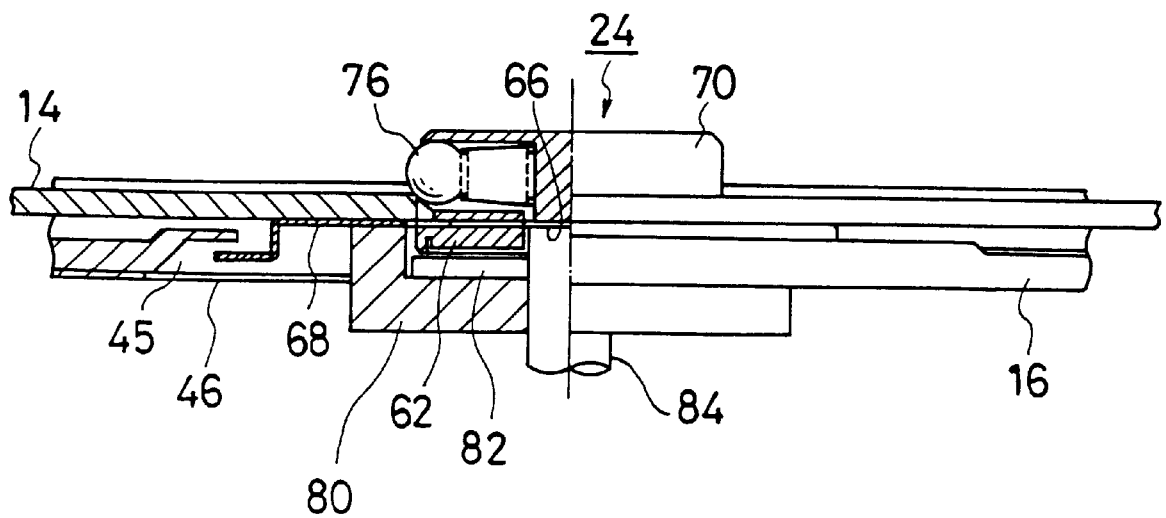

FIG. 7B shows a state in which the CD carrier 16 is loaded to the spindle motor. In the loading state, a motor rotary shaft 84 of the spindle motor is fitted into the shaft inserting hole 66 of the spindle side hub 62 of the CD turntable 24. A motor hub 80 is fixed to the motor rotary shaft 84. A magnet 82 is attached to the inner upper surface of the motor hub 80. By arranging the magnet 82 in close vicinity with the magnetic plate 64 of the spindle side hub 62, the CD turntable 24 and motor hub 80 are magnetically coupled, so that the CD 14 attached to the CD turntable 24 can be rotated in association with the rotation of the motor rotary shaft 84. In the loading state, the disk 68 with the flange of the CD turntable 24 is located in the turntable enclosing unit 45 in a floating state and can be rotated without coming into contact with the CD carrier 16 side.

Figures 8A, 8B, 8C, 8D:
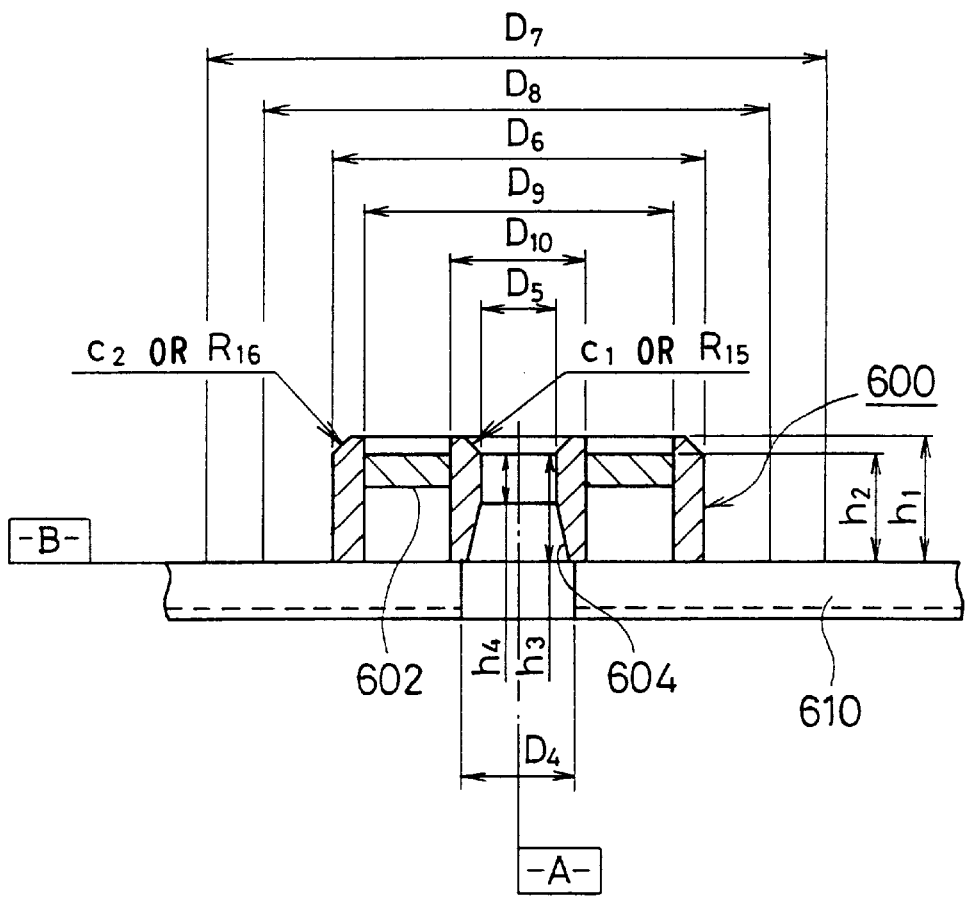
FIGS. 8A to 8D are explanatory diagrams of hub dimensions of the ISO with which a hub of the CD turntable conforms.

FIGS. 8A to 8D show dimensions of the hub of ISO/IEC 10090 (JIS X 6272$^{-1992}$) with which the spindle side hub 62 provided for the CD turntable 24 in FIGS. 7A and 7B conform. A magnetic material 602 is arranged around a center hole 604 and a hub 600 in FIG. 8A is arranged on one side of a disk 610. A diameter D5 of the center hole 604 of the hub 600, an outer diameter D6, a height h1 from the disk surface, a position h2 of the magnetic surface from the disk surface, a height h3 from a reference surface P to the upper portion of the center hole 604, and a height h4 of the center hole 604 are as shown in FIG. 8B. A chamfer c1 of 45° and 0.2±0.1 mm is formed at the inner corner of the center hole 604 or such a corner is set to a curvature of a radius R16 (=0.4+0.1 mm). An outer diameter D9 and an inner diameter D10 of the magnetic material 602 to clamp the disk 610 are as shown in FIG. 8C. Further, an outer diameter D7 and an inner diameter D8 of a clamping zone are as shown in FIG. 8D.

[Mechanism structure of the main body]

Figure 10:
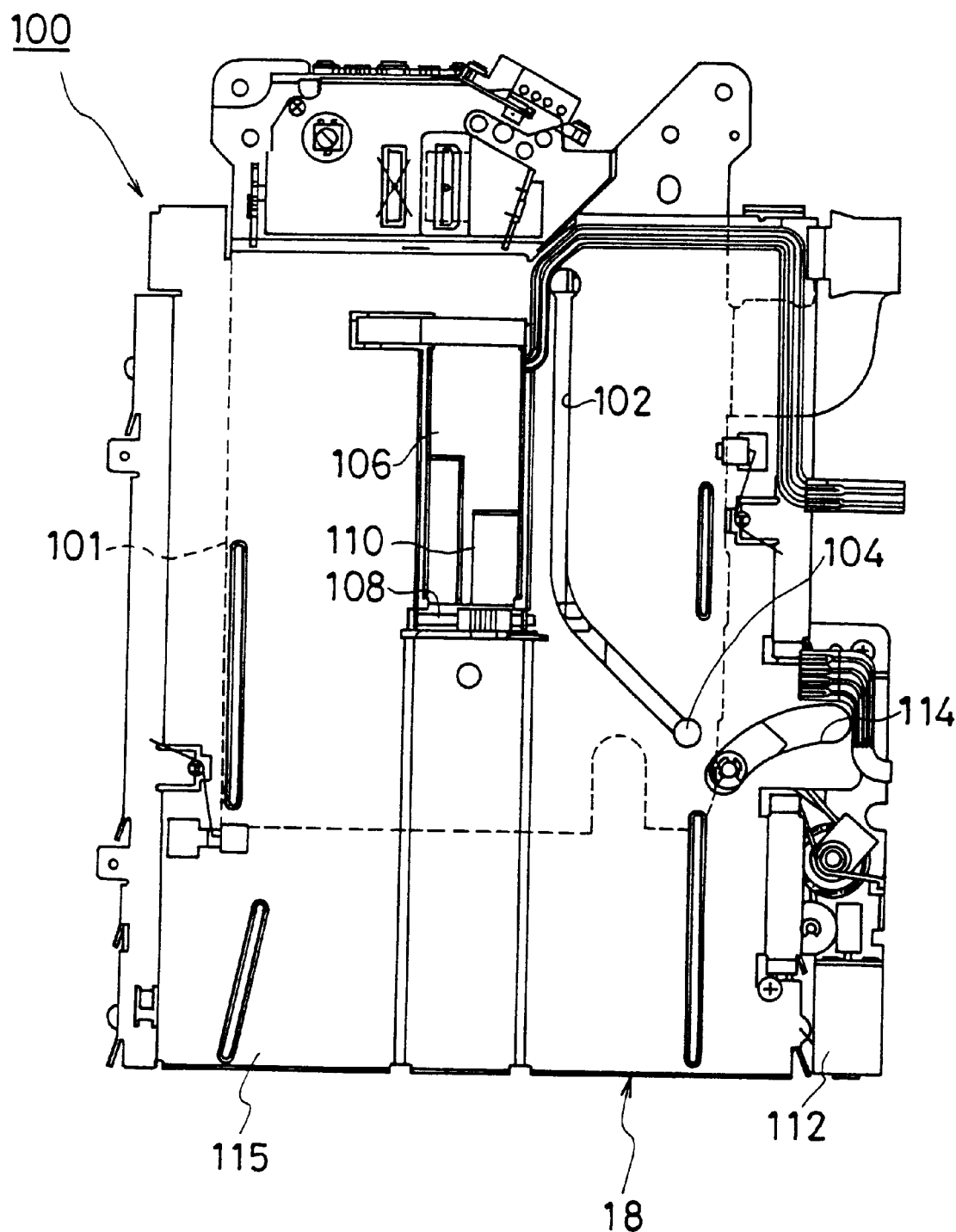
FIG. 10 is an explanatory diagram of a main body unit which is enclosed in the inside.

FIG. 9 is an assembly exploded diagram of a casing of the optical disk drive 10 in FIG. 1. A main body casing 86 is a box-shaped member which is opened toward the front side and the upper side. A panel unit 92 is attached to the front portion of the main body casing 86. The panel unit 92 has the door 20 which is closable in the pull-down direction and the ejection switch knob 22. The volume dial 25 and an ejection switch 27 are attached on the main body casing 86 side corresponding to the attaching position of the panel unit 92. A main body unit 100 in FIG. 10 is attached to the main body casing 86. A printed circuit board 88 is arranged in the upper portion in a state in which the main body unit 100 is attached to the main body casing 86. A circuit with a hardware construction of the optical disk drive 10, which will be explained hereinlater, is installed on the printed circuit board 88. A connector 94 is provided in the rear portion. Further, a rectangular bias magnet refuging hole 96 is opened at the center of the printed circuit board 88. Subsequent to the printed circuit board 88, a cover 90 is attached to the upper portion.

Figure 11:
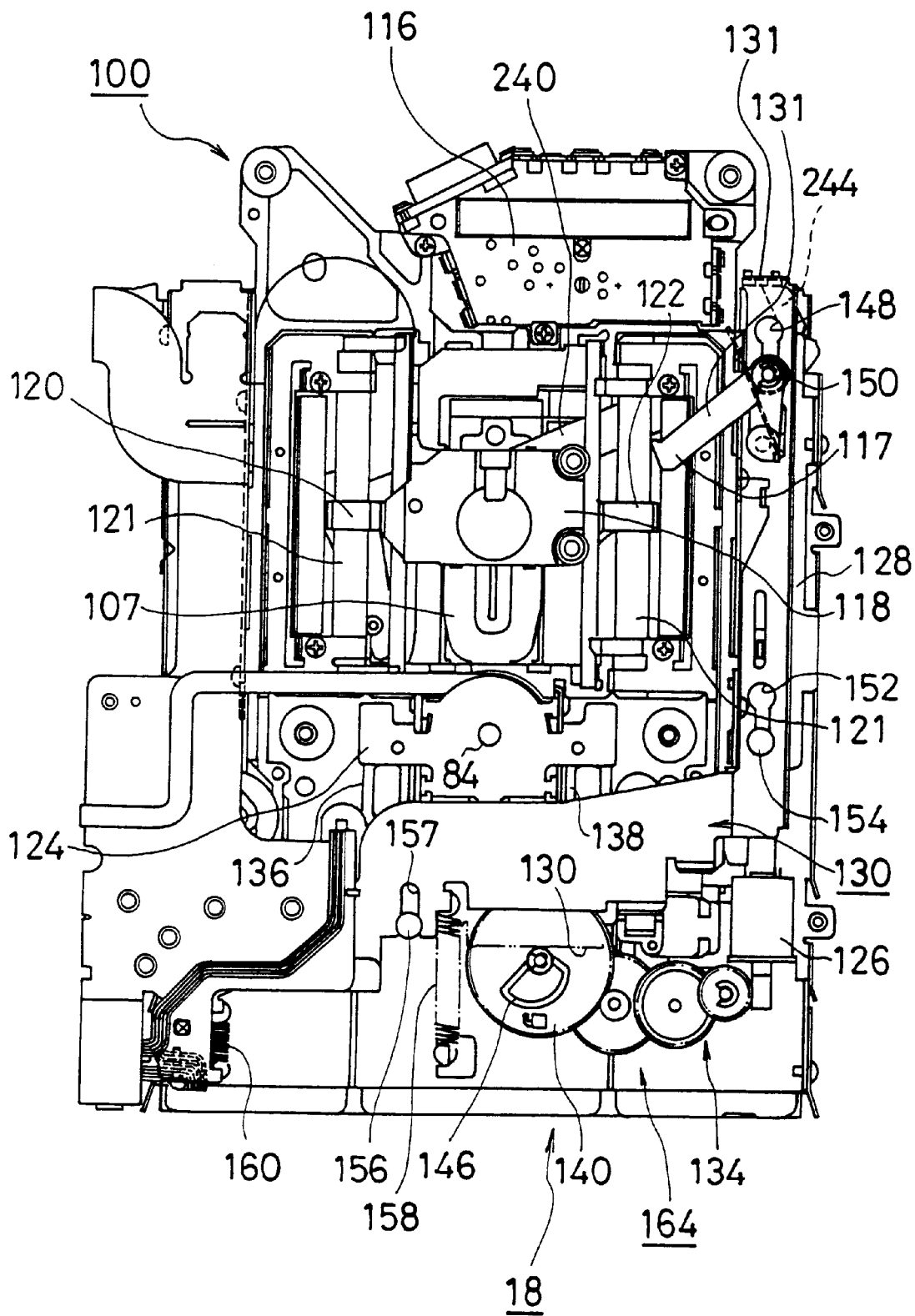
FIG. 11 is an explanatory diagram of the back side of the main body unit of FIG. 10.
Figure 12:
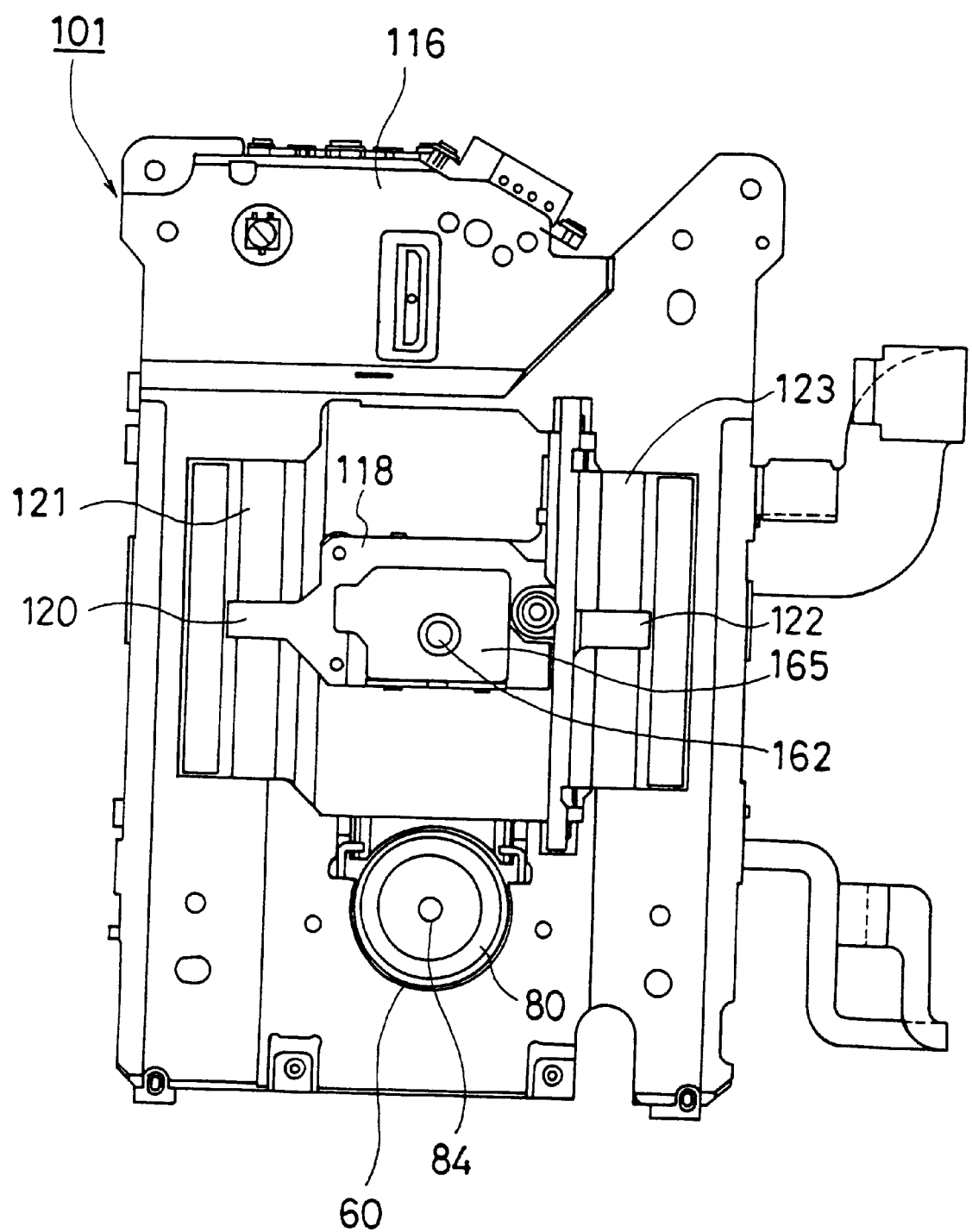
FIG. 12 is an explanatory diagram of a mechanism unit taken out from the main body unit of FIG. 10.

FIG. 10 shows the main body unit 100 which is enclosed in the main body casing 86 in FIG. 9 when it is seen from the upper side. In the main body unit 100, the lower side becomes the medium inserting/ejecting port 18 side. A mechanism unit 101 is attached to the main body unit 100 from the rear portion as shown by a broken line. A part of the rear portion of the mechanism unit 101 is exposed and FIG. 12 shows the mechanism unit 101. As shown in an assembly exploded diagram of FIG. 14, the main body unit 100 is constructed by: a fixed assembly 115 which is arranged in the upper portion; a fixed assembly 164 which is provided on the inserting/ejecting port side; a side plate 166 which is attached to the right side of the fixed assembly 115; and a load plate 130 which is arranged in the lower portion on the left side of the fixed assembly 115 through an intermediate plate 128 and is movable in the inserting/ejecting direction of the medium. In the assembly state of the main body unit 100 in FIG. 10, a guide groove 102 is formed on the upper surface of the fixed assembly 115 in the depth direction from the inserting/ejecting port 18 side. A shutter pin 104 is arranged at an initial position of the guide groove 102 before the medium is loaded. The shutter pin 104 moves the guide groove 102 in the depth direction in association with the loading of the MO cartridge 12 or CD carrier 16. By the motion in the lateral direction of the shutter pin 104 in this instance, in case of the MO cartridge 12, the shutter is released at the loading completion position. A bias magnet holder 106 serving as a cantilever door by a shaft 108 is supported on the center rear side of the upper surface of the fixed assembly 115 serving as a left side of the guide groove 102. The bias magnet holder 106 is urged by a coil spring 110 in such a direction as to close the door. A bias magnet 107 is attached to the inside of the bias magnet holder 106 so that a part of the bias magnet 107 can be seen in FIG. 11 showing the back side of the fixed unit 100 in FIG. 10. The bias magnet 107 generates an external magnetic field when erasing the magneto-optical disk enclosed in the loaded MO cartridge 12. The bias magnet 107 is unnecessary when the CD 14 mounted on the CD carrier 16 is loaded. To erase the MO cartridge 12, the bias magnet 107 is projected to the inside of the fixed assembly 115 and is positioned within the specified dimensions for the medium surface of the magneto-optical disk. When the CD carrier 16 on which the CD 14 was mounted is loaded, therefore, the bias magnet holder 106 to which the bias magnet 107 was attached to the inside is pushed up by the CD carrier 16 and is shunted to the outside, thereby preventing it from becoming an obstacle in the reproduction of the loaded CD 14 by the CD carrier 16. In correspondence to the bias magnet holder 106, as shown in FIG. 9, the bias magnet refuging hole 96 is opened to the printed circuit board 88 locating in the upper portion. A load motor 112 is attached to the right side of the inserting/ejecting port 18 of the fixed assembly 115. The load motor 112 has a load roller guide groove 114 for positioning a load roller in a loading mechanism, which will be obviously described hereinlater, in accordance with a size of medium that is loaded.

Figure 14:
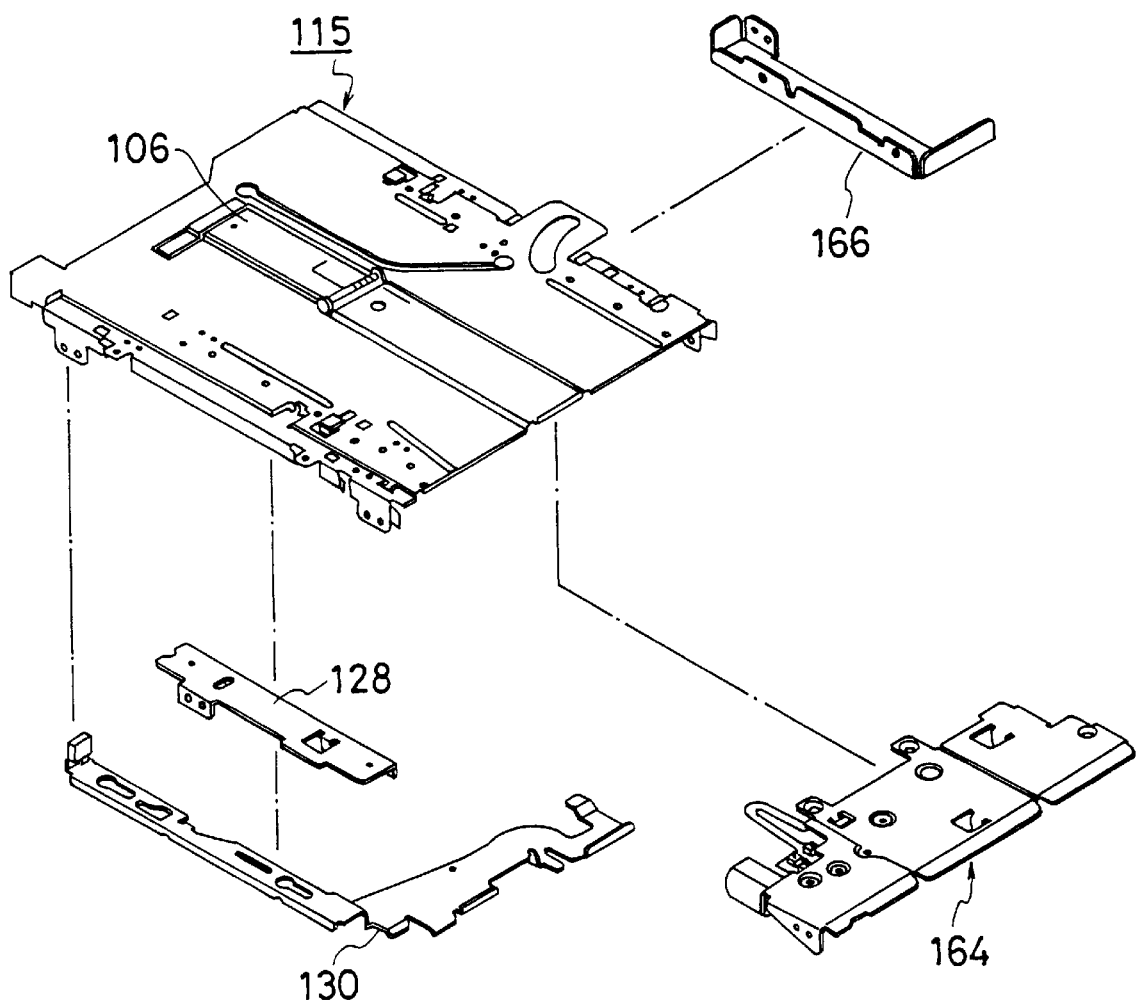
FIG. 14 is an assembly exploded diagram of a casing of the main body unit of FIG. 10.

In FIG. 11, when the main body unit 100 is seen from the back side, a motor assembly 124 is arranged at an approximate center. The motor rotary shaft 84 is located at the center of the motor assembly 124. VCM coils 120 and 122 of a carriage 118 serving as a movable portion of a pickup are arranged in the upper portion of the motor assembly 124 so as to be movable in the front/rear direction along yokes 121 and 123 of the VCMs arranged on both sides. A fixed optical unit 116 of the pickup is arranged at a depth position which faces the carriage 118. An objective lens, a lens actuator for rotating the objective lens around the horizontal direction and for tracking a beam, and a focusing coil for moving the objective lens in the direction of an optical axis and for performing an automatic focusing control are mounted on the carriage 118. The other units of the optical system are provided on the fixed optical unit 116 side in order to reduce weight. When viewed from the back side in FIG. 11, the load plate 130 shown in FIG. 14 is assembled to the fixed assembly 115 so as to be movable in the front/rear direction as a part portion in the vertical direction locating on the right side from a part portion in the lateral direction locating on the inserting/ejecting port 18 side by fitting pins 154 and 156 into guide holes 152 and 157 for the fixed assembly 115. The position of the load plate 130 is a first position serving as an initial state in which the MO cartridge 12 or CD carrier 16 is not loaded. Coil springs 158 and 160 are provided between the load plate 130 and the fixed assembly 164 located on the inserting/ejecting port 18 side, thereby pulling the. load plate 130 to the inserting/ejecting port 18 side. Further, similar coil springs are also provided between the intermediate plate 128 in FIG. 14 and the load plate 130, thereby pulling the load plate 130 to the inserting/ejecting port 18 side. After completion of the loading of the MO cartridge 12 or CD carrier 16, a retaining of the load plate 130 by a stopper 244 of an arm member, which will be clearly described hereinlater, is released by the rotation of the arm around a shaft 150 as a center. A locked state of an edge portion 131 of the load plate 130 by the stopper 244 is released. Thus, the operation to slide the load plate 130 to the inserting/ejecting port 18 side by the springs 158 and 160 by only an amount corresponding to lengths of guide holes 148, 152, and 157 is executed. The position by the sliding of the load plate 130 by the completion of the loading is set to the second position. When a latching of the load plate 130 is released by the completion of the loading and the load plate 130 is slid from the first position (initial position) to the second position, since a guide assembly 206 has been coupled to the load plate 130 through links 136 and 138, the guide assembly 206 is also slid toward the inserting/ejecting port 18 side through the links 136 and 138 together with the load plate 130. By the sliding of the guide assembly 206 that is interlocked with the load plate 130, a lifting operation of an elevating mechanism of the spindle motor, which will be obviously described hereinlater, is executed. By the lifting operation of the spindle motor, a spindle is attached to a medium of the MO cartridge 12 or the CD mounted on the CD carrier 16 after completion of the loading. An ejection motor 126 is mounted on the fixed assembly 164 locating on the inserting/ejecting port 18 side. A rotational force of the ejection motor 126 is transferred to a cam gear 140 by a gear train 134. A cam 146 is provided on the cam gear 140. The inserting/ejecting port 18 side of the load plate 130 is stopped at a position near a rotary shaft of the cam gear 140 as shown at 130' in a sliding state to the second position after completion of the loading. In this state, when the ejection motor 126 is driven and the cam gear 140 is rotated counterclockwise, the load plate 130 is pushed back to the inherent first position by a rotation of the cam 146. At the same time, a member of the motor assembly 124 is also returned to the inherent position through the links 136 and 138. Therefore, the coupling of the spindle motor is released by the down-operation of the motor elevating mechanism. Further, by returning the front edge portion 131 of the side edge of the load plate 130 to the first position, the medium can be ejected and can be returned to the retaining state by the stopper 244. A carriage stopper 117 is attached to the back surface side of the rotary shaft 150 of the arm member in FIG. 11. The carriage 118 is stopped at the initial position on the fixed optical unit 116 side in an initial state. When the carriage 118 is located at the initial position, a portion at a right edge of the carriage 118 locating in the VCM coil 122 is retained by a claw portion of the front edge of the carriage stopper 117. When the medium is loaded, the carriage stopper 117 is counterclockwise rotated by the rotation of the arm member, thereby releasing the retaining of the carriage 118. The main body unit 100 in FIG. 11 other than the above construction will be described with reference to the diagrams as necessary when each portion is described in detail.

Figure 13:
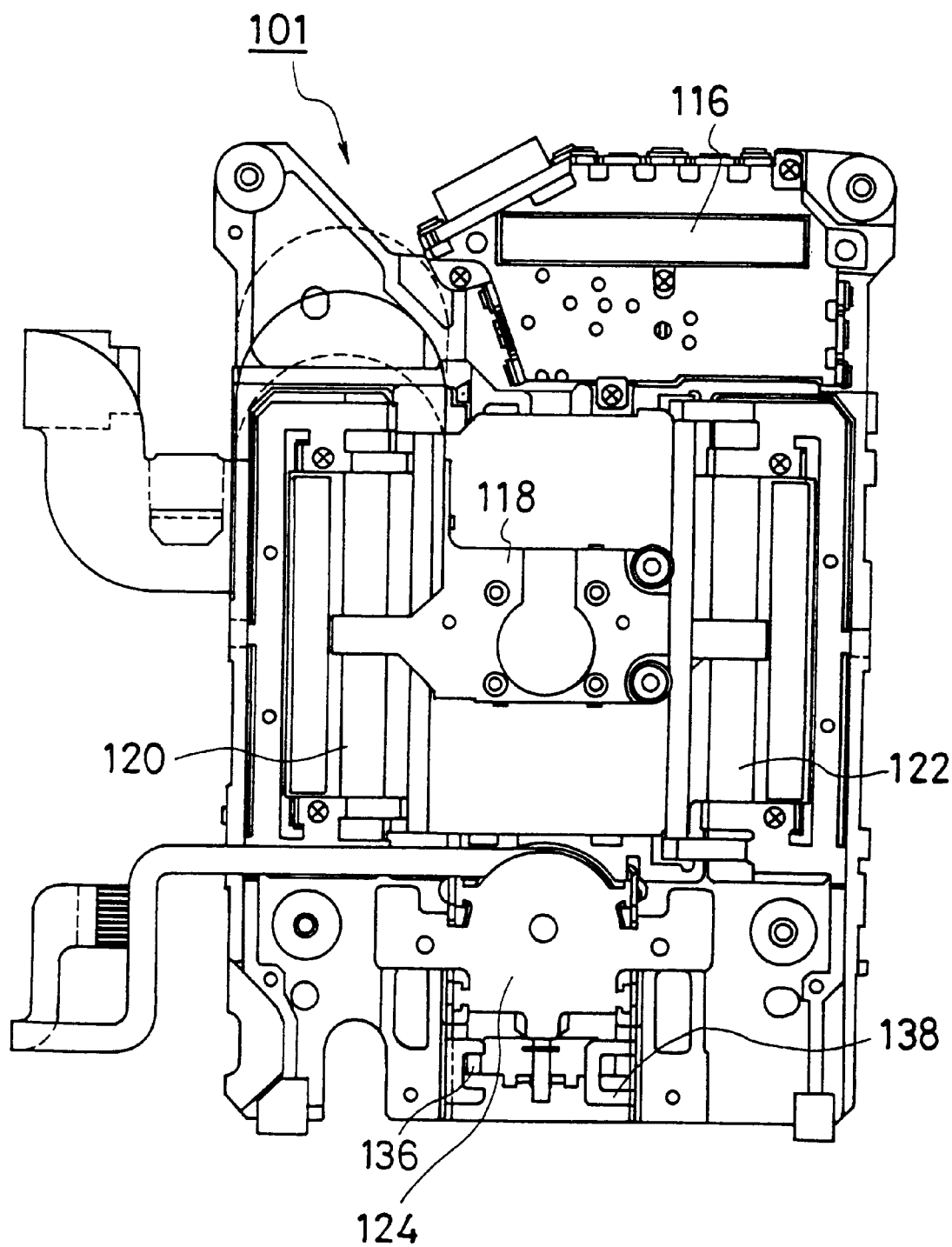
FIG. 13 is an explanatory diagram of the back side of the mechanism unit of FIG. 12.

FIG. 12 shows a state when the mechanism unit 101 enclosed on the rear portion side of the main body unit 100 in FIGS. 10 and 11 is taken out and seen from the upper portion. FIG. 13 is a diagram showing the mechanism unit 101 in FIG. 12 when it is seen from the back side. In the mechanism unit 101, the motor rotary shaft 84 and motor hub 80 are provided in the upper portion of the spindle motor 60. The hub of the magneto-optical disk in the MO cartridge 12 which was loaded or the spindle side hub of the CD turntable 24 on which the CD 14 mounted on the CD carrier 16 is attached is located in the upper portion of the mechanism unit 101. Subsequent to the spindle motor 60, the carriage 118 of the pickup is provided so as to be movable in the depth direction by the VCM coils 120 and 122. An actuator unit 165 is mounted on the carriage 118 and an objective lens 162 is exposed to the upper portion. The objective lens 162 is moved in the horizontal direction by a built-in lens actuator (4-spring supporting method), thereby controlling a beam position for the disk medium surface. On the other hand, when the objective lens 162 is moved in the vertical direction serving as an optical axial direction, a focusing is performed. In the control of the beam position by the movement of the carriage 118 by the VCM coils 120 and 122, when a seek distance from the present track position to the target track position is long, the carriage 118 is driven. On the other hand, when the seek distance is so short to be, for example, ±50 tracks for the present track position, a seek control by a high-speed track jump is performed by the horizontal movement of the objective lens 162 by the lens actuator. When the beam seeking operation is finished by the movement of the objective lens 162 by the lens actuator, a position control by the VCM coils 120 and 122 of the carriage 118 is performed in a manner such that a lens position detection signal (LPOS) from a position detector for detecting a neutral position of the lens actuator built in the actuator unit 165 becomes a detection signal indicative of a zero-point position. Such a position control by the lens actuator and the VCM is called a "double servo".

FIG. 13 is a diagram of the mechanism unit 101 when it is seen from the back side. A structure on the bottom surface side of the elevating mechanism of the spindle motor by the links 136 and 138 for the motor assembly 124 will be obviously understood from this diagram.

Figure 15:
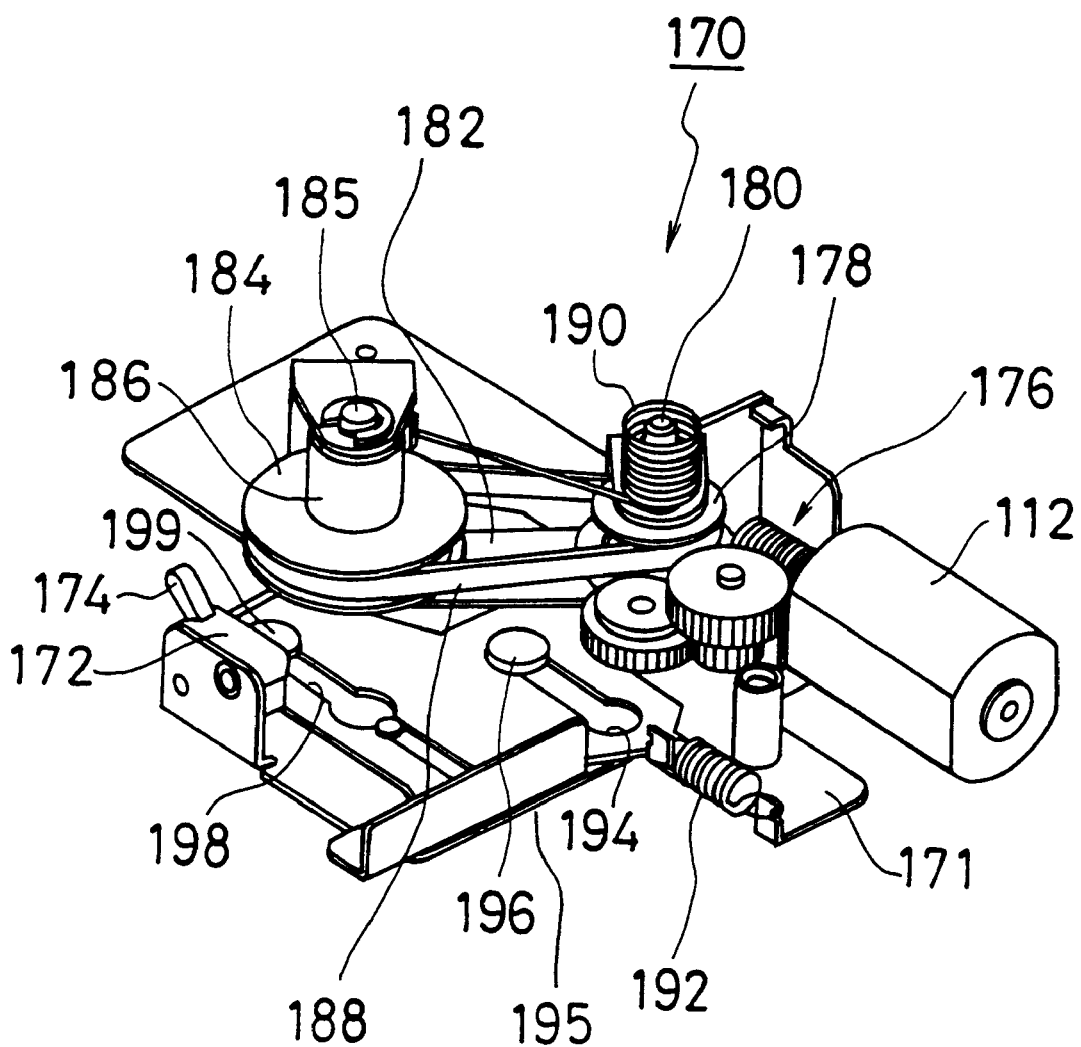
FIG. 15 is an explanatory diagram of a load motor assembly provided for the main body unit of FIG. 10.

FIG. 15 shows a load motor assembly 170 provided on the right side of the inserting/ejecting port 18 of the main body unit 100 in FIG. 10. In the load motor assembly 170, the load motor 112 is attached onto a fixed plate 171. A rotary plate 182 is rotatably attached on the lower side to a fixed shaft 180 attached to the fixed plate 171. A shaft 185 is attached to the rotational side of the front edge of the rotary plate 182. A belt pulley 178 is provided for the fixed shaft 180 serving as a fulcrum of the rotary plate 182. A belt pulley 184 is also provided for the shaft 185 on the rotational side. A belt 188 is wound between both of the belt pulleys 178 and 184. A load roller 186 is integratedly provided for the belt pulley 184 on the front edge side of the rotary plate 181. The load roller 186 frictionally comes into contact with the side surface of the MO cartridge 12 or CD carrier 16 which was inserted by the operator, thereby performing a pull-in operation for loading. For this purpose, a rubber roller is used as a load roller 186 in order to obtain enough frictional force. A coil spring 190 is attached to the fixed shaft 180. One end of the coil spring 190 is retained to the fixed plate 171 side and the other end is retained to the belt pulley 184 side. By the coil spring 190, the rotary plate 182 is urged counterclockwise, thereby enabling the load roller 186 to be always pressed against the medium side which is located on the inside. By a lateral width of the medium locating on the inside, the rotary plate 182 rotates around the fixed shaft 180 as a center. Even if the position of the medium side surface changes, the load roller 186 can be pressed against the medium side surface in accordance with the position. A rotational force by a gear train 176 shown in the diagram is transferred from the load motor 112 to the belt pulley 178 of the fixed shaft 180. By further inserting pins 196 and 199 into guide grooves 194 and 198, the movable plate 195 is supported to the inside for the fixed plate 171 so as to be movable in the front/rear direction. A load switch 172 is attached onto the fixed plate 171. The load switch 172 has a switch knob 174 in the upper portion. The load switch 172 is a change-over switch whose switch contact is switched in dependence on the position of the switch knob 174. Before the medium is loaded, the switch knob 174 is located at a position as shown in the diagram. When the operator inserts the medium in this state, the front edge of the medium comes into contact with the switch knob 174, which falls down, thereby activating the load motor 112 at this switching position and performing the pull-in operation for loading the medium by the clockwise rotation of the load roller 186. When the medium reaches a loading completion position, the load plate 130 described with reference to FIG. 11 is slid from the first position before loading to the second position by the completion of the loading. In i-this state, when the ejecting operation by the rotation of the ejection motor 126 in FIG. 11 is executed, the load plate 130 is pushed back to the first position, the coupling with the spindle motor is released, and pin switches 222, 224, and 226 are also away from the medium. Since all of the pin switches 222, 224, and 226 are away from the medium, the load motor 112 is activated so as to reversely rotate and rotates the load roller 186 counterclockwise. A feeding operation to feed the ejected medium to the inserting/ejecting port 18 by the load roller 186 can be executed. Namely, the load motor 112 of the load motor assembly 170 executes both of the loading operation when the medium is inserted and the ejecting operation after completion of the ejection at the time of the ejection of the medium.

Figure 16:
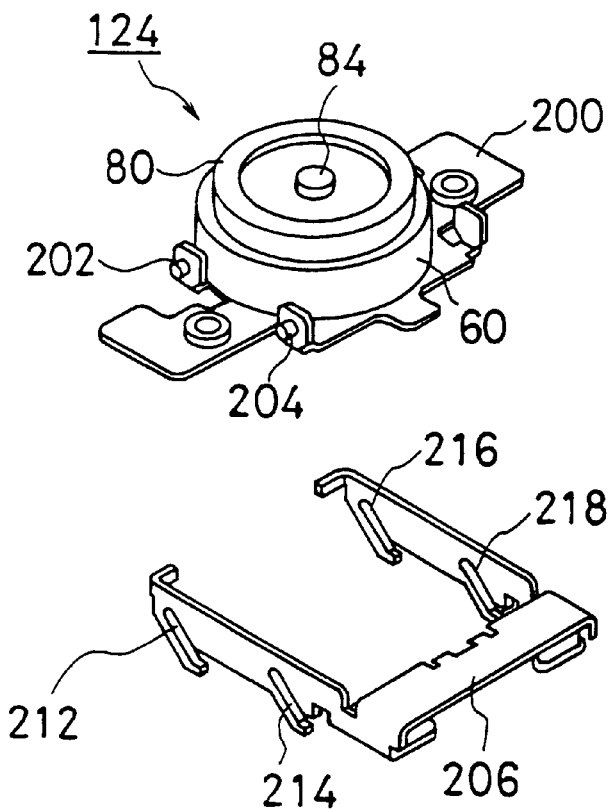
FIG. 16 is an assembly exploded diagram of a spindle assembly provided for the mechanism unit of FIG. 12.

FIG. 16 is an assembly exploded diagram of the motor assembly 124 in FIGS. 11 and 12. In the motor assembly 124, the spindle motor 60 is mounted on a lifter 200. The motor rotary shaft 84 and the motor hub 80 having a magnet are rotatably provided in the upper portion of the spindle motor 60. Cut-standing portions are formed at four positions of lifters 200 on both sides of the spindle motor 60. Pins 202 and 204 are provided for the cut-standing portions as shown at, for example, two positions on the front side. The guide assembly 206 is provided for the lifters 200. The guide assembly 206 is a frame-shaped member whose one end is open. Taper-shaped lift grooves (212 and 214) and (216 and 218) which are opened on the lower side and are inclined in the oblique upward direction are formed at two positions of each side surface. The pins 202 and 204 provided for the lifter 200 are fitted into the lift grooves 212 and 214, respectively. Similarly, pins at two positions on the opposite side of the lifter 200 are fitted into the lift grooves 216 and 218.

Figure 17:
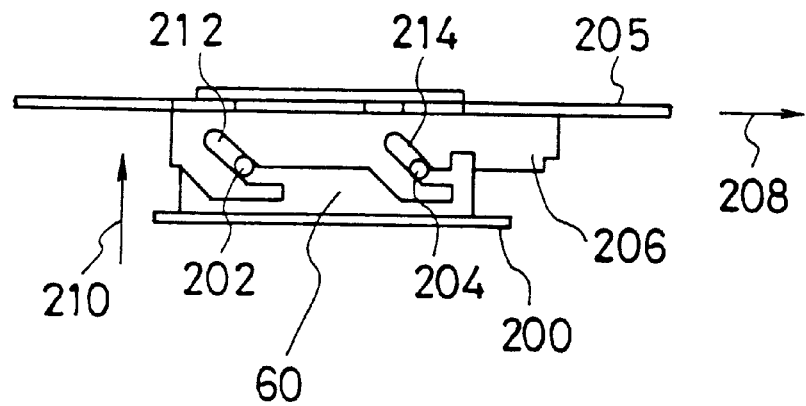
FIG. 17 is a side elevational view of the spindle assembly of FIG. 12.

FIG. 17 is a side elevational view of an assembly state in which the lifter 200 to which the spindle motor 60 was attached is assembled to the guide assembly 206 in FIG. 16. In the state shown in the diagram, the spindle motor 60 has descended down. In this state, when the loading of the medium is completed, in association with the movement of the load plate 130 from the first position to the second position, the guide assembly 206 is slid in the direction shown by an arrow 208 through a link member 205. Therefore, the pins 202 and 204 are moved upward in the direction shown by an arrow 210 along the lift grooves 212 and 214, so that the spindle motor 60 is lifted up, thereby enabling the spindle motor 60 to be coupled to the hub of the medium loaded to the upper portion. Upon ejection, the guide assembly 206 is slid in the direction opposite to the arrow 208 through the link member 205. The pins 202 and 204 are returned to the positions shown in the diagram along the lift grooves 212 and 214, so that the coupling with the medium due to the lift up of the spindle motor 60 is released.

Figure 18:
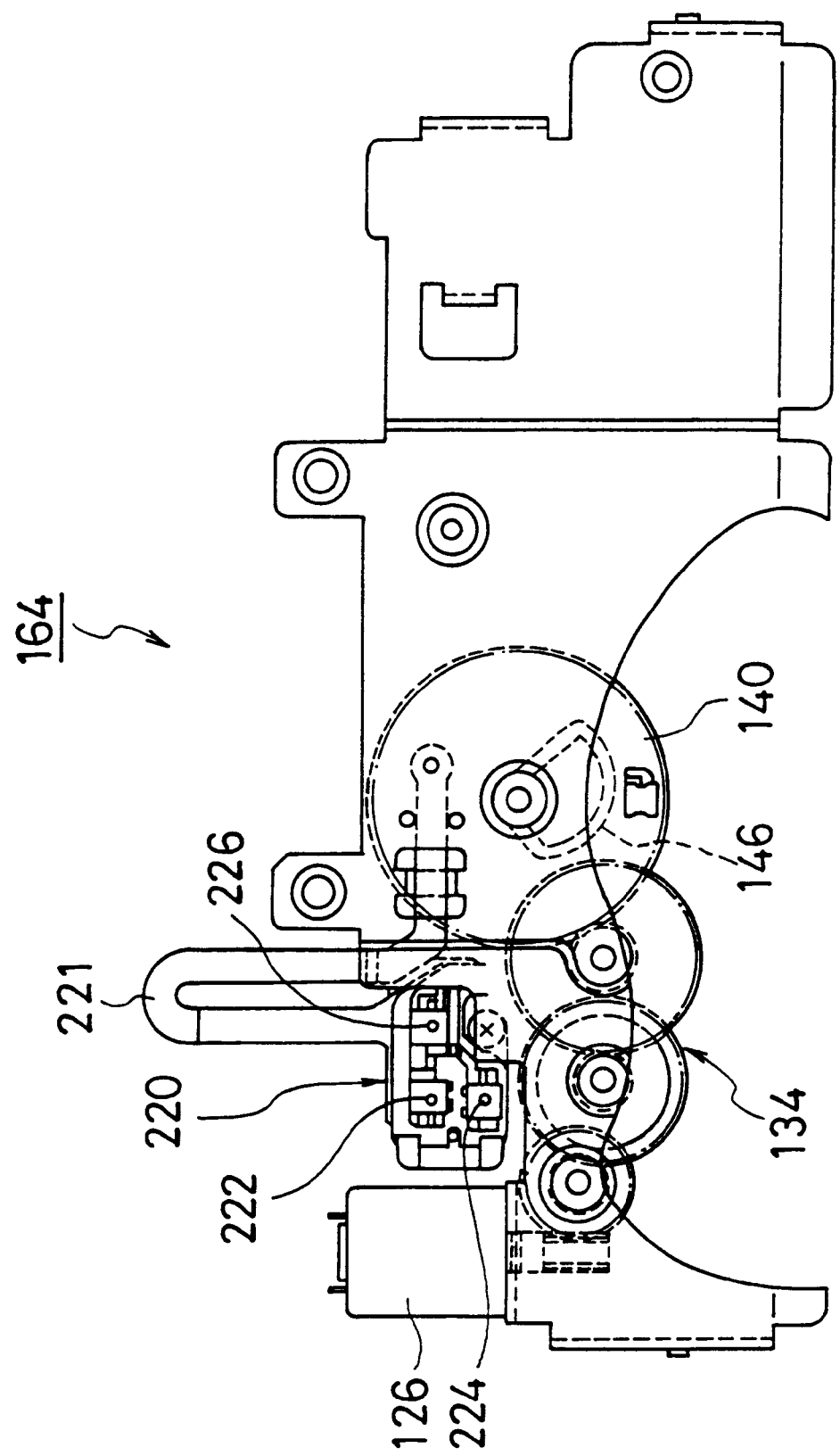
FIG. 18 is an explanatory diagram of a pin switch for detection of medium information which is provided at an inserting/ejecting port of the main body unit of FIG. 10.

FIG. 18 shows an assembly structure of the fixed assembly 164 provided on the inserting/ejecting port 18 side in FIG. 14 and a part of which is cut away. The ejection motor 126, gear train 134, and cam gear 140 having the cam 146 for ejection are mounted on the fixed assembly 164. Further, a sensor holder 220 which is cantilever supported by a leaf spring 221 is attached in close vicinity with the position of the ejection motor 126. The leaf spring 221 has a U-shape. The right side of the leaf spring is fixed to the fixed assembly 164 and the left side is in a floating state. The sensor holder 220 is elastically supported in such a floating portion in the vertical direction. The three pin switches 222, 224, and 226 are arranged on the sensor holder 220. The pin switches 222, 224, and 226 are switches which are turned on by pressures of the pins. For example, conductive rubber sheets are arranged on a pair of switch electrodes and are pressed with pins, thereby making a circuit between the electrodes conductive. Each of the pin switches 222, 224, and 226 corresponds to the carrier detecting hole 44 of the CD carrier 16 shown in FIG. 4 and similarly corresponds to a detecting hole of the medium information formed in the MO cartridge 12 in accordance with a convex and concave portions of the ISO. Namely, when the detecting holes are opened on the medium side corresponding to the pin switches 222, 224, and 226, since the pin cannot be depressed, the switch is OFF. On the other hand, when the detection hole does not exist at the position corresponding to the switch pin, the pin is depressed by the leaf spring 221, and the switch is turned on.

FIG. 19 shows contents of the medium identification in response to detection outputs of the switches when bit due to the turn-on of the three pin switches 222, 224, and 226 is set to 1 and bit due to the turn-off is set to 0. Among them, in the CD carrier 16 in FIG. 4, since the carrier detecting holes 42 and 44 are formed at the positions corresponding to the pin switches 122 and 126, the pin switches 122, 124, and 126 are turned off, on, and off, respectively. Detection bits by the three pin switches are set to "011" as shown in FIG. 20, so that medium ID information indicative of the CD can be obtained.

[Loading and ejection of MO and CD]

Figure 20:
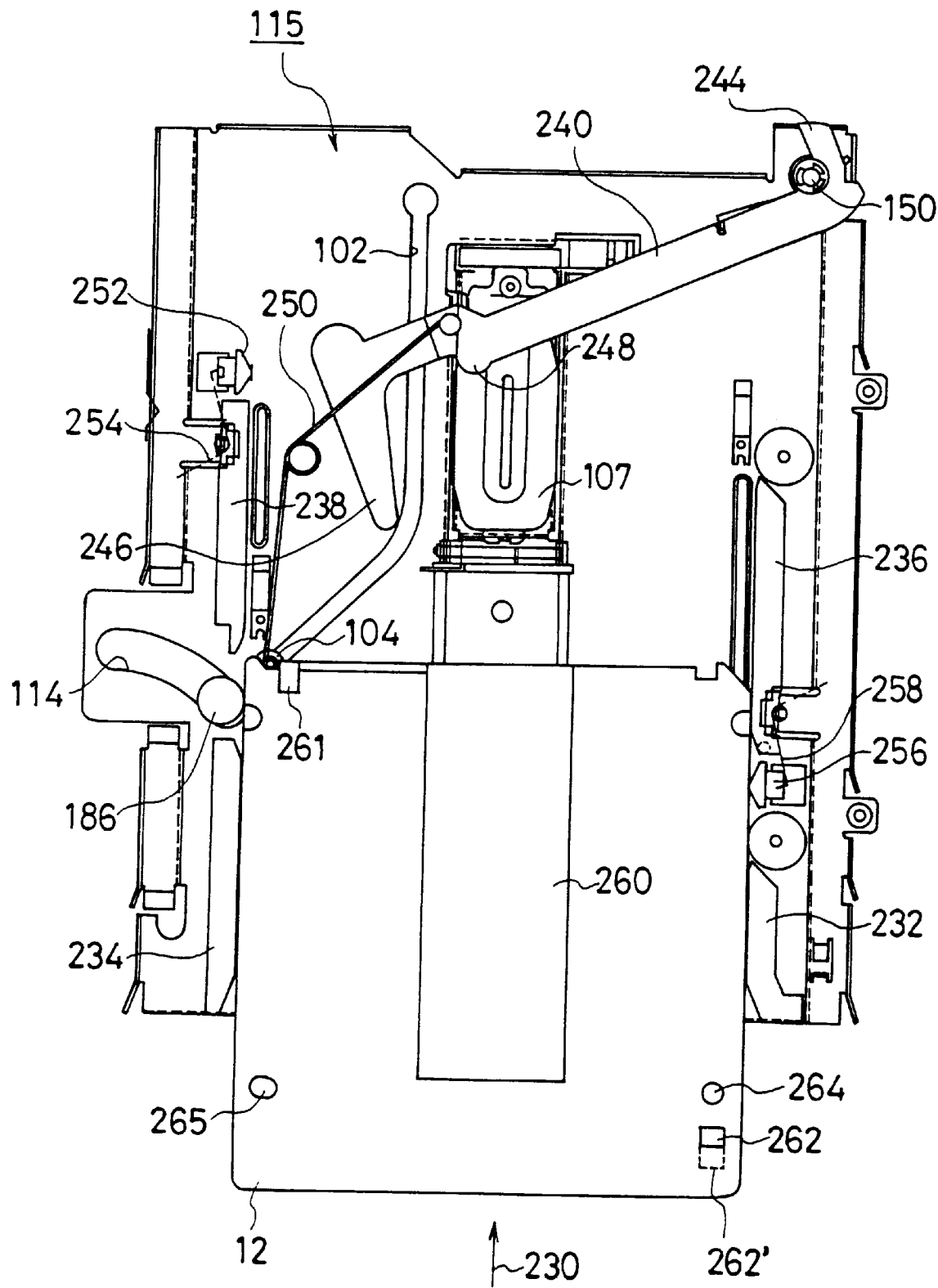
FIG. 20 is an explanatory diagram at the start of the loading when an MO cartridge is inserted.
Figure 21:
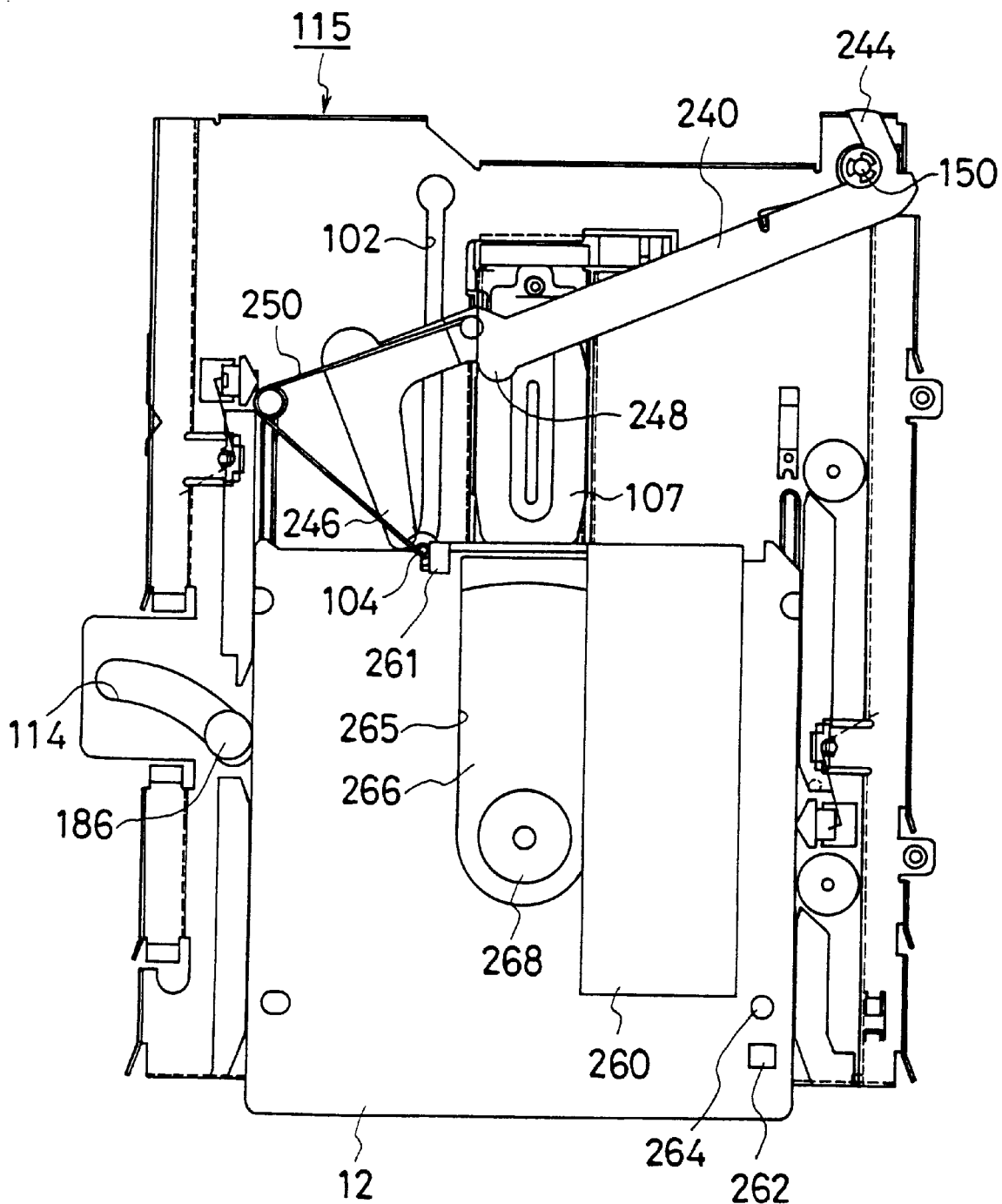
FIG. 21 is an explanatory diagram during the loading of the MO cartridge.
Figure 22:
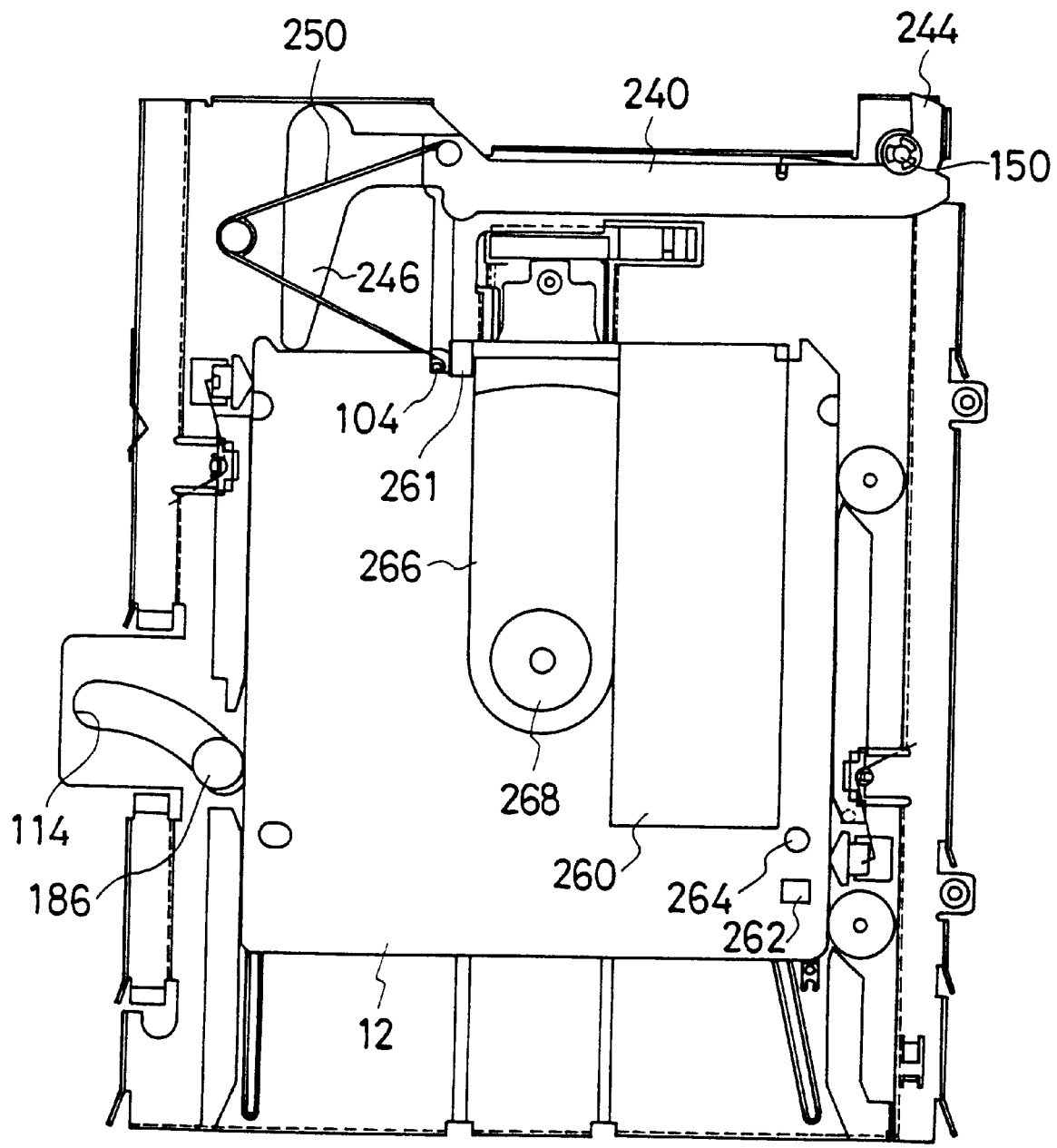
FIG. 22 is an explanatory diagram at the end of the loading of the MO cartridge.

FIGS. 20, 21, and 22 show a state from the insertion of the MO cartridge 12 to the fixed assembly 115 to the completion of the loading when it is seen from the back side (lower surface side). First, FIG. 20 shows a state in which the operator inserts the MO cartridge 12 into the inserting/ejecting port 18 of the fixed assembly 115 as shown by an arrow 230. The MO cartridge 12 has a shutter 260. The shutter 260 can be opened by moving a shutter operating member 261 on the left side of the front edge to the right side.

Position detecting holes 264 and 265 and a medium detecting hole 262 are formed in the MO cartridge 12. Among those holes, an opening position of the medium detecting hole 262 can be switched between the position 262 and a position 262' by the slide knob. When the medium detecting hole 262 is located at the position shown by a solid line, the rewriting operation is inhibited. When the hole is located at the position 262' shown by a broken line, the writing operation can be performed. When the MO cartridge 12 is depressed as shown in the diagram, the switch knob 174 of the load switch 172 provided for the load motor assembly 170 in FIG. 15 is switched to the rear side from the position shown in the diagram, so that the load motor 112 is activated. Thus, the load roller 186 which has been pressed against the edge surface on the left side of the MO cartridge 12 is rotated counterclockwise along the load roller guide groove 114, thereby pulling the MO cartridge 12 to the inside. In order to decide the slide position of the MO cartridge 12, guides 232, 234, 236, and 238 made of a resin such as Teflon or the like are arranged at an interval of the lateral width W1 of the MO cartridge 12 in FIG. 3. Further, a positioning knob 256 pressed by a spring 258 is arranged between the guide members 232 and 236 on the right side. Similarly, a positioning knob 252 urged by a spring 254 is provided on the rear side of the guide 238 on the left side. By the guides 232, 234, 236, and 238 and, further, the positioning knobs 256 and 252 as mentioned above, the MO cartridge 12 is smoothly pulled into the fixed assembly 115 with the position held by the pull-in due to the counterclockwise rotation of the load roller 186.

FIG. 21 shows a loading state of the MO cartridge 12 due to the rotation of the load roller 186. At the start of the loading of FIG. 20, the shutter pin 104 arranged at the initial position of the guide groove 102 come into contact with the shutter operating member 261. Due to the operation in the lateral direction along the guide groove of the shutter pin 104 in association with the pull-in of the MO cartridge 12, in a state of FIG. 21, the shutter 260 is opened up to the halfway state. When the shutter 260 is opened, a magneto-optical disk 266 and its hub 268 are exposed in the opening portion 265 of the MO cartridge 12. On the other hand, in an initial state of FIG. 20, on the rear side of the fixed assembly 115, an arm 240 is provided so as to be rotatable around the shaft 150 of the right upper corner portion as a fulcrum. A front edge side of the arm 240 is arranged obliquely for the enclosing unit of the medium. A hammer-shaped MO contact portion 246 is provided as a first contact portion at the front edge of the arm 240. When the MO cartridge 12 pulled in by the load roller 186 reaches the position shown in FIG. 21, the MO cartridge comes into contact with the MO contact portion 246, thereby clockwise rotating the arm 240 in association with the pull-in of the MO cartridge 12 and shunting the arm. A CD contact portion 248 serving as a second contact portion is provided in the middle of the arm 240. The CD contact portion 248 comes into contact with the front edge of the CD carrier 16 on which the CD 14 was mounted, which will be obviously explained hereinlater, thereby likewise rotating counterclockwise the arm 24 and shunting it. The MO contact portion 246 on the front edge side of the arm 240 is a thin portion which is dented to the upper side for the CD contact portion 248 on the central side when it is seen from the lower side. Such a thin body structure due to the dent of the MO contact portion 246 at the front edge corresponds to the arm escaping groove 34 of the CD carrier 16 in FIG. 4. That is, when the CD carrier 16 is loaded, the MO contact portion 246 enters the arm escaping groove 34 formed in the CD carrier 16 in FIG. 4 due to a thin portion by the dent, so that the CD contact portion 248 provided on the center portion side comes into contact with the front edge surface of the CD carrier 16. The stopper 244 is integratedly formed on the opposite side of the rotary shaft 150 of the arm 240. As shown in FIG. 11, at the initial position shown in the diagram, the stopper 244 holds the rear edge 131 of the side portion of the load plate 130, thereby stopping the load plate 130 at the first position. When the arm 240 is rotated to the horizontal position by receiving the loading of the MO cartridge 12, the retaining of the load plate 130 by the stopper 244 is released, so that the load plate 130 is slid from the first position to the second position and performs a chucking of the spindle motor. Further, the shutter pin 104 which is moved along the guide groove 102 is supported to the arm 240 through a coil spring 250. At a position serving as an inside when it is seen from the lower side of the fixed assembly 115, the bias magnet 107 is rotatably supported to the outside by a door structure of the bias magnet holder 106 in FIG. 10. When the MO cartridge 12 is further pulled in by the load roller 186 from the state during the loading of the MO cartridge 12 in FIG. 21, it is finally located to the position of FIG. 22. At this position, the arm 240 is rotated to the horizontal position, the retaining of the load plate 130 by the stopper 244 is released, and the load plate 130 is instantaneously slid by a force of the spring from the first position to the second position. In association with it, a chucking for the hub 268 of the MO cartridge 12 by the lift-up of the spindle motor is executed.

Figure 23:
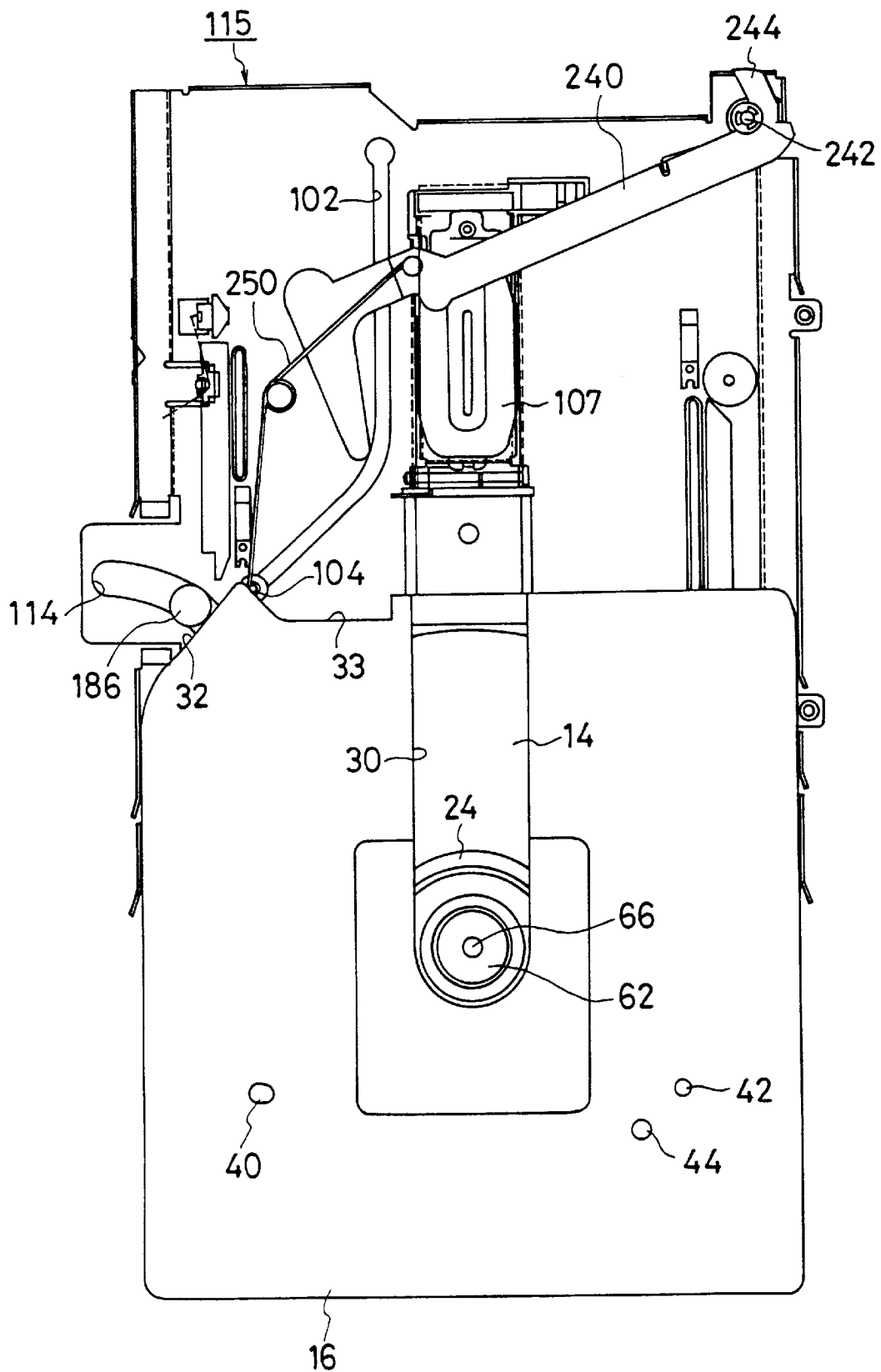
FIG. 23 is an explanatory diagram at the start of the loading when a CD carrier is inserted.
Figure 24:
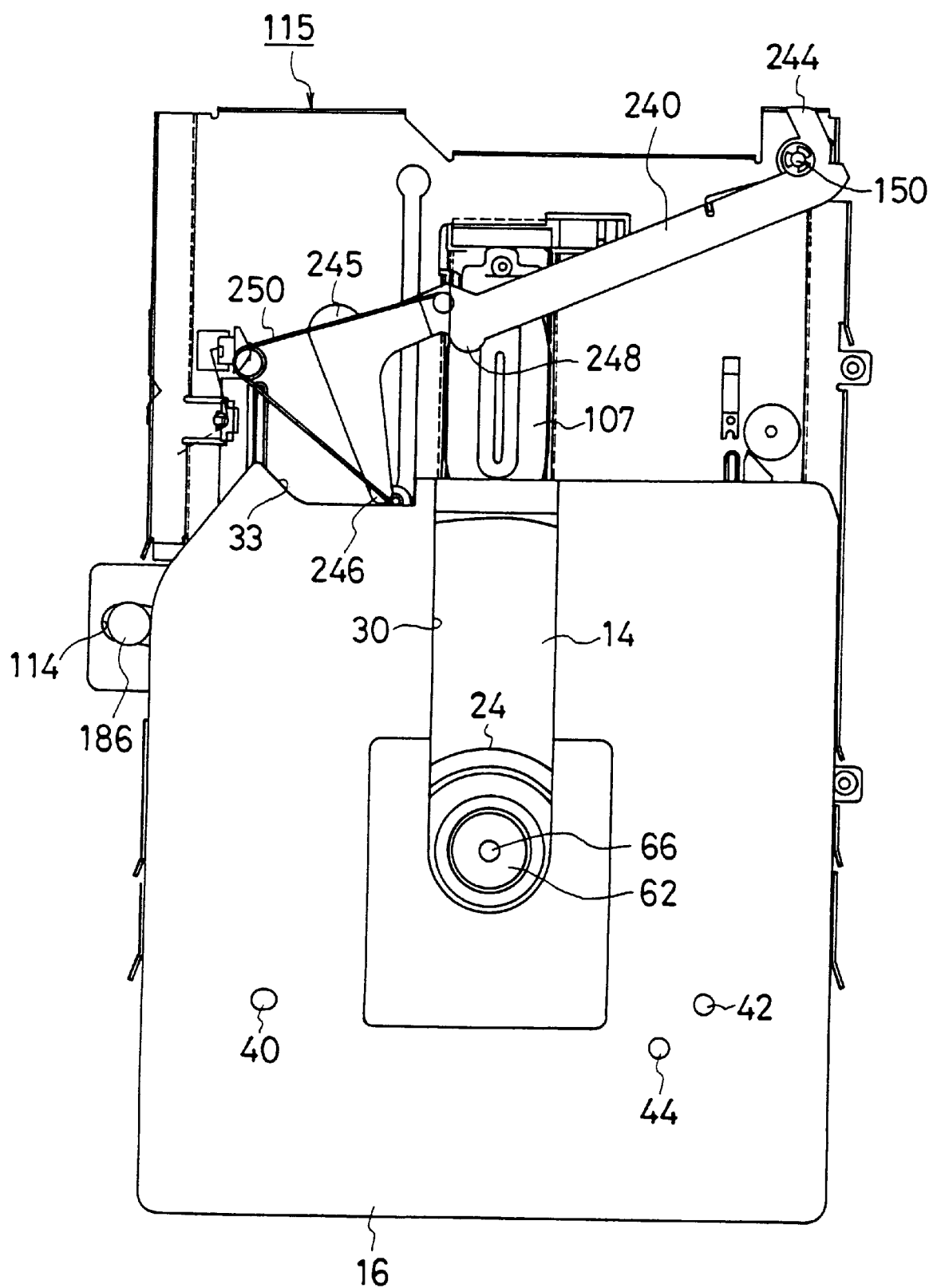
FIG. 24 is an explanatory diagram during the loading of the CD carrier.
Figure 25:
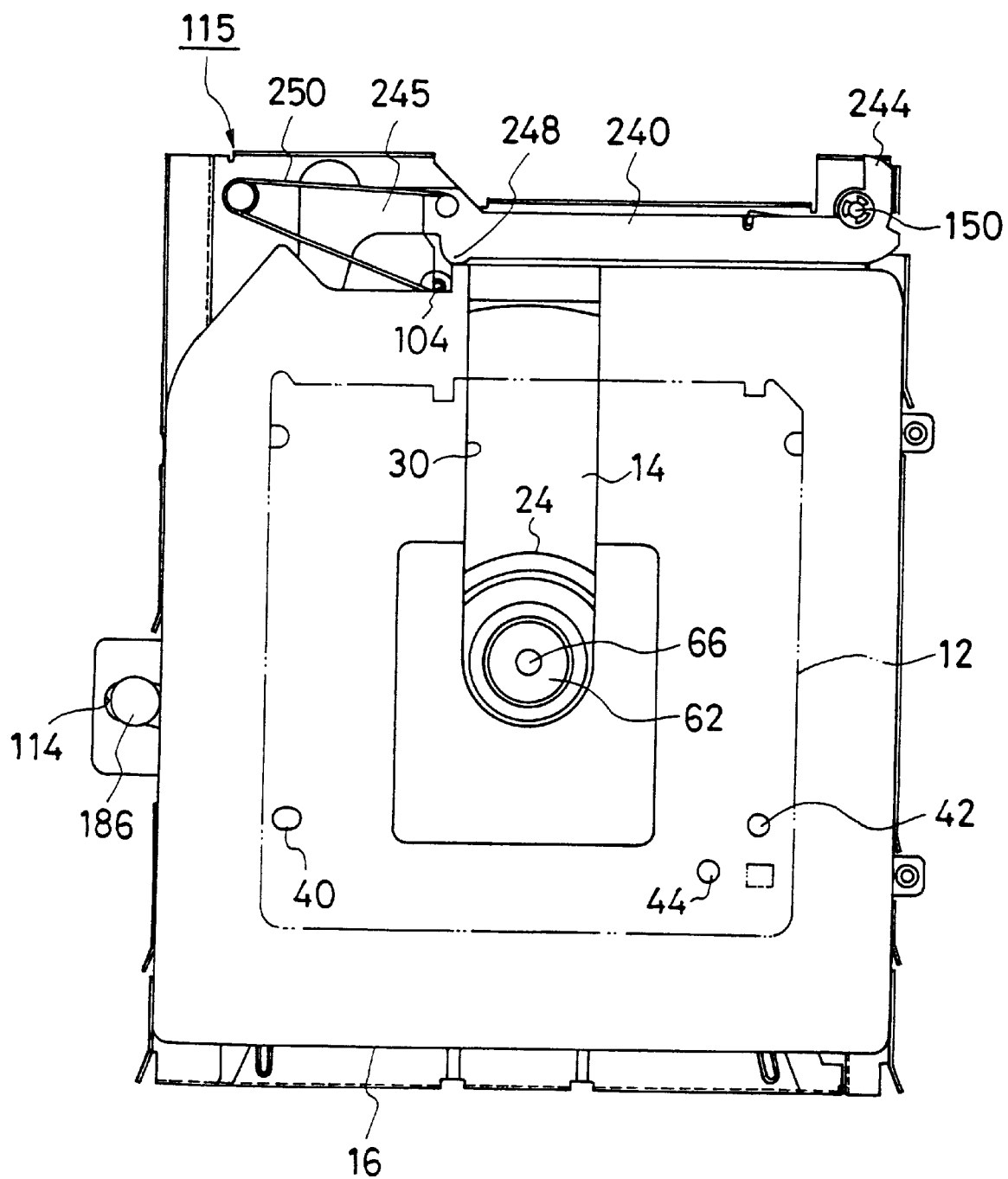
FIG. 25 is an explanatory diagram at the end of the loading of the CD carrier.

FIGS. 23, 24, and 25 sequentially show the loading state of the CD carrier 16 on which the CD 14 was mounted to the fixed assembly 115. First, FIG. 23 shows a state in which the CD carrier 16 on which the CD 14 had been mounted was inserted from the inserting/ejecting port 18 to the fixed assembly 115 by the operator. The load roller 186 comes into contact with the taper guide 32 of the front edge corner portion of the CD carrier 16. In this state, the load motor is activated by the turn-on of the load switch, so that the load roller 186 rotates clockwise. The load roller 186 rotates clockwise while moving backward along the load roller guide groove 114 and pulls in the CD carrier 16 in an interlocked manner with the pushing operation of the operator. The shutter pin 104 comes into contact with the taper portion of a shutter pin escaping groove 33 formed on the front edge side of the CD carrier 16 and moves in the guide groove 102 in association with the pull-in of the CD carrier 16.

When the CD carrier 16 is pulled in to the position shown in FIG. 24, the load roller 186 rotates clockwise in a state in which it is moved backward to the outermost position of the load roller guide groove 114, thereby pulling in the CD carrier. At this position, the MO contact portion 246 at the edge of the arm 240 is located at the edge surface position of the shutter pin escaping groove 33 at the front edge of the CD carrier 16. The MO contact portion 246 is dented upward and is thin. The arm escaping groove 34 is formed in the corresponding CD carrier 16 as shown in FIG. 4. Therefore, the MO contact portion 264 enters the arm escaping groove 34 of the CD carrier 16 and is not pushed at this position by the edge of the CD carrier 16. When the CD carrier 16 is further pulled in, the edge of the CD carrier 16 comes into contact with the CD contact portion 248 on the center side of the arm 240, so that the arm 240 rotates clockwise around the shaft 150 as a center and is moved backward in association with the pull-in of the CD carrier 16.

Finally, as shown in FIG. 25, when the CD carrier 16 moves to the loading completion position, the arm 240 rotates to the horizontal position by the depression by the contact of the CD carrier 16 to the CD contact portion 248. In this state, the latch of the load plate 130 by the stopper 244 is released. The load plate 130 is instantaneously slid to the second position by a force of the spring, thereby performing the coupling by the lift-up of the rotary shaft of the spindle motor and the motor hub for the shaft inserting hole 66 on the lower side and the spindle side hub 62 of the CD turntable 24 to which the CD 14 mounted on the CD carrier 16 was attached. FIG. 25 shows a comparison of the loading state of the MO cartridge 12 by an imaginary line.

[Hardware construction]

Figure 26A:
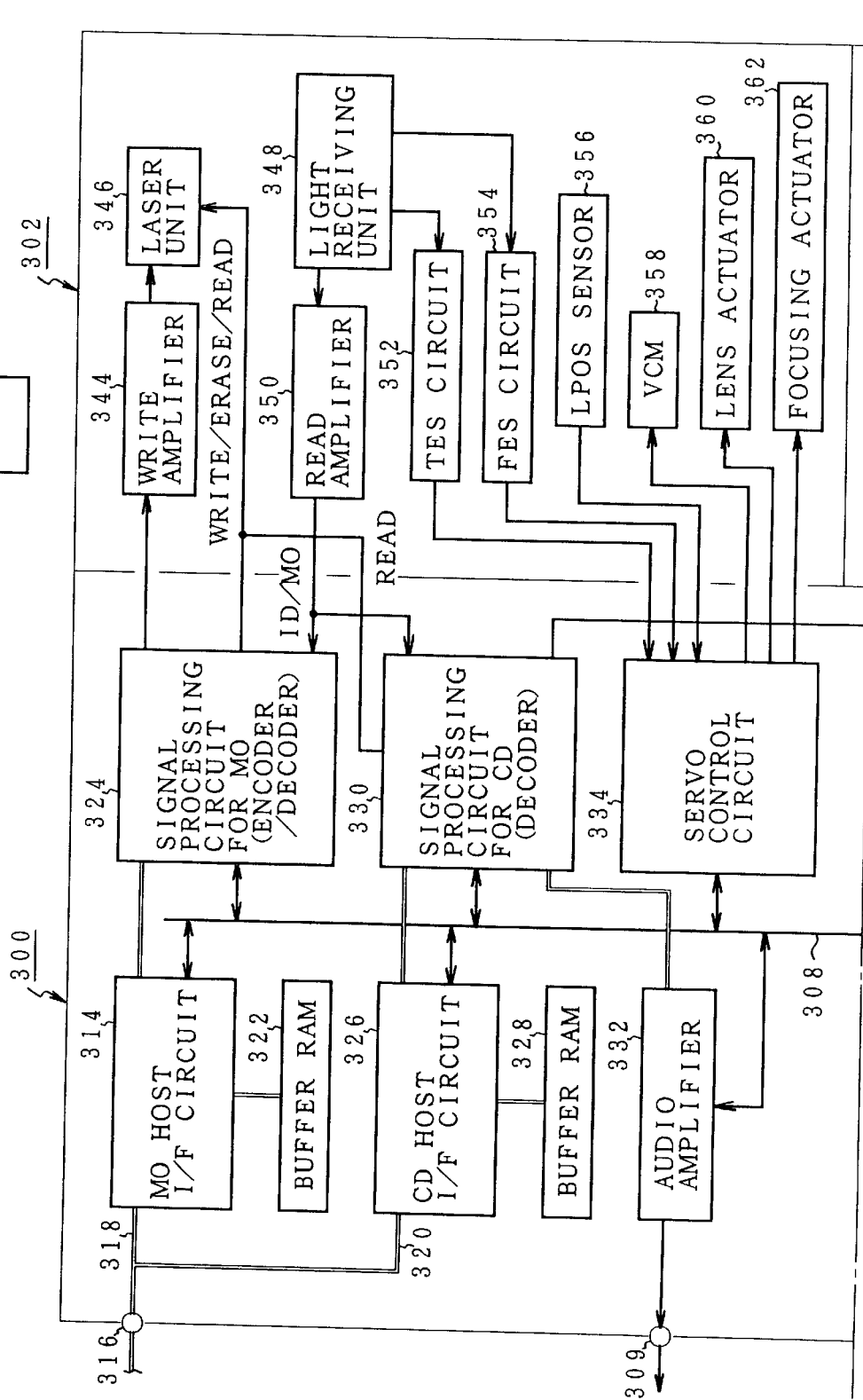
FIGS. 26A and 26B are block diagrams of a construction of a hardware of the invention.
Figure 26B:
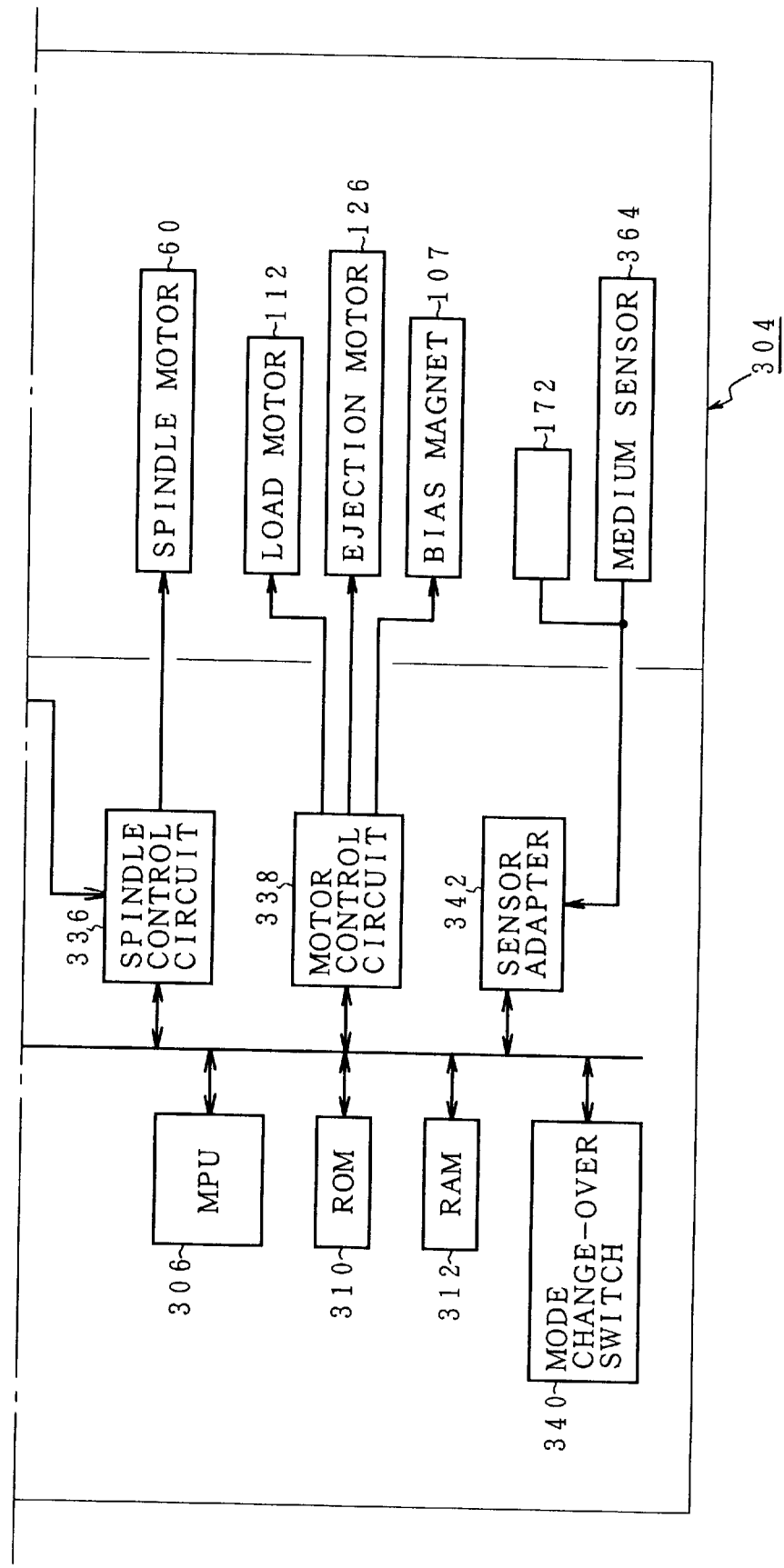

FIGS. 26A and 26B are block diagrams showing a hardware construction of the optical disk apparatus of the invention. A control unit 300 in FIG. 26 is installed on the printed circuit board 88 in FIG. 9 built in the optical disk drive 10 in FIG. 1. An optical unit 302 and a driving system unit 304 are provided for the control unit 300. An MPU 306 is provided for the control unit 300. An ROM 310 and a RAM 312 are provided for a bus 308 of the MPU 306. Control programs which are necessary for the optical disk apparatus of the invention to operate as an MO drive and a CD player and various control parameters which are necessary for such a control have previously been stored in the ROM 310. The RAM 312 is used as a work memory of the control operation of the MPU 306. An MO host interface circuit 314 and a signal processing circuit 324 for MO are first provided for the bus 308 of the MPU 360 as a signal processing system of the MO cartridge. A buffer RAM 322 which operates as a cache is provided for the MO host I/F circuit 314. The signal processing circuit 324 for MO executes a writing operation or reading operation for the loaded MO cartridge 12 on the basis of commands from an upper host computer. Therefore, a write signal from the signal processing circuit 324 for MO is supplied to a write amplifier 344 of the optical unit 302. A write control of a laser unit 346 is performed by the write signal of the write amplifier 344. A light reception signal for reproduction from a light receiving unit 348 provided for the optical unit 302 is amplified by a read amplifier 350. After that, the signal is inputted to the signal processing circuit 324 for MO as an ID signal and an MO signal. In the writing mode, therefore, the signal processing circuit 324 for MO operates as an encoder for converting write data transferred from the MO host I/F circuit 314 to a write signal for the optical unit 302 in accordance with a predetermined signal converting format. In the reading mode, the signal processing circuit 324 for MO operates as a decoder for demodulating the read data from the ID signal and MO signal obtained from the optical unit 302. Namely, the signal processing circuit 324 for MO executes a read control or write control with a modulating and demodulating function of both formats of a pit position recording system (PPM) and a pulse width recording system (PWM), a sector mark detecting function, and further, an error correcting function. Among them, with respect to the read signal process, an AGC amplifier which can cope with both formats of the pit position recording system (PPM) and the pulse width recording system (PWM) and a PLL which can cope with a constant angular velocity control system (ZCAV) due to a zone division are built in the circuit 324. A data clock signal and a sector mark signal are demodulated from the ID signal and MO signal from the read amplifier 350. The pit position recording system (PPM) is a system for recording data in correspondence to the presence or absence of the mark. The pulse width recording system (PWM) is a system for recording by making edge portions of the mark, namely, the front edge and rear edge correspond to data. Theoretically, a recording density can be doubled as compared with that of the PPM. The laser unit 346 provided for the optical unit 302 has a single laser diode and controls a light emission power amount in accordance with the writing mode, erasing mode, or reading mode. As a wavelength of a laser beam, for example, a short wavelength of 680 nm is used. A CD host interface circuit 326 and a signal processing circuit 330 for CD are provided for the bus 308 of the MPU 306 as a signal processing system of the CD 14. A buffer RAM 328 which operates as a cache is provided for the CD host I/F circuit 326. An audio amplifier 332 which outputs a D/A converted audio signal to an audio terminal 309 is provided on the output side of the signal processing circuit 330 for CD. A read signal based on the light reception signal of the light receiving unit 348 provided for the optical unit 302 is inputted as a reproduction signal HF from the read amplifier 350 to the signal processing circuit 330 for CD. Therefore, the signal processing circuit 330 for CD operates as a decoder for demodulating the reproduction signal HF derived from the optical unit 302 to read data. Namely, the signal processing circuit 330 for CD has a function to demodulate EFM data from the reproduction signal HF derived from the read amplifier 350. The processing circuit 330 also has a bit clock generating function which can cope with both of the CAV control and the CLV control of the spindle motor 60 and, further, an audio reproducing function. Further, the processing circuit 330 has an error correcting function with respect to each of a subcode and data which were demodulated as EFM data. Since the signal processing circuit 330 for CD relates to only the reading operation, in the reading mode, it generates a read control signal to the laser unit 346, thereby allowing a read beam to be emitted by a light emission control of a laser diode for reading.

Further, a servo control circuit 334, a spindle control circuit 336, and a motor control circuit 338 are provided for the MPU 306 as a common circuit unit of the MO cartridge 12 and CD 14. The servo control circuit 334 drives a VCM 358 of a positioner and a lens actuator 360 which are provided for the optical unit 302, thereby performing a seek control and a tracking control. For the seek control and the tracking control, a tracking error signal TES detected by a tracking error detecting circuit (TES circuit) 352 on the basis of the light reception signal of the light receiving unit 348 provided for the optical unit 302 is inputted to the servo control circuit 334. A position sensor (LPOS sensor) 356 for detecting the position of the lens is provided for the optical unit 302 and receives the lens position detection signal LPOS. Further, the servo control circuit 334 drives a focusing actuator 362 provided for the optical unit 302, thereby performing an automatic focusing control of the objective lens. To perform the automatic focusing control, a focusing error signal FES detected by a focusing error detecting circuit (FES circuit) 354 on the basis of the light reception signal derived from the light receiving unit 348 of the optical unit 302 is inputted. In the recording/reproducing mode by the loading of the MO cartridge 12, the tracking error detecting circuit 352 provided for the optical unit 302 detects a tracking error signal according to a push-pull method. On the other hand, in the reproducing mode by the loading of the CD 14, the tracking error detecting circuit 352 detects a tracking error signal according to a heterodyne method. Ordinarily, a 3-beam system is used to detect the tracking error signal of the CD 14. In the invention, however, since the same optical unit 302 is used with respect to the MO cartridge 12 and CD 14, only one beam can be used to detect the tracking error signal of the CD 14. On the other hand, the same push-pull method as that of the MO cartridge 12 cannot be used because of the relation between a depth of pit of the CD and a wavelength of 680 nm of the laser diode which is used. Therefore, the heterodyne method is used to detect the tracking error signal of the CD 14. The details of the tracking error detecting circuit 352 will be obviously described hereinlater. The spindle control circuit 336 controls the spindle motor 60. The spindle control circuit 336 controls the spindle motor 60 on the basis of a constant angular velocity control (hereinafter, simply referred to as a "CAV control") in the recording/reproducing mode of the MO cartridge 12. On the other hand, when the CD 14 is reproduced, the spindle motor 60 is controlled by a constant linear velocity control (hereinafter, simply referred to as a "CLV control") in principle and the control mode can be switched to the CAV control as necessary. With regard to the CLV control of the CD, in order to improve a transfer speed for a standard speed which has been predetermined on the standard, for example, a times-speed control such as 2-times speed, 3-times speed, 4-times speed, 6-times speed, and the like can be performed. In the CAV control of the MO cartridge, a speed switching for reducing a rotational speed for a standard rotational speed is executed for the improvement of a recording density of the medium. The details of the spindle control circuit 336 will be also clearly described hereinlater. The motor control circuit 338 drives the load motor 112 and ejection motor 126 provided for the driving system unit 304 and, further, the bias magnet 107 for applying an external magnetic field in the writing mode and erasing mode of the MO cartridge 12. The load motor 112 is controlled on the basis of a detection signal of the load switch 172 provided for the driving system unit 304. The detection signal of the load switch 172 is supplied to the motor control circuit 338 via a sensor adapter 342. That is, when the CD 14 mounted on the CD carrier 16 or the MO cartridge 12 is inserted from the inserting/ejecting port, the load switch 172 is switched to a load detecting position at a predetermined inserting position and outputs the detection signal. In response to it, the motor control circuit 338 drives the load motor 112, thereby loading the medium. The ejection motor 126 receives a detection signal of the ejection switch when the ejection switch knob 22 provided for an apparatus panel in FIG. 1 is depressed and is activated and pushes and returns the load plate 130 to the initial position as shown in FIG. 11, thereby allowing the ejecting operation of the medium to be executed. The medium ejected by this ejecting operation results in that the load switch 172 is switched to the reverse direction, so that the motor control circuit 338 rotates the load motor 112 in the unloading direction, thereby allowing the ejected medium to be fed to the inserting/ejecting port. Further, a medium sensor 364 is provided for the driving system unit 304. Three pin switches 222, 224, and 226 arranged on the sensor holder 220 in FIG. 18 are used as a medium sensor 364. For example, three medium detection signals shown in FIG. 19 are generated from the medium sensor 364. By inputting the sensor outputs to the MPU 306 via the sensor adapter 342, the medium identification contents as shown in FIG. 19 can be recognized. Further, a mode change-over switch 340 is provided for the bus 308 of the MPU 306. The mode change-over switch 340 sets a mode of each of the speed control system of the MO cartridge 12 and the speed control system of the CD 14 in the spindle control circuit 336. Selection information of the rotational speed corresponding to the data transfer speed is also included in the mode setting. Further, selection information about the selection between the CLV control and the CAV control is also included with regard to the CD 14. For example, a dip switch or the like is used as a mode change-over switch 340. Upon set-up at the time of turn-on of a power source, the MPU 306 fetches the mode set information of the mode switch 340 and selects and sets the necessary speed control system for the spindle control circuit 336. In the mode setting by the mode change-over switch 340, it can be also set by a software by a command from the upper host computer.

Figure 27:
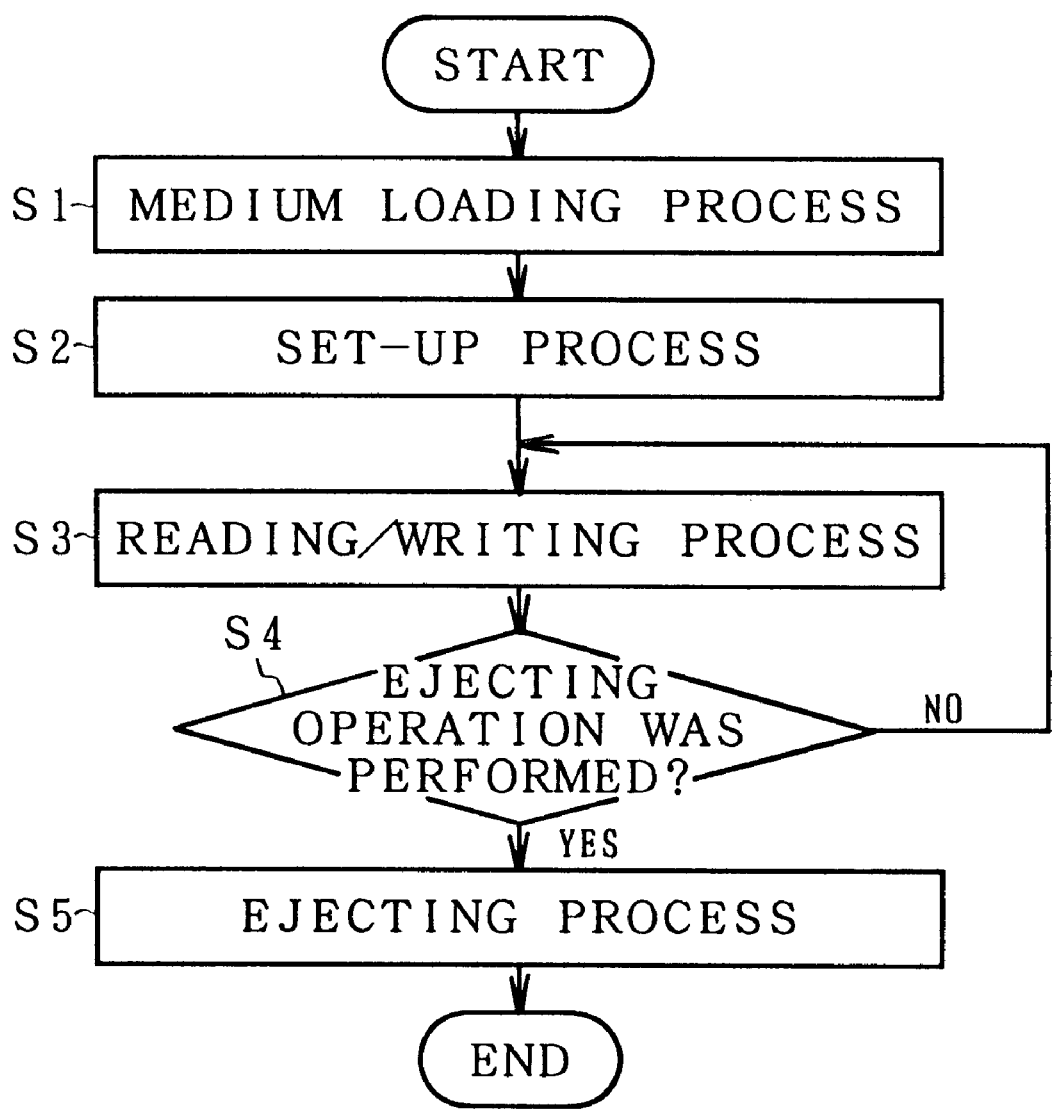
FIG. 27 is a flowchart for the fundamental operation of the invention.

FIG. 27 is a flowchart for a fundamental drive processing operation in the hardware in FIG. 26. First in step S1, the medium loading process is executed by waiting for the insertion of the MO cartridge 12 or the CD 14 mounted on the CD carrier 16. By the medium loading process, when the loading of the MO cartridge 12 or the CD 14 mounted on the CD carrier 16 to the spindle motor is completed, the set-up process in step S2 is executed. In the set-up process, the spindle control circuit 336 based on the loaded medium detection information, the tracking error detecting circuit 352 provided for the optical unit 302, and further, the signal processing system of the MO system or CD system provided for the control unit 300 are set up, respectively. As a set-up, there are an initializing process, an initialization diagnosing process, a switching process according to the medium detection result, a setting process of various correct and error parameters corresponding to the medium detection result, and the like. After completion of the set-up process in step S2, the processing routine advances to a reading/writing process in step S3. Namely, when an access command is received from the upper host computer, the reading operation or writing operation according to a command decoding result is executed. During the reading/writing process in step S3, the presence or absence of an ejecting operation is checked in step S4. When the ejecting operation is discriminated, step S5 follows and an ejecting process of the medium is executed.

[Host interface]

Figure 28:
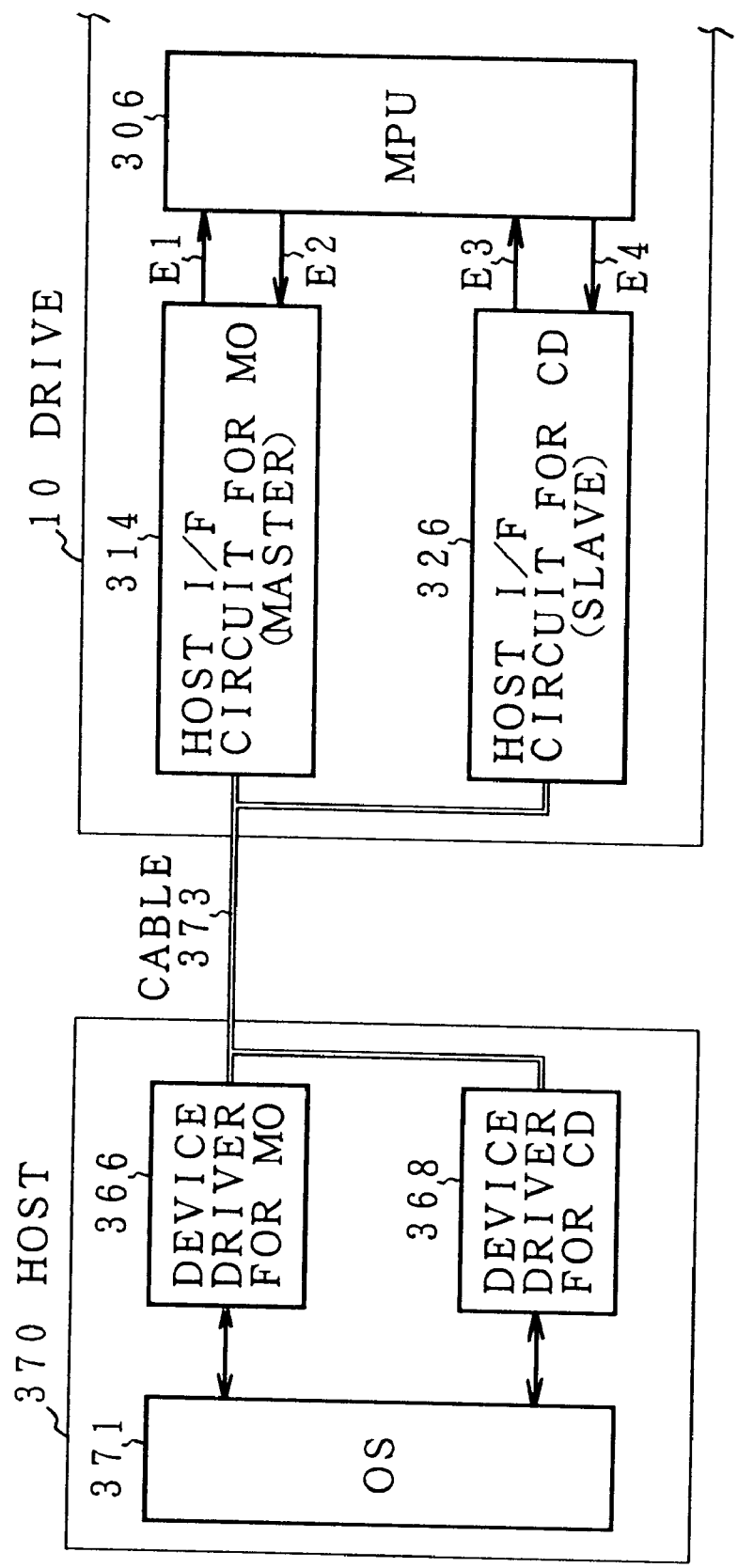
FIG. 28 is a block diagram of a host interface of the invention.

FIG. 28 is a block diagram of a host interface between the control unit 300 in FIG. 26 and the upper host computer. In the optical disk drive 10 of the invention, the host I/F circuit 314 for MO and the host I/F circuit 326 for CD are individually provided. The host I/F circuit 314 for MO and the host I/F circuit 326 for CD output interruption request signals E1 and E3 based on a command from a host computer 370 received to the MPU 306, execute signal processes for MO or CD in FIG. 26 and various controls under the control of the MPU, return the results as response signals E2 and E4 to the host I/F circuits 314 and 326, and perform a necessary response to the host computer 370. In the optical disk drive 10 of the invention, by individually providing the host I/F circuit 314 for MO and the host I/F circuit 326 for CD, the host computer 370 is allowed to recognize the existence of two devices by the host interface which is connected to the host computer 370 via a cable 373. Therefore, different ID numbers which are used for the host interfaces have been preset for the host I/F circuit 314 for MO and the host I/F circuit 326 for CD, respectively. For example, when an ATAPI (AT attachment packet interface) as one of the standards of the peripheral device interface is used as a host interface, a master is set into the host I/F circuit 314 for MO as an ID number and a slave is set into the host I/F circuit 326 for CD. When a fast SCSI-2 is used as a host interface, it is sufficient to set two device numbers among the device numbers #0 to #7 into the host I/F circuit 314 for MO and the host I/F circuit 326 for CD. For the two host I/F circuits 314 and 326 of the optical disk drive 10 of the invention having the individual ID numbers, on the host computer 370 side, ordinarily, two drivers of a device driver 366 for MO and a device driver 368 for CD exist depending on a device control software (DIOS) under the domination of an OS 371. For the two device drivers 366 and 368 of the host computer 370, although the optical disk drive 10 of the invention is physically one device, it can be allocated as two independent devices in the host interface. Therefore, although the optical disk drive 10 of the invention can access the MO cartridge 12 and CD 14 by using the same mechanism, the host computer 370 can request an input and an output on the assumption that both of the disk driver for MO and the CD player effectively exist without being aware of a physical single construction of the optical disk drive 10.

Figure 29:
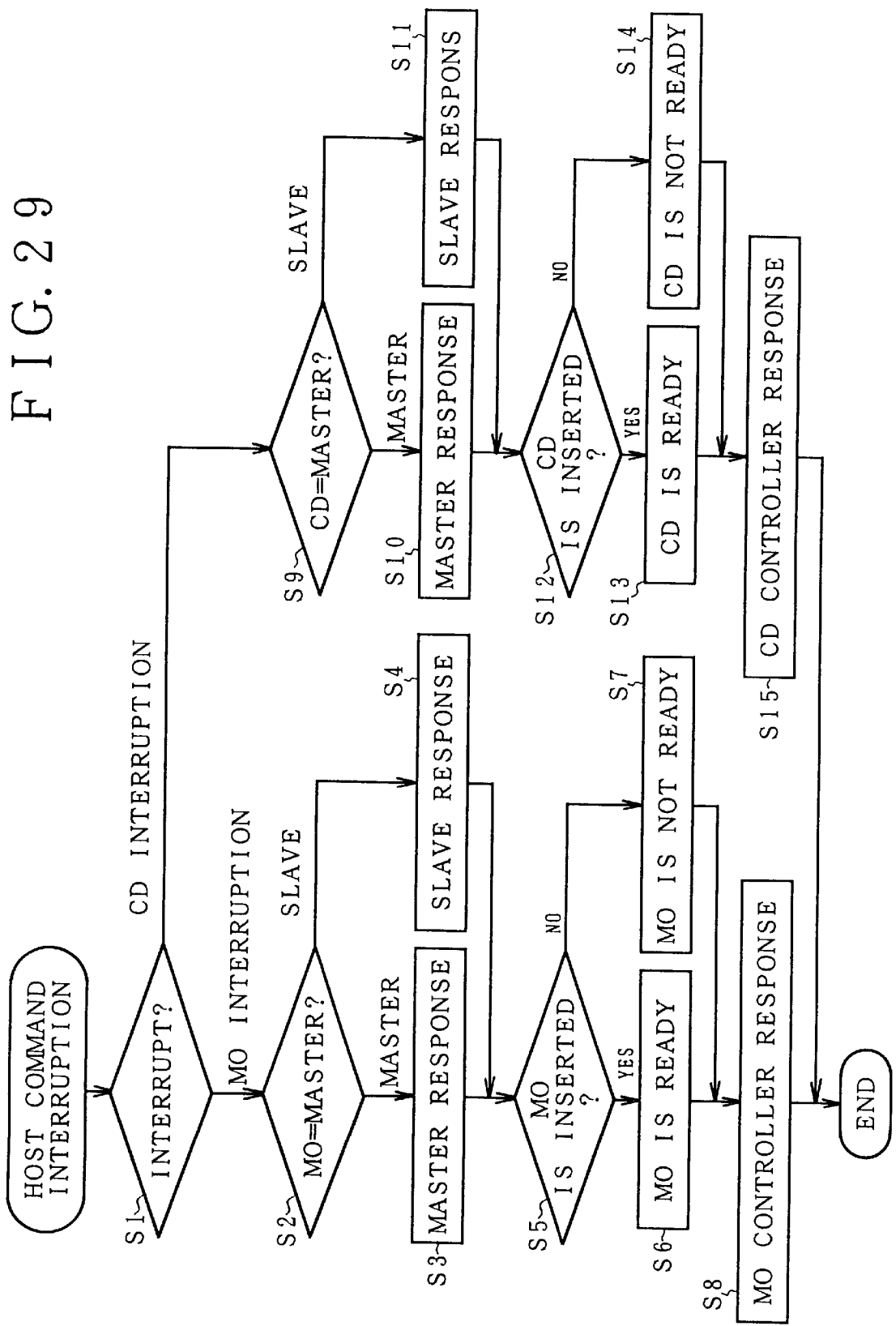
FIG. 29 is a flowchart for processes of an MPU in response to an interruption of a host command in FIG. 28.

A flowchart of FIG. 29 shows processes for a host command interruption of the MPU 306 when using the ATAPI as a host interface of FIG. 28 and relates to the case where the host I/F circuit 314 for MO is set to a master and the host I/F circuit 326 for CD is set to a slave. In case of the ATAPI, the master and slave can be set by an external switch provided for the interface circuit. It is now assumed that the host computer 370 designates "ID=master" for an input/output request to the MO drive and generates a host command. Although the host command is received by each of the host I/F circuit 314 for MO and the host I/F circuit 326 for CD, the host I/F circuit 314 for MO in which (ID=master) was set recognizes that the command is a host command to itself from an ID parameter in the command, and generates the interruption signal E1 to the MPU 306. The MPU 306 checks the interruption in step S1. When receiving the interruption from the MO side, step S2 follows and a check is made to see if the ID number of the host I/F circuit 314 for MO indicates the master. In this instance, since the host I/F circuit 314 for MO has been set to the master, step S3 follows. A master response flag to perform a response to the host command from the host I/F circuit 314 for MO is set. Subsequently, the MPU 306 advances to step S5 and checks to see if the MO cartridge has been inserted. If YES, an MO ready is set in step S6. In step S8, the MO controller is activated and a response process for recording or reproduction is executed. When the MO cartridge is not inserted, an MO not ready is set in step S7. The MO not ready is returned as an MO controller response in step S8. When the host computer 370 generates a host command which designates "ID=slave" for the input/output request to the CD player, the host I/F circuit 326 for CD recognizes that the command is a host command to itself, so that it generates an interruption signal E2 to the MPU 306. Therefore, when receiving the interruption from the CD side in step S1, the MPU 306 progresses to step S9 and checks to see if the ID number of the host I/F circuit 326 for CD indicates the slave. The processing routine advances to step S11 and a slave response flag to perform a response to the host command from the host I/F circuit 326 for CD is set. When the CD carrier is inserted in step S12, a CD ready is set in step S13. In step S15, a CD controller is activated and a response process for reproduction is executed. When the CD carrier is not inserted, an CD not ready is set in step S14. In step S15, a CD not ready is returned as a CD controller response.

[Tracking error detecting process]

Figure 30:
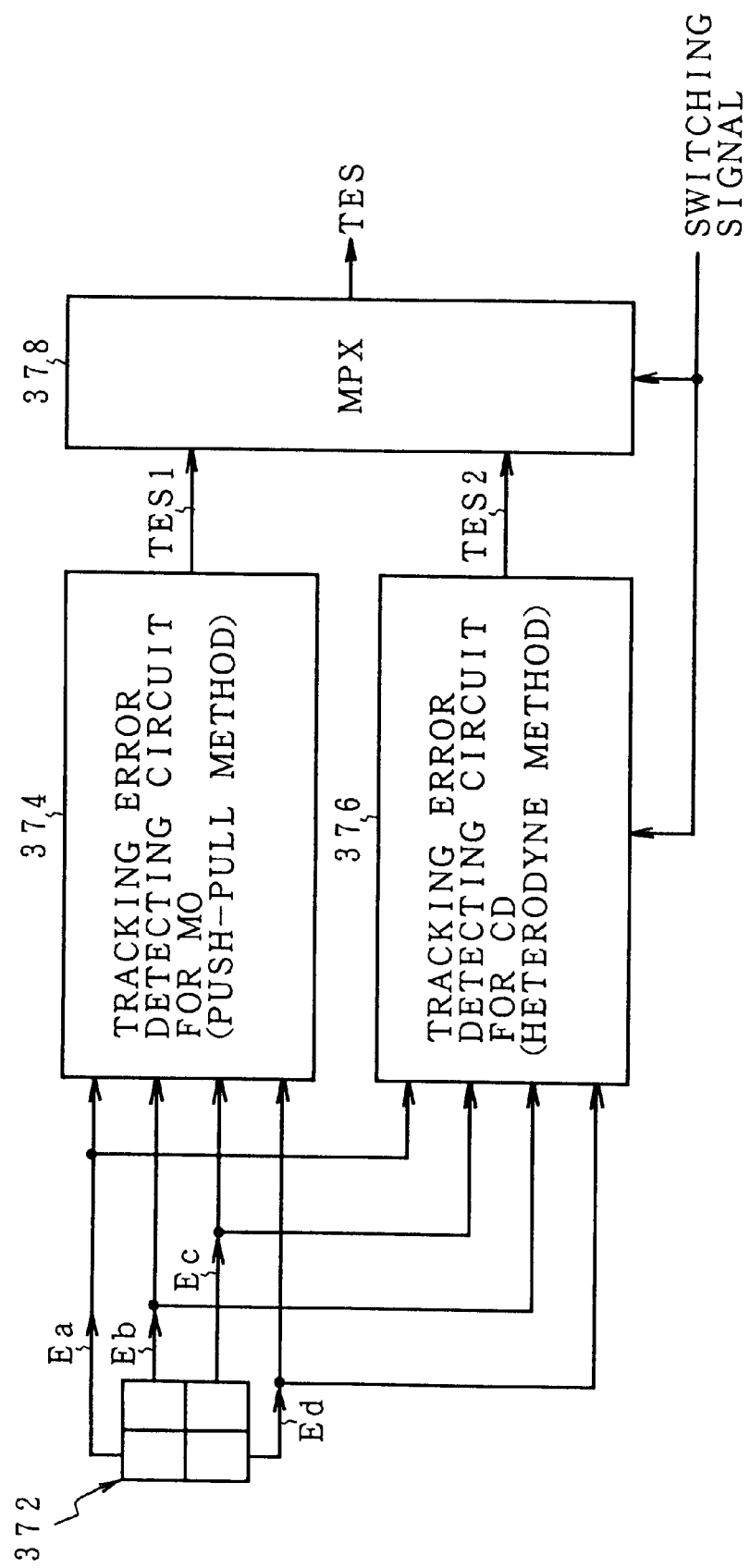
FIG. 30 is a block diagram of a tracking error detecting circuit of the invention.

FIG. 30 is a block diagram of the tracking error detecting circuit 352 in FIG. 26. A reflected light of a laser beam for the optical disk of the MO cartridge 12 or the CD 14 mounted on the CD carrier 16 is formed as an image onto a 4-split photodetector 372. Therefore, the 4-split photodetector 372 generates light reception signals Ea, Eb, Ec, and Ed in correspondence to the dividing positions, respectively. A tracking error detecting circuit 374 for MO and a tracking error detecting circuit 376 for CD are individually provided for the 4-split photodetector 372. The tracking error detecting circuit 374 for MO detects a tracking error detection signal TES1 by the push-pull method. The tracking error detecting circuit 376 for CD detects a tracking error signal TES2 by the heterodyne method. Either one of the detection signals TES1 and TES2 of the tracking error detecting circuits 374 and 376 is selected by a multiplexer 378 and is outputted as a tracking error signal TES. The multiplexer 378 selects an output of the tracking error detecting circuit 374 for MO upon recording and reproduction of the MO cartridge 12 and selects an output of the tracking error detecting circuit 376 for CD upon reproduction of the CD 14 by a switching signal from the MPU 306. Further, the switching signal from the MPU 306 is inputted to the tracking error detecting circuit 376 for CD, thereby switching a low band cut-off frequency of a high pass filter provided for the tracking error detecting circuit 376 for CD in accordance with a seeking speed.

The reason why the heterodyne method is used for the tracking error detecting circuit 376 for CD will now be described. Ordinarily, the tracking error detecting circuit for CD uses a 3-beam system. In the optical disk drive of the invention, however, the recording and reproduction of the magneto-optical disk of the MO cartridge 12 and the CD 14 have to be performed by using the common optical system. In the detection of the tracking error of the MO cartridge 12, one beam by the push-pull method is used and the ordinary 3-beam system in the CD cannot be used. Therefore, it is sufficient to use the same push-pull method of one beam as that for the MO cartridge for the tracking error detection for CD. In this case, with respect to the conventional laser beam of a wavelength 780 nm of a low recording density, since a depth of pit of the CD is equal to or less than $\lambda/4$, the tracking error by the push-pull method can be detected. In the embodiment of the invention, however, a laser beam of a short wavelength of 680 nm is used in order to raise a recording density. In the laser beam of the wavelength of 680 nm, a pit depth of CD is equal to or larger than $\lambda/4$. According to the push-pull method whereby the tracking error signal is detected from a difference between the two light reception signals derived from a 2-split photodetector, the tracking error signal is lost and cannot be detected. According to the invention, therefore, the heterodyne method whereby the tracking error signal can be detected even in case of the wavelength of 680 nm irrespective of the pit depth is used.

Figure 31:
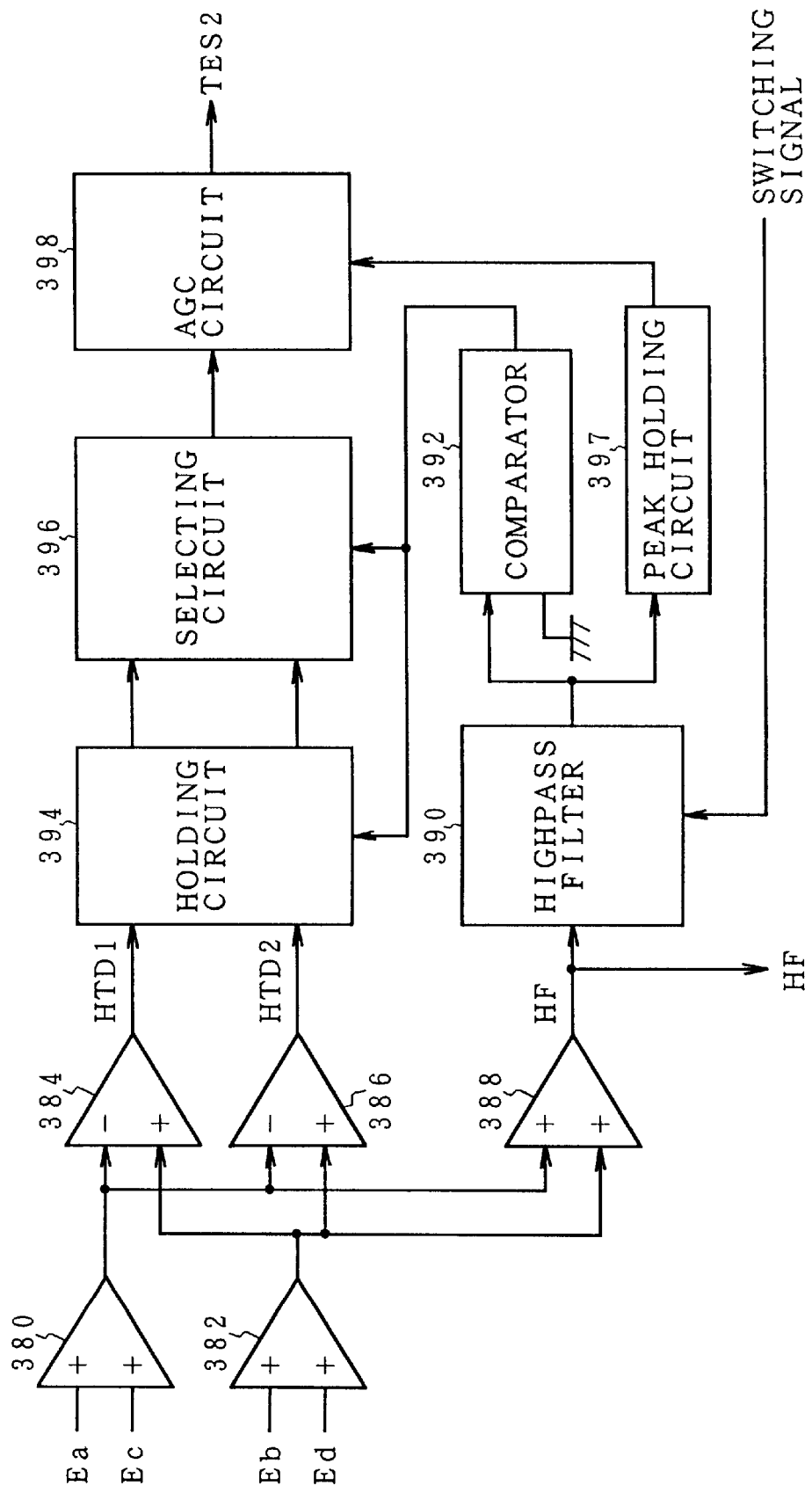
FIG. 31 is a block diagram of a tracking error detecting circuit for a CD in FIG. 30.

FIG. 31 is a block diagram of the tracking error detecting circuit 376 for CD using the heterodyne method of FIG. 30. In the block diagram, with respect to the four light reception signals Ea, Ec, Eb, and Ed from the 4-split photodetector 372, addition signals (Ea+Ec) and (Eb+Ed) are obtained by adders 380 and 382. Subsequently, two heterodyne signals are obtained as [(Eb+Ed)−(Ea+Ec)] and [(Ea+Ec)−(Eb+Ed)] by adders 384 and 386. Further, an addition signal (Ea+Eb+Ec+Ed) of four signals is obtained by an adder 388. An addition signal HF of the adder 388 is a signal which changes like a sine wave when a beam spot transverses a pit train of CD and causes an envelope change such that an amplitude is small at a pit edge and is maximum at a pit center and decreases at the pit edge. On the other hand, a heterodyne signal HTD1 which is obtained by the adder 384 is a signal whose phase is shifted by 90° for the phase of the addition signal HF and its amplitude changes such that it is equal to 0 at a pit center and is maximum between pits. A heterodyne signal HTD2 of the adder 386 is a signal obtained by inverting the phase of the heterodyne signal HTD1 of the adder 384. From the addition signal HF from the adder 388, low band components of a predetermined low band cut-off frequency or lower are eliminated by a high pass filter 390. After that, the signal HF is inputted to a comparator 392 and a peak holding circuit 397. The comparator 392 operates as a zero-cross comparator, detects a zero-cross timing of the addition signal HF from the adder 388, and outputs a sampling pulse to a peak holding circuit 394. Each time the sampling pulse is obtained by the zero-cross detection of the comparator 392, the peak holding circuit 394 samples and holds the two heterodyne signals HTD1 and HTD2 outputted from the adders 384 and 386 at a peak timing of the sine wave and individually outputs. The heterodyne signal HTD2 is a signal whose phase is inverted by 180° for the phase of the heterodyne signal HTD1. When the holding level of the heterodyne signal HTD1 at the sampling timing is at the (+) level, the holding level of the heterodyne signal HTD2 is at the (−) level. The holding circuit 394, therefore, inverts the polarity of the holding signal of the heterodyne signal HTD2 and outputs the inverted signal to a selecting circuit 396. The selecting circuit 396 forms a tracking error signal by alternately switching the two holding signals from the holding circuit 394 at a sampling timing in association with the zero-cross detection of the addition signal HF by the comparator 392. The tracking error signal from the selecting circuit 396 is sent to an AGC circuit 398 and is subjected to a correction by a gain setting such that the peak level at the pit center of the addition signal HF obtained from the peak holding circuit 397 at that time is set to a predetermined standardized level. The resultant corrected signal is outputted as a tracking error signal TES2 for CD detected by the heterodyne method. The low band cut-off frequency of the high pass filter 390 is switched by a switching signal from the MPU. The switching signal switches the low band cut-off frequency in accordance with the seeking speed of the pickup. Namely, upon low speed seek by the movement of the carriage 118 in the mechanism unit 101 in FIG. 12 by the VCM 358 in FIG. 26, the lower low band cut-off frequency according to the frequency of the tracking error signal TES2 for CD which is obtained by the low speed seek is set. On the contrary, upon high speed seek, the high pass filter 390 is switched to a higher low band cut-off frequency depending on the high seeking speed by the switching signal.

Figure 32A:
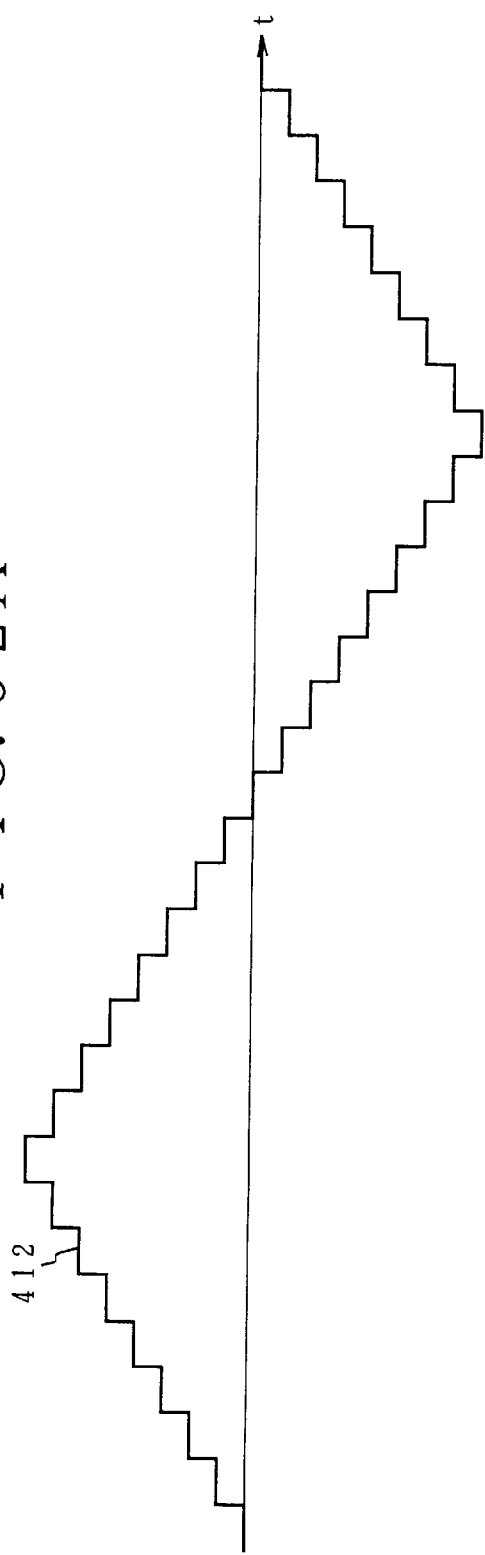
FIGS. 32A and 32B are time charts of tracking error signals at the times of a low-speed seek and a high-speed seek in FIG. 27.
Figure 32B:
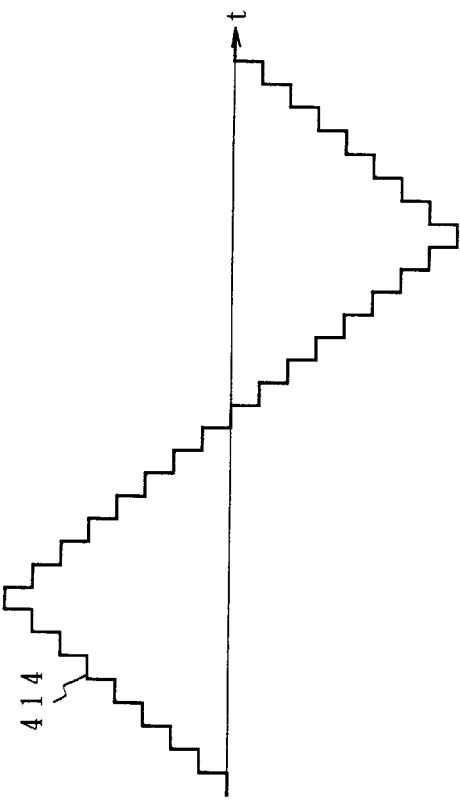

FIG. 32A shows a tracking error signal 412 which is obtained by the heterodyne method in FIG. 31 by the low speed seek. On the other hand, for example, when the seeking speed is changed to a high speed of the double speed, a tracking error signal 414 in FIG. 32B is obtained. When the seeking speed is changed to the high speed as mentioned above, the frequency of the addition signal HF from the adder 388 in FIG. 31 which is used to form the tracking error signal increases. When the low band cut-off frequency at the time of the low speed seek is used, the low band components are not sufficiently cut and the zero-cross timing cannot be accurately detected. Upon high speed seek, the low band cut-off frequency of the high pass filter 390 is raised and the low band components are sufficiently eliminated so that the sine wave frequency according to the high speed seek can be accurately reconstructed. The zero-cross timing is certainly detected, thereby enabling the tracking error signal to be accurately formed.

Figure 33:
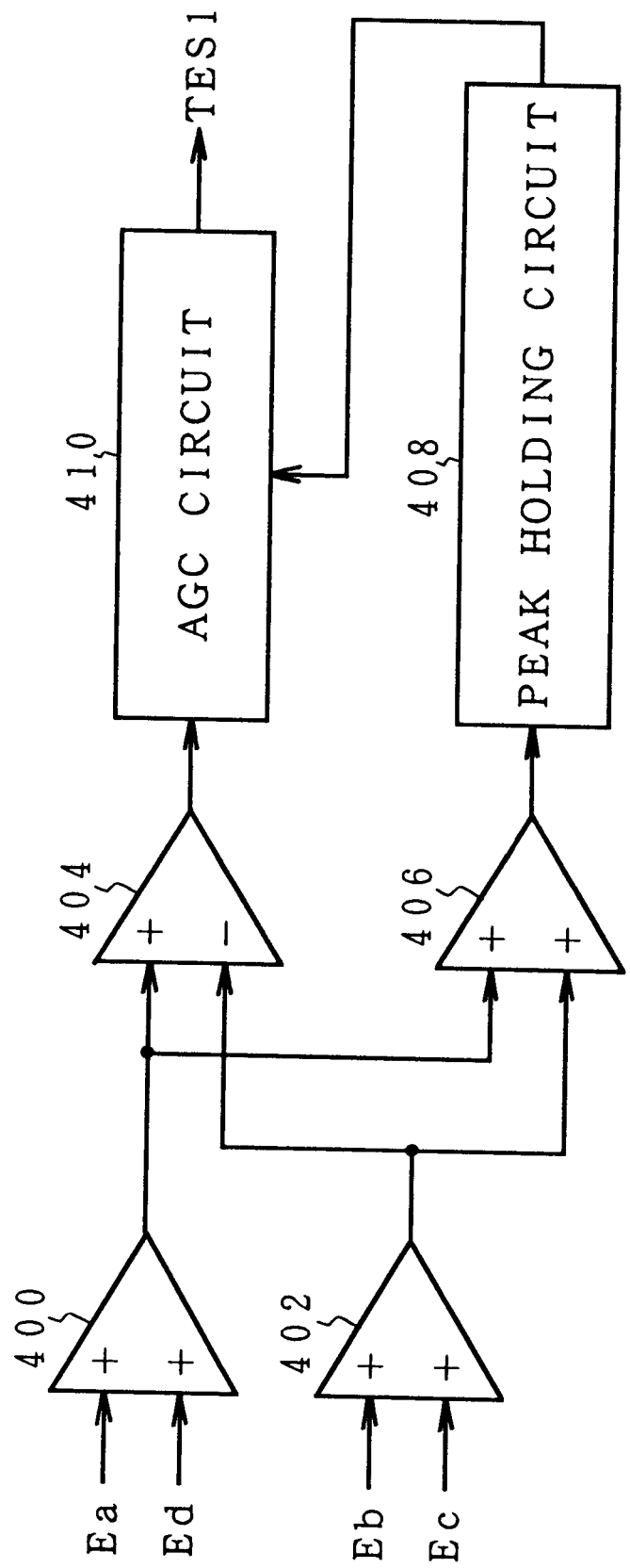
FIG. 33 is a block diagram of a tracking error detecting circuit for an MO in FIG. 30.

FIG. 33 is a block diagram of the tracking error detecting circuit 374 for MO in FIG. 30. In the tracking error detecting circuit 374 for MO using the push-pull method, four light reception signals from the 4-split photodetector 372 are converted into the light reception correspondence signals (Ea+Ed) and (Eb+Ec) of the 2-split photodetector by adders 400 and 402. A tracking error signal is formed by an adder 404 as a difference [(Ea+Ed)−(Eb+Ec)] between those light reception correspondence signals. An addition signal (Ea+Eb+Ed+Ec) is obtained by an adder 406 and its peak level is detected by a peak holding circuit 408 and supplied to an AGC circuit 410. A gain to adjust the peak holding value to a preset standardized level is obtained. The tracking error signal derived from the adder 404 is corrected by the gain and the resultant corrected signal is outputted as a tracking error signal TES1 for MO. In the embodiment of the invention, since the use wavelength of the laser diode is equal to 680 nm, the heterodyne method is used to detect the tracking error signal for CD. However, when the use wavelength of the laser beam is equal to 780 nm, the pit depth of CD is equal to or less than $\lambda/4$ and the tracking error detection signal by the push-pull method can be detected. In this case, with respect to the tracking error detecting circuit for CD, it is also sufficient to construct so as to detect the tracking error by the push-pull method.

[Set-up and spindle control]

(1) CAV control and CLV control

Figure 34:
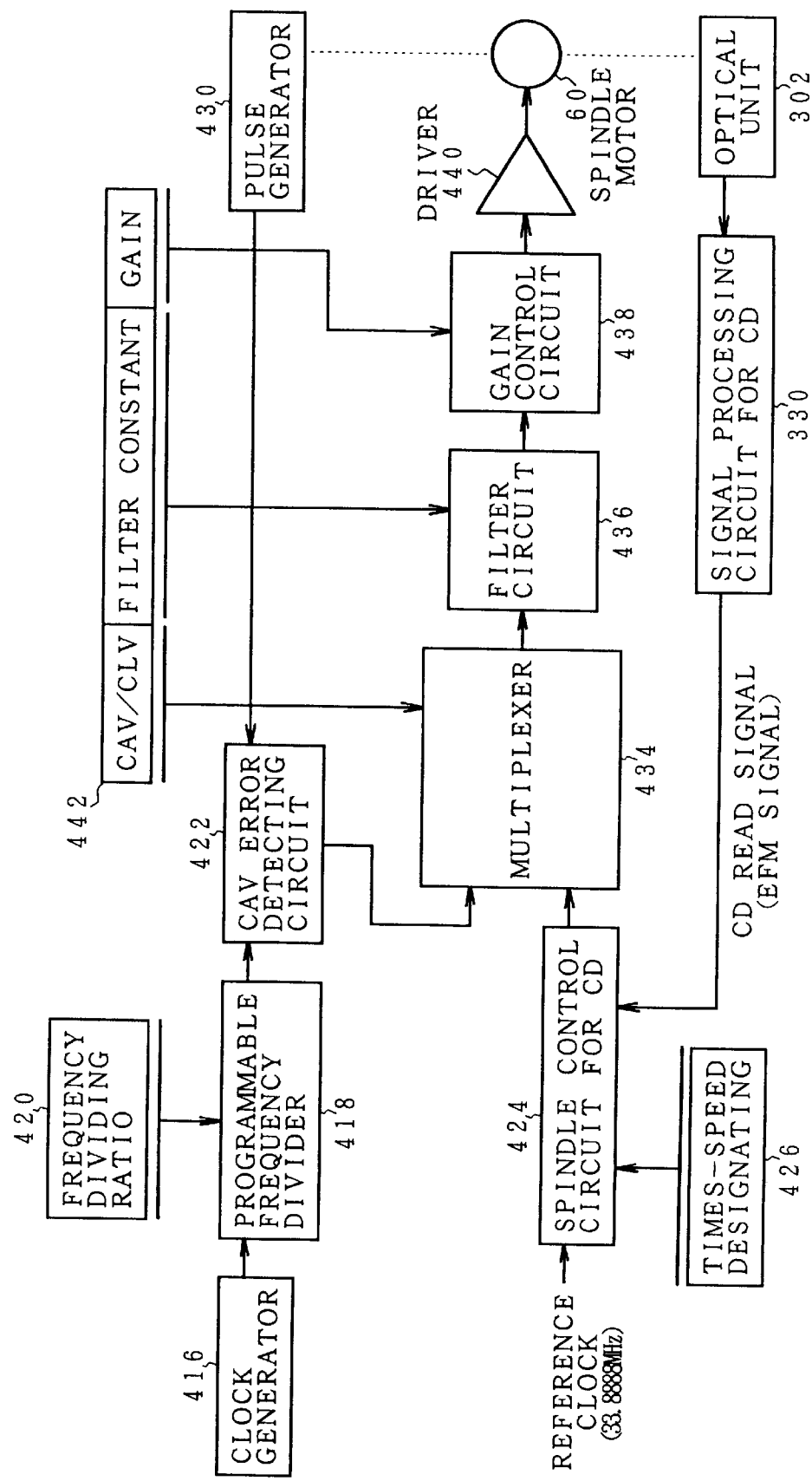
FIG. 34 is a block diagram of a spindle control circuit for enabling a CAV control and a CLV control to be switched.

FIG. 34 is a block diagram of the spindle control circuit 336 in FIG. 26. The spindle control circuit realizes the CAV control which is used for recording and reproduction of the MO cartridge 12 and the CLV control which is used upon reproduction of the CD 14. Further, upon reproduction of the CD 14, the spindle control circuit enables the switching between the CLV control and the CAV control. In FIG. 34, a clock generator 416, a programmable frequency divider 418, a register 420 for setting a frequency dividing ratio of the programmable frequency divider 418, and a CAV error detecting circuit 422 to perform the CAV control are first provided. The clock generator 416 generates a clock pulse of a predetermined reference frequency. The frequency dividing ratio is set into the programmable frequency divider 418 by the register 420 and the frequency divider 418 outputs a target clock pulse which gives a target rotational speed of a frequency obtained by dividing the clock frequency in accordance with the frequency dividing ratio to the CAV error detecting circuit 422. As for the target frequency clock which gives the target speed by the programmable frequency divider 418, the set frequency dividing ratio is changed by an instruction from the MPU 306 in accordance with a spindle rotational speed of the CAV control which is determined by a recording density of the medium. A rotation detection pulse from a pulse generator 430 provided for the spindle motor 60 is inputted to the CAV error detecting circuit 422. In place of the pulse generator 430, a rotational speed can be also detected from a Hall element or a counter electromotive force of a motor. The CAV error detecting circuit 422 detects a phase difference between the target frequency clock (reference speed clock) from the programmable frequency divider 418 and the rotation detection pulse from the pulse generator 430 as an error. The error signal is supplied to a filter circuit 436 through a multiplexer 434 and is subjected to a predetermined gain control by a gain control circuit 438. After that, a current according to the error is supplied to the spindle motor 60 by a driver 440, thereby performing the CAV control. On the other hand, a spindle control circuit 424 for CD and a register 426 for designating a times-speed are provided for the CLV control. The spindle control circuit 424 for CD compares a frame sync signal of CD demodulated by the optical unit 302 and signal processing circuit (CD decoder) 330 for CD with a reference frame sync signal obtained by frequency dividing a fundamental clock in accordance with the times-speed designation of the register 426, thereby detecting a phase difference. The current according to the error is supplied to the spindle motor 60 by the multiplexer 434, filter circuit 436, gain control circuit 438, and driver 440, thereby performing the CLV control. In case of the standard speed designation, a frequency of the frame sync signal that is demodulated from the CD is equal to 7.35 kHz. The spindle control circuit 424 for CD accelerates or decelerates the spindle motor 60 in accordance with the track position.

Figure 35A:
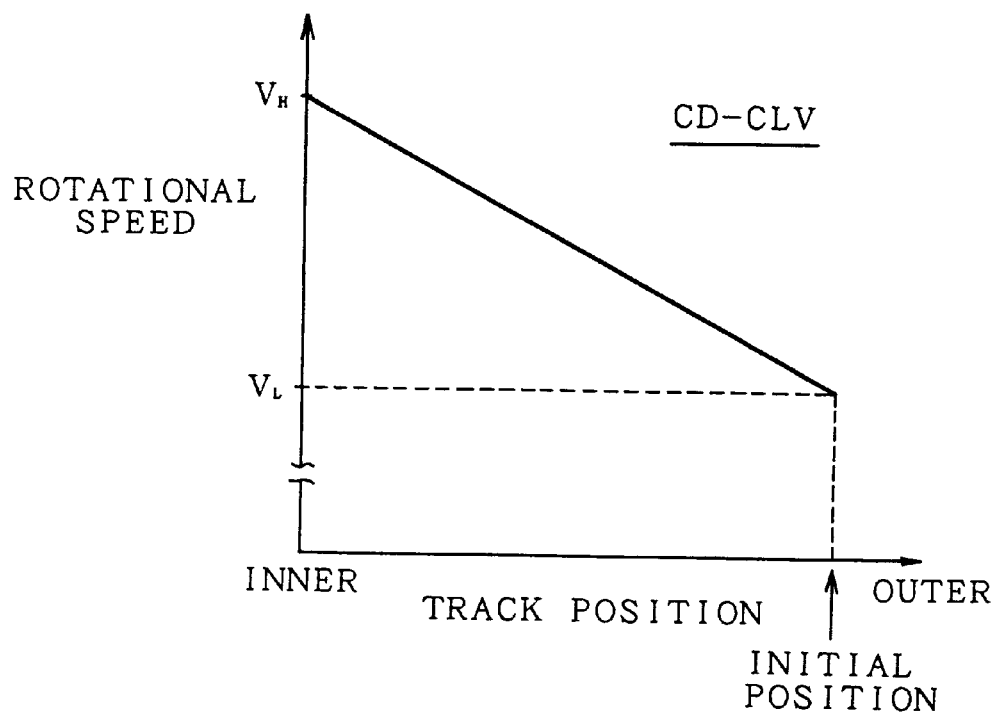
FIGS. 35A and 35B are explanatory diagrams of the relation between a track position in the CLV control and a rotational speed and the relation between the track position in the CAV control and a read clock frequency.
Figure 35B:
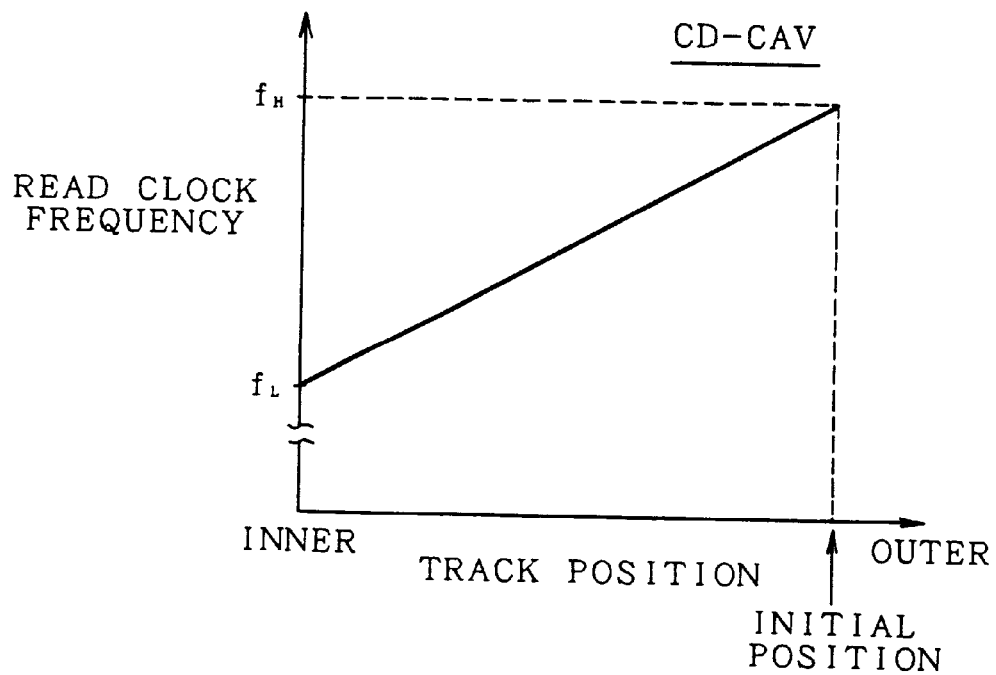

FIG. 35A shows characteristics of the target speed of the spindle motor 60 for the track position in the CLV control. In order to make the linear velocity on the medium constant irrespective of the track position, linear characteristics such that the linear velocity is set to a highest velocity $V_H$ on the inner side and to a lowest velocity $V_L$ on the outer side are set and, in accordance with the track position, the spindle motor is controlled so as to obtain a rotational speed according to the linear characteristics. For example, when the standard speed is designated, the velocity is linearly changed so that the rotational speed is set to 500 r.p.m. for the innermost track and to 200 r.p.m. for the outermost track. Therefore, when the double speed is designated by the register 426, the rotational speed is set to 1000 r.p.m. for the innermost track and to 400 r.p.m. for the outermost track. When the 4-times speed is designated, the rotational speed is set to 2000 r.p.m. at the innermost track and to 800 r.p.m. at the outermost track. Further, when the 6-times speed is designated, the rotational speed is set to 3000 r.p.m. for the innermost track and to 1200 r.p.m. for the outermost track. According to the invention, with respect to the CD 14 on which pits were recorded for such a CLV control as a prerequisite, the CAV control is applied for a high speed data transfer. When the CAV control is executed with regard to the CD 14 on which the pits were recorded for the CLV control as a prerequisite, the reproducing and recording frequency differs depending on the track position. Namely, the pits are recorded on the CD 14 at a constant linear density irrespective of the track position. When the CD 14 is reproduced by the CAV control, namely, at a constant angular velocity rotation, since the reproducing frequency depends on a peripheral speed of the track position, the reproducing frequency is low on the inner side and is high on the outer side. Therefore, when the CD 14 is reproduced by the spindle control by the CAV control, as shown in FIG. 35B, a clock generation such that a read clock frequency is linearly increased from a lowest clock frequency $f_L$ to a highest clock frequency $f_H$ for a change from the inner side to the outer side of the track position has to be performed. Such a function for varying the clock frequency in accordance with the track position which can cope with the CLV control is realized by the CLV control of the signal processing circuit 330 for CD provided for the control unit 300 in FIG. 26 and a bit clock generating function which can cope with the CLV control.

FIG. 36 shows the CAV control and CLV control as a spindle speed control with respect to two kinds of media MO and CD and, further, modes 1 to 8 which can be set by the mode change-over switch 340 in FIG. 26 with respect to the speed in each medium, respectively. Modes 1 to 3 relate to the MO cartridge 12 as a target, codes 111 to 101 are used, and the CAV control is used as a spindle speed control. In case of the medium of 90 mm—MO in modes 1 to 3, recording densities are different and are higher in accordance with the order of modes 1, 2, and 3. The MO medium in mode 1 is an existing medium of a recording capacity of 128 kMB, 230 MB, 540 MB, or 640 MB and its rotational speed N1 is set to, for example, a standard rotational speed N1=3600 r.p.m. Mode 2 relates to an MO medium of a recording capacity of, for example, 1 GB. Since the recording density is high, in case of the standard rotational speed N1=3600 r.p.m., since a signal recording and reproducing frequency on the outer side is too high and exceeds an encoding and decoding ability, the rotational speed is reduced to N2=2400 r.p.m.

Mode 3 relates to an MO medium of a recording capacity of, for example, 4.3 GB and the rotational speed is reduced to N3=1800 r.p.m. Modes 4 to 7 relate to 120 mm—CD in the CD 14 which is mounted onto the CD carrier 16 and is loaded. Mode 4 relates to a code 100 and the CAV control is executed as a spindle control. A rotational speed N4 in this case is set to an average conversion value of a 4-times speed of the CLV control. For example, since the 4-times speed of the CLV control of the CD is equal to 2000 r.p.m. at the innermost track and to 800 r.p.m. at the outermost track, N4=1400 r.p.m. is used as an average conversion value. Modes 5 to 7 relate to the CLV control with respect to the 120 mm—CD and the 6-times speed, 4-times speed, or standard speed is applied as a rotational speed. Last mode 8 relates to the 80 mm—CD as a target, the CLV control is used as a spindle control, and the rotational speed is set to the standard speed. The MPU 306 in FIG. 26 identifies the medium in accordance with FIG. 19 from the sensor signal of three bits which is derived from the medium sensor 364 through the sensor adapter 342 when the loading of the medium is finished. On the basis of the specified mode set by the mode change-over switch 340, the switching between the CAV control and the CLV control and the setting of the standard speed or an arbitrary-times speed as a rotational speed are performed for the spindle control circuit 336 with reference to the contents of FIG. 36. The setting by the mode change-over switch 340 is executed one mode by one with respect to each of the MO cartridge 12 in modes 1 to 3 and the CD 14 in modes 4 to 8.

Referring again to the spindle control circuit in FIG. 34, in accordance with the designated mode in FIG. 35, switching information indicative of either one of the CAV control and the CLV control corresponding to the medium loaded at that time has been set in a register 442. Therefore, the multiplexer 434 selects either one of outputs of the CAV error detecting circuit 422 and spindle control circuit 424 for CD in accordance with the selection information of CAV or CLV in the register 442 and establishes a control loop of the selected speed control system. Further, the filter circuit 436 and gain control circuit 438 can set a filter constant and a gain from the outside and are controlled by similarly receiving the setting of the optimum filter constant and optimum gain by the MPU for the register 442. For example, as shown in FIG. 37, with respect to the CAV control, the filter constants and gains have been prepared for modes 1 to 4. When the MO cartridge 12 is recognized by the medium identification, the filter constant and gain corresponding to the mode number set at that time are set into the register 442. The filter circuit 436 is controlled to the optimum filter constant and the gain control circuit 438 is controlled to the optimum gain. Further, in FIG. 37, as for the frequency dividing ratio for allowing the programmable frequency divider 418 to generate the target frequency clock of the CAV control, values DV1, DV2, DV3, and DV4 corresponding to the rotational speeds N1, N2, N3, and N4 in FIG. 36 have been stored. FIG. 38 shows filter constants and gains with respect to modes 5 to 8 for the CLV control as a target and times-speed designation in the CLV control has also been stored together.

(2) Automatic switching by medium detection

Figure 39:
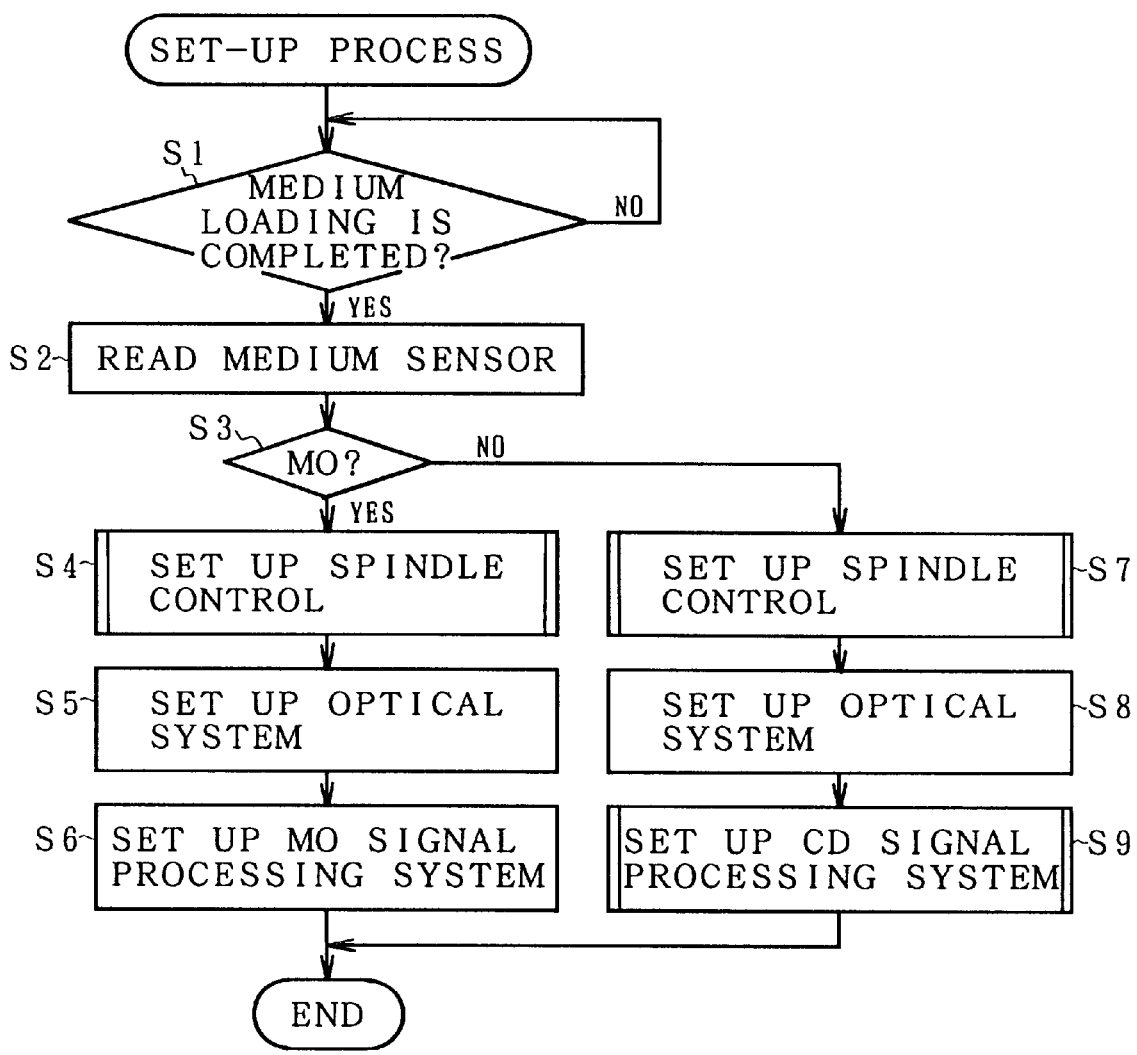
FIG. 39 is a flowchart for a set-up process in association with the loading of a medium.

A set-up process until the access from the host computer side is enabled after completion of the medium loading in the optical disk drive 10 of the invention will now be described. FIG. 39 is a fundamental flowchart for the set-up process in the optical disk drive of the invention. In step S1, when the loading of the MO cartridge 12 or the CD 14 mounted on the CD carrier 16 is completed, the detection information of the medium sensor 364 is read in step S2. On the basis of the medium sensor information which was read, a check is fundamentally made to see if the inserted medium is the MO cartridge 12 or CD 14 with reference to the control information in FIG. 19. In case of the MO cartridge, step S4 follows and the spindle control is set up. In the set-up of the spindle control, the CAV control and the standard or arbitrary-times speed are set. In step S5, the optical system is set up. In the set-up of the optical system, since the medium is the MO, the tracking error detecting circuit is switched to the tracking error detecting circuit for MO. In step S6, the MO signal processing system is set up. On the other hand, when the medium is judged to be the CD in step S3, step S7 follows. The spindle control for the CD as a target is set up. Upon set-up, the CAV control or CLV control is selected in accordance with the designated mode at that time. With respect to the CLV control, a plurality of target speeds, namely, the standard speed and the arbitrary-times speed are selected. In step S8, the optical system is set up. In the set-up of the optical system, the tracking error detecting circuit is switched to the tracking error detecting circuit for CD using the heterodyne method. In step S9, the CD signal processing system is set up.

Figure 40:
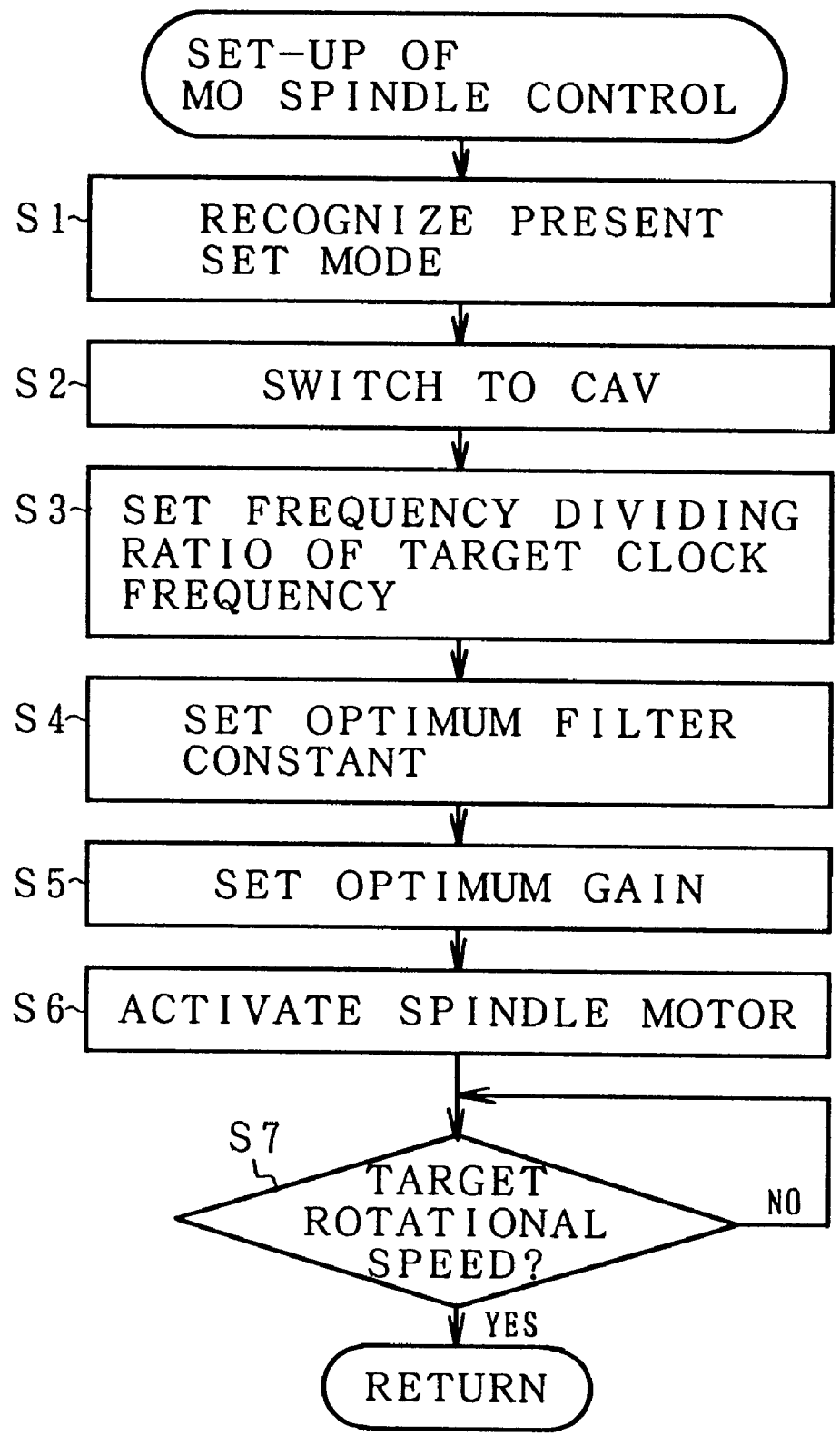
FIG. 40 is a flowchart for a set-up process of an MO spindle control.

FIG. 40 shows a set-up of the spindle control for the MO cartridge 12 shown in step S4 in FIG. 39 as a target. First in step S1, the present set mode is recognized. The set mode for MO as a target is any one of modes 1 to 3 in FIG. 36. Since all of modes 1 to 3 relate to the CAV control in this case, the switching to the CAV control is executed in step S2. Specifically speaking, the multiplexer 434 in FIG. 36 is switched to the CAV error detecting circuit 422 side. In step S3, the frequency dividing ratio to obtain the rotational speed that is decided in the mode at that time is set into the programmable frequency divider 418. A frequency of the target frequency clock for the CAV error detecting circuit 422 is set. In step S4, the optimum filter constant corresponding to the designated mode at that time is set into the filter circuit 436. In step S5, the optimum gain is set into the gain control circuit 438. After completion of the setting and switching of those control parameters, the spindle motor 60 is activated in step S6. When the rotational speed of the spindle motor reaches a target speed in step S7, the processing routine is returned to the main routine in FIG. 39.

Figure 41:
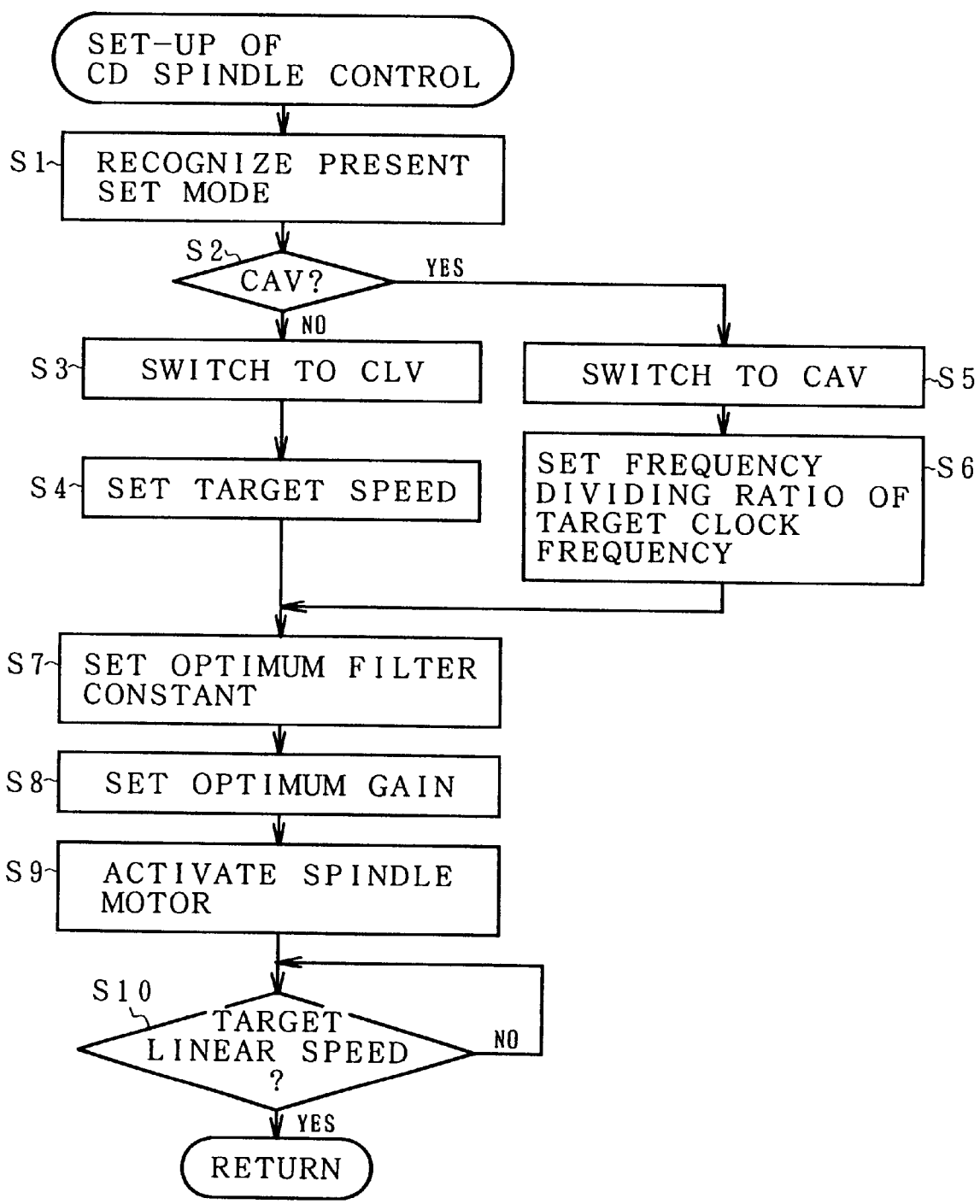
FIG. 41 is a flowchart for a set-up process of a CD spindle control.

FIG. 41 shows the set-up process of the spindle control with respect to the CD in step S7 in FIG. 39. The present mode is recognized in step S1. As for the CD, any one of modes 4 to 8 in FIG. 36 has been set. In step S2, a check is made to see if the control mode is the CLV control. In case of any one of modes 5 to 8, since the CLV control is executed, the processing routine advances to step S3. The multiplexer 434 in FIG. 34 is switched to the CLV error detecting circuit 428 side. A target speed initial value at the outermost track in which the positioner is located at present is set into the spindle control circuit 424 for CD via the register 426. In step S7, the optimum filter constant is set. In step S8, the optimum gain is set. After that, in step S9, the spindle motor is activated. In step S10, when the arrival at the target speed is discriminated, the processing routine is returned to the main routine in FIG. 39. On the other hand, when the present set mode is mode 4 in FIG. 36 and the CAV control has been set in step S2, the processing routine advances to step S5. The multiplexer 434 is switched to the CAV error detecting circuit 422 side. In step S6, the frequency dividing ratio to obtain the target frequency clock at the outermost position where the positioner is located at present is set into the programmable frequency divider 418 via the register 420. In a manner similar to the above, the optimum filter constant in the CLV control is set in step S7. The optimum gain by the CLV control is set in step S8. After that, the spindle motor is activated in step S9. When the rotational speed of the spindle motor reaches the target speed in step S10, the processing routine is returned to the main routine in FIG. 39.

(3) Cache set-up of CD host I/F

Figure 42:
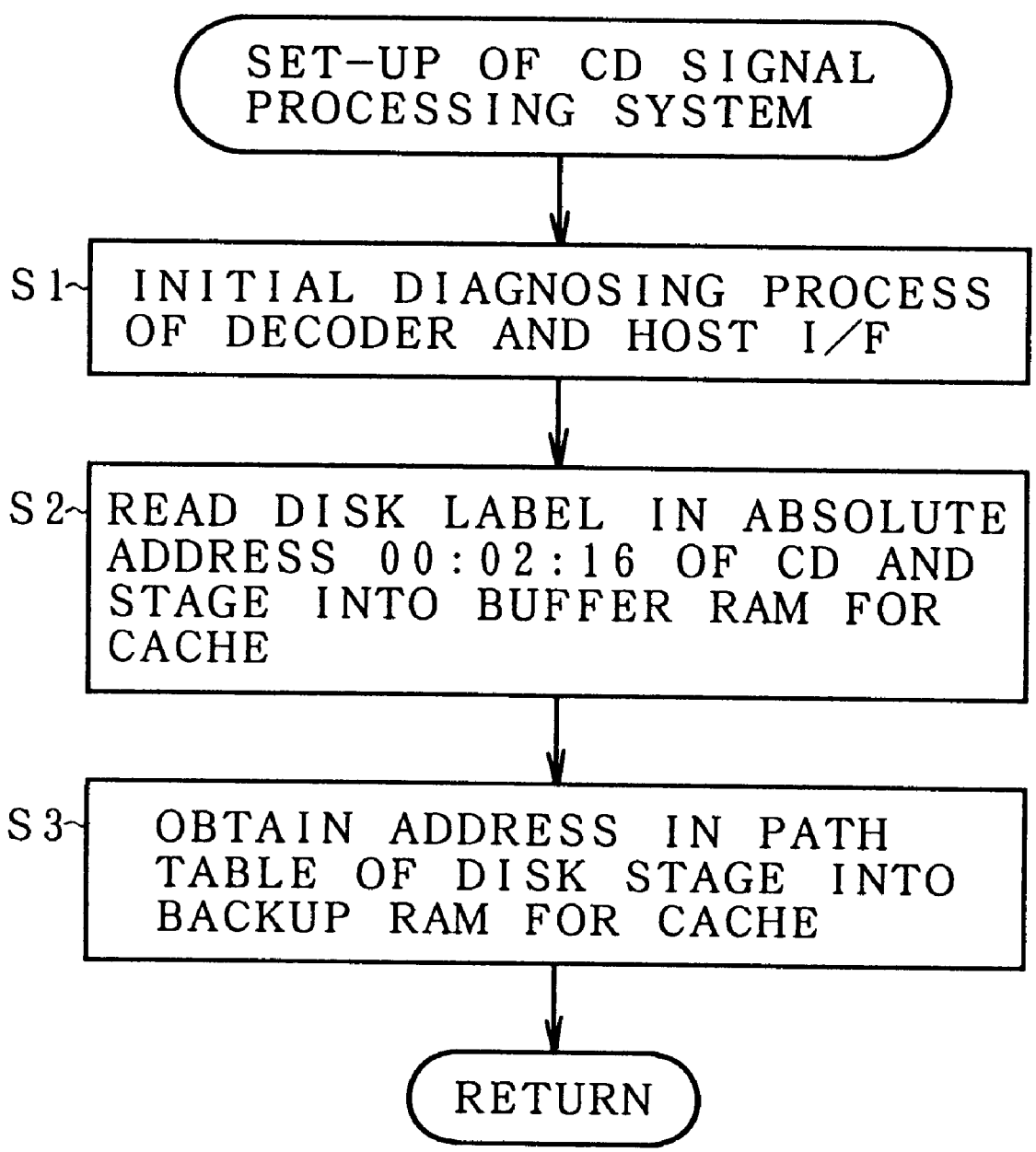
FIG. 42 is a flowchart for staging for a cache of medium data in the set-up process.

FIG. 42 shows a process which is peculiar in the set-up of the CD signal processing system in step S9 in FIG. 39. In the CD processing system of the control unit 300 in FIG. 26, the buffer RAM 328 which operates as a cache is provided for the host I/F circuit 326 for CD. In the ordinary caching, after completion of the set-up, the data provided by a command from the host computer is decoded and the requested data is responded. In this case, the cache cannot be used and a time until the data is first requested after the CD 14 was loaded becomes vain. In addition, since the motor is activated in a stopping state of the spindle motor and an access is enabled, it takes a surplus time for data access. In the invention, therefore, a waiting time for an initializing process after the CD 14 was loaded is effectively used and in order to promptly access the data which is requested first after the CD 14 was inserted, since the data which is requested first from the host computer at the time of the set-up process for initialization of the drive has previously been known with respect to the CD 14, the data that is requested is staged into the buffer RAM 328 at the time of the set-up process, thereby raising a hit ratio of the first data access after the CD 14 was inserted. Generally, the file access from the host computer to the CD signal processing system is executed by the following procedure.

I. A disk label specified in absolute address 00; 02; 16 is read out.

II. An address in a bus table is obtained from the disk label.

III. An address of the file is examined from the bus table and the address is sought.

Namely, in order to obtain the information of the loaded CD 14, first, the reading of the disk label and the detection of the address of the bus table are certainly required. Therefore, at the time of the setup of the optical disk drive, those data is staged into the buffer RAM 328. Namely, as shown in the flowchart of FIG. 42, as a routine for set-up of the CD signal processing system, an initialization diagnosing process of the signal processing circuit 330 for CD, namely, the decoder and the host I/F circuit 326 for CD is executed in step S1. After completion of the initialization diagnosing process, the apparatus seeks to the absolute address 00; 02; 16 of the CD 14 and the disk label is read out and is staged into the buffer RAM for cache in step S2. In step S3, the address of the bus table of the disk is obtained from the staged disk label information and the information of the bus table is also staged into the buffer RAM 328. Therefore, with respect to each request of the reading of the disk label and the address of the bus table which are executed first from the host computer after the set-up process was finished, the CD host I/F circuit 326 causes a cache hit with respect to each buffer RAM 328 and can immediately respond to the host computer without needing the CD access. The processing time until the start of the file access after the CD 14 was inserted can be remarkably reduced.

(4) Error recovery

Figure 43:
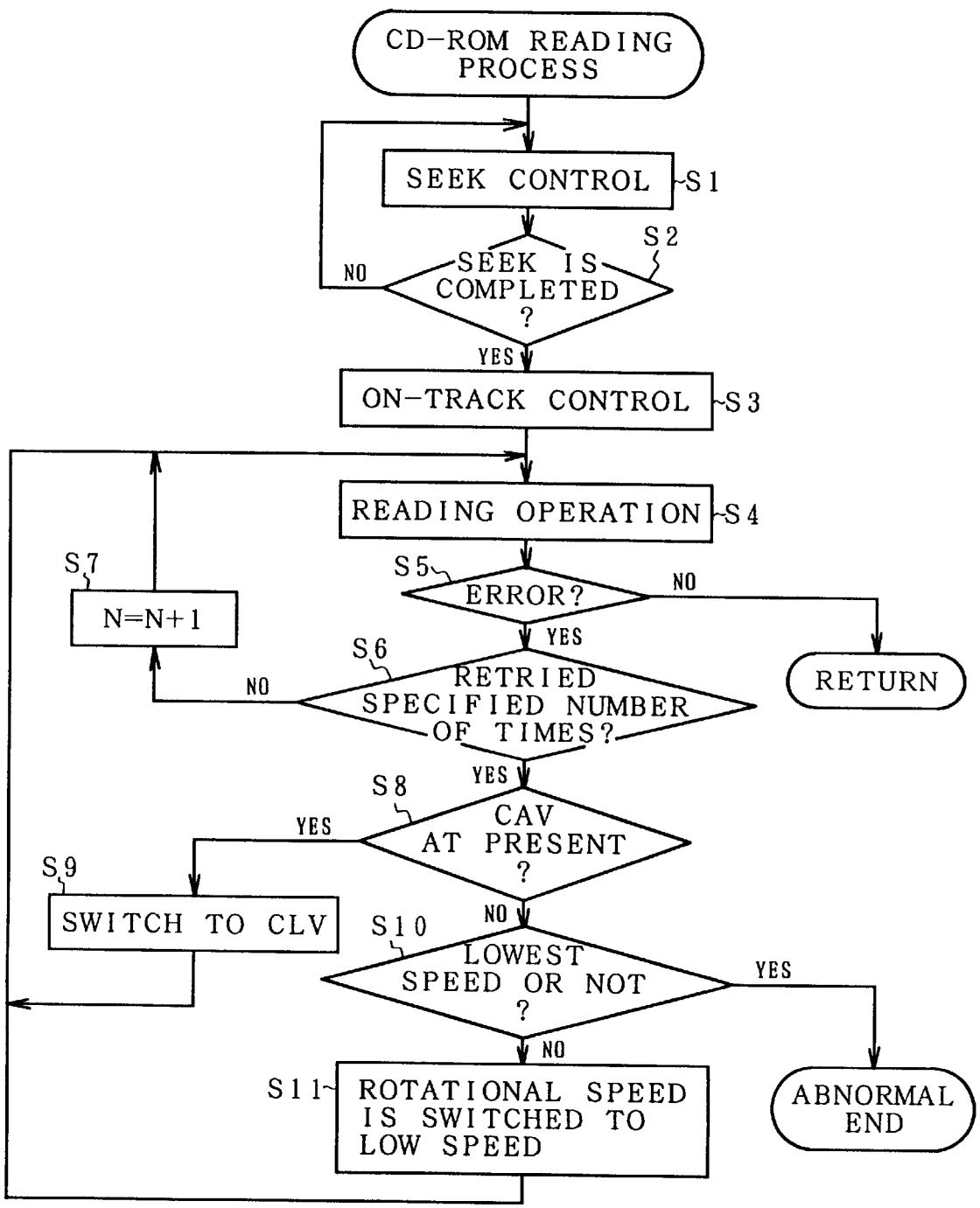
FIG. 43 is a flowchart for an error retrying process for coping with the occurrence of a read error of the CD by switching a spindle rotation to a low speed or by switching from CAV to CLV.

FIG. 43 is a flowchart for a recovery process for a read error when the CD 14 is inserted. In the optical disk drive of the invention, in order to also raise a data transfer speed with respect to the CD 14, for example, in mode 5 in FIG. 36, the high speed spindle control of the speed that is six times as high as the standard speed is executed. However, a process for raising the rotational speed of the CD 14 to the high speed such as a 6-times speed in order to raise the transfer speed becomes a severe condition for the CD 14 which has been standardized on the assumption that the disk is inherently rotated at a low speed for reproduction of music pieces as a prerequisite. Therefore, a proper countermeasure is needed when a data read error occurs. That is, in order to raise the data transfer speed by rotating the CD 14 at a high speed, a frequency of a read clock is raised in correspondence to an increase in rotational speed. However, even if only such a countermeasure is taken, the apparatus cannot cope with a read error due to an eccentricity of the disk or the like. When the CD is rotated at a speed that is a few times as high as the standard speed, in many cases, noises are multiplexed to the signal from the pickup. According to the invention, therefore, the CD 14 is rotated at a high speed such as a 4-times speed and if a read error occurs during the reproduction, the rotational speed of the spindle motor is switched to a low speed and a retry is performed, thereby performing an error recovery. When the rotational speed is switched to a low speed for the read error during the high speed rotation, a tracking ability of the pickup for an eccentricity of the CD is improved, an amount of noises which are mixed is also reduced, and the read signal also becomes stable. Therefore, the data can be read out at the occurring position of the read error and the read error can be recovered by the retry.

Further, in the flowchart of FIG. 43, with respect to the CD 14 of the invention, when mode 4 is designated, the rotational speed is set to the 4-times speed based on the CAV control. Since the CD 14 has inherently been standardized on the assumption that the disk is accessed by the CLV control for music reproduction as a prerequisite. In case of the CAV control by the 4-times speed, such a high speed becomes a severe condition and a read error similarly occurs. When a read error occurs by such a 4-times speed of the CAV control, by switching the control mode to the CLV control as an inherent control of the CD 14 and retrying, the error recovery is performed. In the CD reading process of FIG. 43, first in step S1, the seek control for the track address designated by a command from the host computer is executed. When the completion of the seek control is discriminated in step S2, the processing routine advances to an on-track control in step S3. The reading operation is started in step S4. If an error is discriminated during the reading operation in step S5, a check is made in step S6 to see if the retry has been performed a specified number of times. If NO, a count value of a retry counter (N) is increased by "1" in step S7. After that, the reading operation is repeated in step S4. If the error cannot be recovered even after the retry was performed the specified number of times, step S8 follows and a check is made to see if the control mode is at present the CAV control. If YES, step S9 follows and the control mode is switched to the CLV control. The reading operation is again executed in step S4. When the control mode is switched from the CAV control to the CLV control, since it is the control mode that is inherent to the CD, the read error occurred is recovered and the processing routine is normally finished. In step S8, when the control mode is the CLV control at present instead of the CAV control, a check is made in step S10 to see if the rotational speed is the lowest speed, namely, the standard speed. If NO, the rotational speed is switched to the low speed in step S11. After that, the reading operation is again executed in step S4. By switching the rotational speed to the low speed, a tracking ability of the pickup for the eccentricity of the disk is improved and the read signal is also stabilized, so that the read error is recovered and the processing routine is normally finished. On the other hand, in step S9, if the read error cannot be recovered even by switching from the CAV control to the CLV control, by performing a retry process in which the rotational speed is switched to the low speed with respect to the CLV control in steps S10 and S11, the read error can be certainly recovered. FIG. 43 shows the reading process of the CD 14 as an example. However, with respect to the MO cartridge 12 as well, as shown in FIG. 35, since the standard speed, 2-times speed, and 3-times speed are set, for example, when a read error occurs with respect to the 2-times speed and 3-times speed in modes 2 and 3, it is also possible to recover the error by executing the retry process such that the rotational speed is switched to the low speed side and the reading operation is again performed.

(5) CLV/CAV switching according to track position of CD

Figure 44:
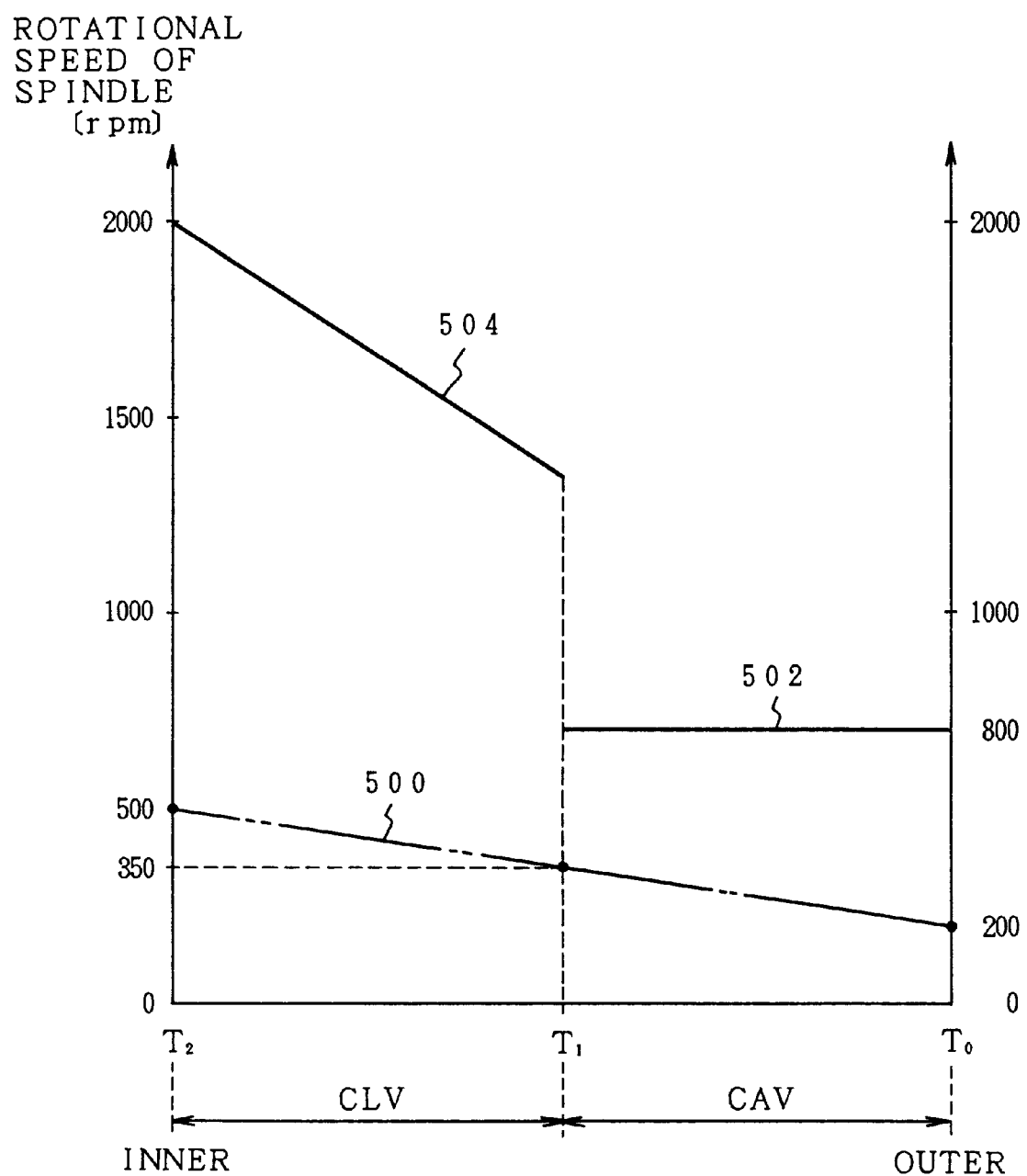
FIG. 44 is an explanatory diagram of switching characteristics of an inner CLV control and an outer CAV control according to the track position of the CD.

FIG. 44 is a characteristics diagram of a speed control switching for performing the CLV control on the inner rim side of the CD and performing the CAV control on the outer rim side with regard to the speed control of the spindle motor when the CD is loaded. As shown in FIG. 36, the optical disk driver of the invention can control the rotational speed in correspondence to the 6-times speed, 4-times speed, and standard speed like modes 5 to 7 with respect to the CD and can cope with the improvement of the data reading speed. In mode 4, the CAV control at the 4-times speed can be executed. In case of operating the CD by the CAV control, how to decide the rotational speed is important.

In FIG. 44, first, characteristics 500 show the standard rotational speed for the track position when the CD is CLV controlled. Since the linear density of the CD in the track direction is constant irrespective of the track position, the rotational speed of the spindle motor is high on the inner side and is low on the outer side. Now, assuming that the standard rotational speed of an outermost track T0 is set to 200 r.p.m., the standard rotational speed of an innermost track T2 is equal to 500 r.p.m. Now, assuming that the signal processing circuit (decoder) 330 for CD which is used for the control unit 300 in FIG. 26 can cope with up to a speed that is four times as high as the speed shown by the characteristics 500 of the standard rotational speed, the 4-times rotational speed of the outermost track T0 is equal to 800 r.p.m. Therefore, in the CAV control of the speed that is four times as high as the normal speed of the CD, it is sufficient to set the rotational speed to 800 r.p.m. However, according to the CD recorded on the basis of the CLV control as a prerequisite, the standard rotational speed for the innermost track T2 according to the characteristics 500 is inherently equal to 500 r.p.m. In case of the CAV control of 800 r.p.m., only the reading speed of 1.6 times (=800 r.p.m./500 r.p.m.) can be obtained in the innermost track T2. In case of such a times speed, the drive cannot be regarded as a high speed drive. As shown in FIG. 44, therefore, the invention is characterized in that the apparatus is operated by the CLV control in a region on the inner rim side where the reading speed is relatively slow in the CAV control. In FIG. 44, an intermediate track T1 between the outermost track T0 and the innermost track T2 is set to a switching point. The rotational speed in the characteristics 500 of the track T1 at the switching point is equal to 350 r.p.m. On the outer side than the switching track T1, the rotational speed 800 r.p.m. of the CAV control is set as shown by characteristics 502. On the inner side than the switching track T1, the CLV control according to characteristics 504 in which the speed is four times as high as that of the standard characteristics 500 is executed. Thus, the CLV control of the 4-times speed according to the characteristics 504 is executed on the inner side than the switching track T1 and the CAV control of 800 r.p.m. of the characteristics 502 is executed on the outer side than the switching track T1. Since the standard rotational speed in the switching track T1 is equal to 350 r.p.m., a reading speed of 2.3 times (=800 r.p.m./350 r.p.m.) or more can be assured in the region on the outer side of the track T1. The switching track T1 can be set to an arbitrary track between the outermost track and the innermost track as necessary. For example, assuming that the track of the standard rotational speed 300 r.p.m. of the characteristics 500 is set to the switching track in this case, a reading speed of 2.6 times (=800 r.p.m./300 r.p.m.) or more can be assured in the region of the outer side than the switching track.

Figure 45:
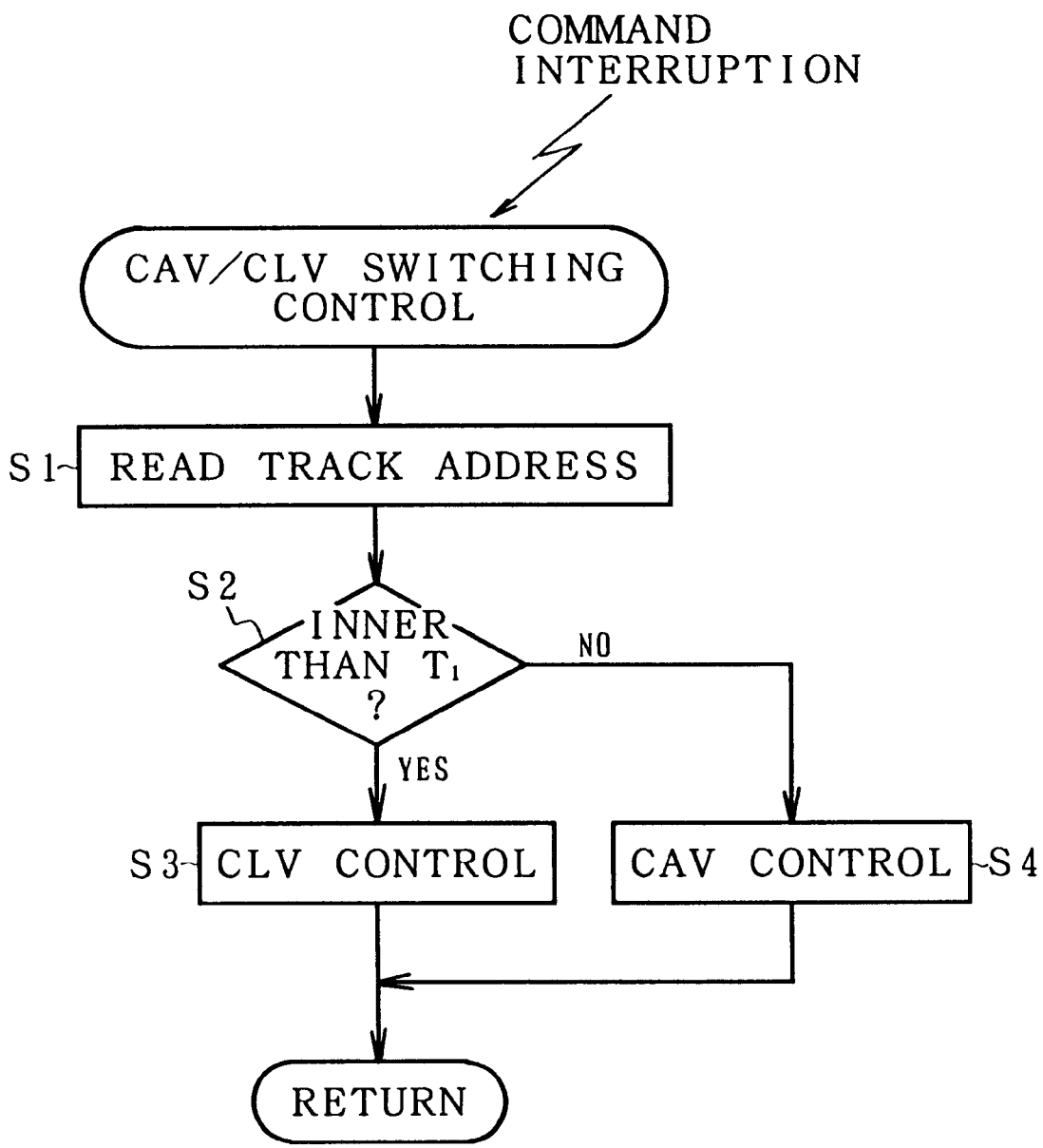
FIG. 45 is a flowchart for a switching control of CAV and CLV in FIG. 44.

FIG. 45 is a flowchart for a switching process between the CLV control and the CAV control according to the track position in FIG. 44. First, when a command interruption is performed by executing the command of the reading or writing request from the host computer, the CAV/CLV switching control is activated. In step S1, a track address given by the command is read. In step S2, a check is made to see if the designated track address is located on the inner side than the address of the switching track T1 in FIG. 44. If YES, step S3 follows and the CLV control of the 4-times speed is performed. When the designated track address is located on the outer side, step S4 follows and the CAV control of, for example, 800 r.p.m. is executed. By such a switching between the CLV control on the inner side of the CD and the CAV control on the outer side, a reduction in reading speed in the region on the inner side in which the linear velocity is slower as compared with that when the CAV control is performed for the whole region can be prevented. With respect to the outer side in which the linear velocity by the CAV control rises, by setting the CAV control, the acceleration and deceleration of the spindle motor according to the track position is unnecessary. There is an advantage such that the electric power consumption can be reduced.

Figure 46:
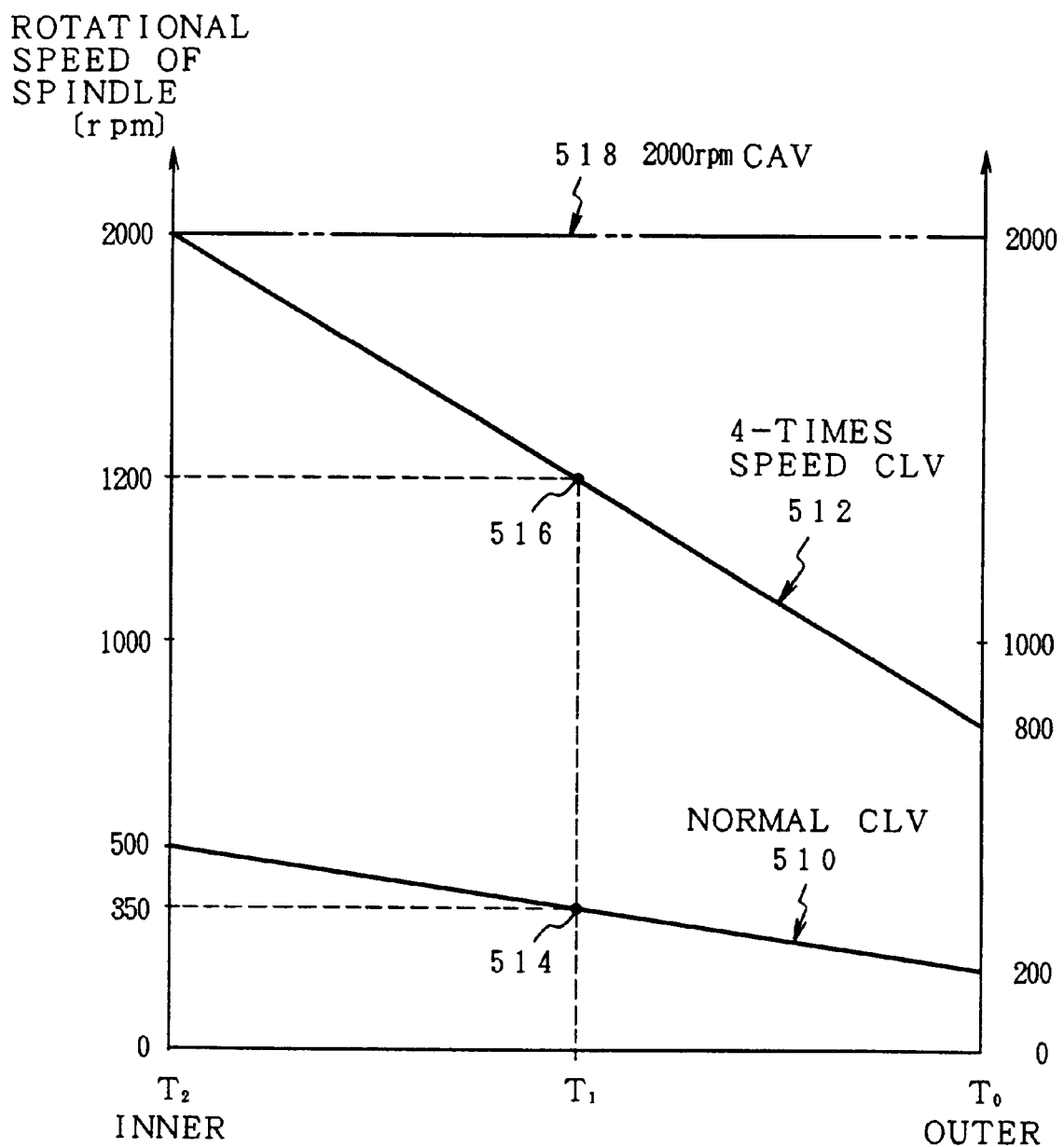
FIG. 46 is a speed characteristics diagram according to track positions at the normal speed and the 4-times speed in the CLV control of the CD.

(6) Switching between CAV on the inner rim side and CLV on the outer rim side of CD FIG. 46 shows a procedure to decide the rotational speed when the CD is loaded and the spindle motor is CAV controlled. First, when the standard speed of the CD is designated, as shown in standard CLV characteristics 510, in order to always obtain a constant linear velocity even at any one of the inner and outer track positions, the spindle rotational speed is set to a high speed on the inner side and as a track position approaches the outer side, the spindle rotational speed is linearly reduced. In case of the standard CLV characteristics 510, the spindle rotational speed is set to 500 r.p.m. at the position of the innermost track T2 and is set to 200 r.p.m. at the outermost track position T0. For such standard CLV characteristics 510, for example, when the 4-times speed is designated, CLV characteristics 512 of the 4-times speed are obtained. In the 4-times speed CLV characteristics 512, the rotational speed in the innermost track T2 increases from the standard speed of 500 r.p.m. to the 4-times speed of 2000 r.p.m. Similarly, the rotational speed in the outermost track T0 increases from the standard speed of 200 r.p.m. to the 4-times speed of 800 r.p.m. To satisfy such 4-times speed CLV characteristics 512, the CD decoder, namely, the signal processing circuit 330 for CD in FIG. 27 has an ability which can cope with the signal frequency that is read in accordance with the spindle rotational speed by the 4-times speed CLV characteristics 512. With regard to the 4-times speed CLV characteristics 512, in order to set the CAV control, it is now assumed that the rotational speed 2000 r.p.m. of the 4-times speed CLV characteristics 512 of the innermost track T2 is set to the constant rotational speed 2000 r.p.m. of the CAV control. That is, it is assumed that CAV characteristics 518 of 2000 r.p.m. shown by an imaginary line are set. At the position of the innermost track T2, since the CAV characteristics 518 of 2000 r.p.m. coincide with 2000 r.p.m. of the 4-times speed CLV characteristics 512, the CD decoder can normally operate for the reading frequency of the read signal obtained by the spindle rotation by 2000 r.p.m. However, according to the CAV characteristics 518 of 2000 r.p.m., since the constant spindle rotational speed 2000 r.p.m. is always maintained in a range from the inner rim to the outer rim, the reading frequency of the CD which was recorded on the basis of the CLV control as a prerequisite corresponds to 2000 r.p.m. even at the position of the outermost track T0. Such a speed is ten times as high as the rotational speed of 200 r.p.m. of the standard CLV characteristics 510. Therefore, the read signal cannot be processed by the CD decoder corresponding to the 4-times speed. According to the invention, therefore, as shown in FIG. 47, the inner side is switched to the CAV control and the outer side is switched to the CLV control.

Figure 47:
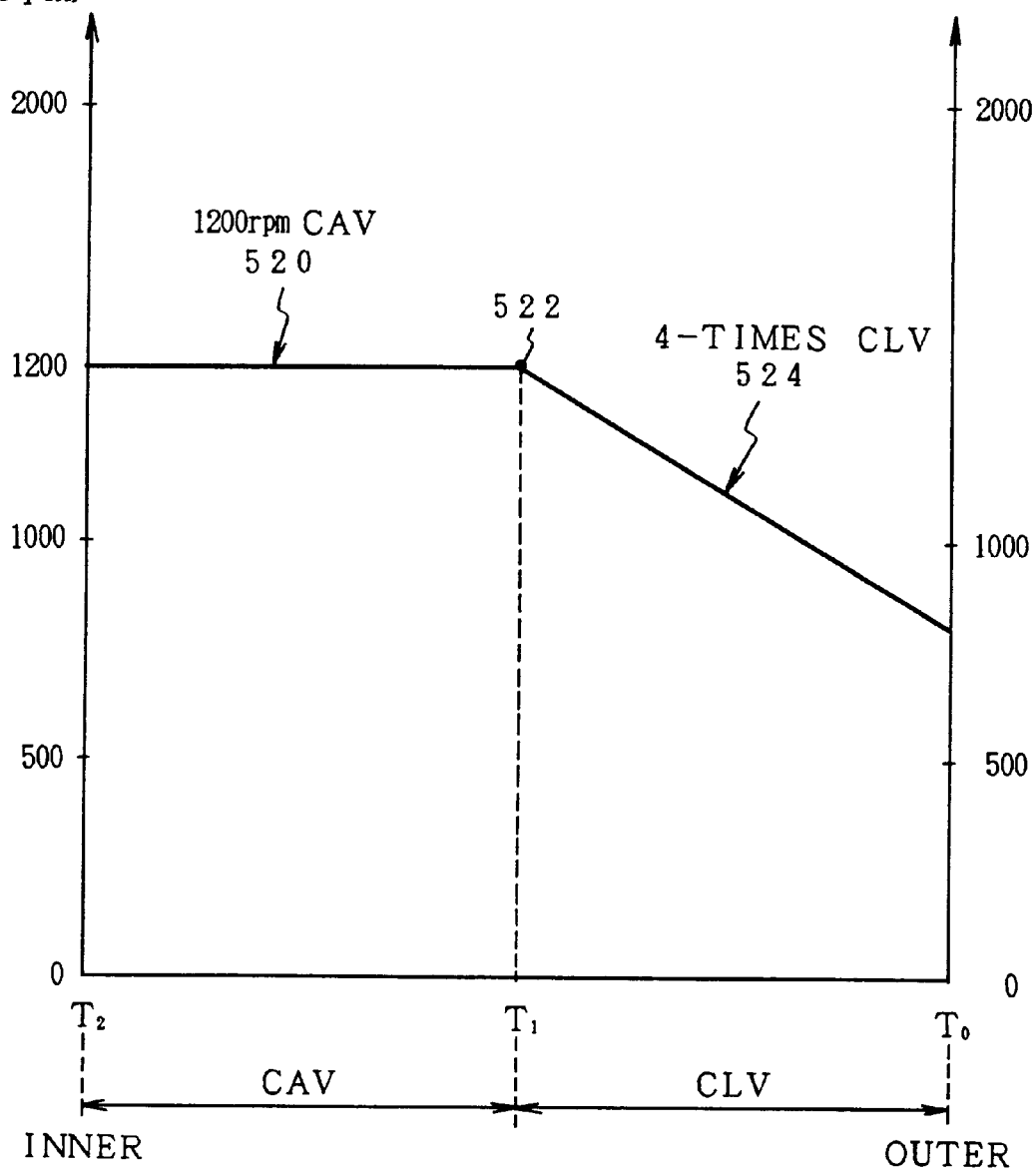
FIG. 47 is an explanatory diagram of switching characteristics of the inner CAV control and the outer CLV control according to the track position of the CD.

FIG. 47 shows characteristics when the inner side corresponding to the 4-times speed CLV characteristics 512 in FIG. 46 is set to the CAV control. A switching point between the CAV control and the CLV control is set to the track T1 at the intermediate position of the CD. In the intermediate track T1, as will be obviously understood from FIG. 46, the speed is set to the spindle rotational speed 350 r.p.m. which is given at a point 514 of the standard CLV characteristics 510. In the 4-times speed CLV characteristics 512, the standard rotational speed 350 r.p.m. of the intermediate track T1 is set to 1200 r.p.m. which is given at a point 516. Therefore, in FIG. 47, the rotational speed in the CAV control on the inner side than the intermediate track T1 is set to the rotational speed 1200 r.p.m. of the intermediate track T1 in the 4-times speed CLV characteristics 512. Thus, the spindle rotational speed in a range from the innermost track T2 to the intermediate track T1 is controlled to the constant rotational speed 1200 r.p.m. as shown in CAV characteristics 520 of 1200 r.p.m. In a range from the intermediate track T1 to the outermost track T0, 4-times speed CLV characteristics 524 are used as they are. Thus, in the CAV control of the spindle motor by the CAV characteristics 520 of 1200 r.p.m. on the inner side, since such a speed lies within a speed range lower than the 4-times speed CLV characteristics 512 between the innermost track T2 and the intermediate track T1 shown in FIG. 46, a frequency of the read signal obtained by the rotation of the spindle motor by the CAV characteristics 520 of 1200 r.p.m. lies within an operating frequency of the CD decoder corresponding to the 4-times speed CLV control and it is possible to properly cope with such a control.

Figure 48:
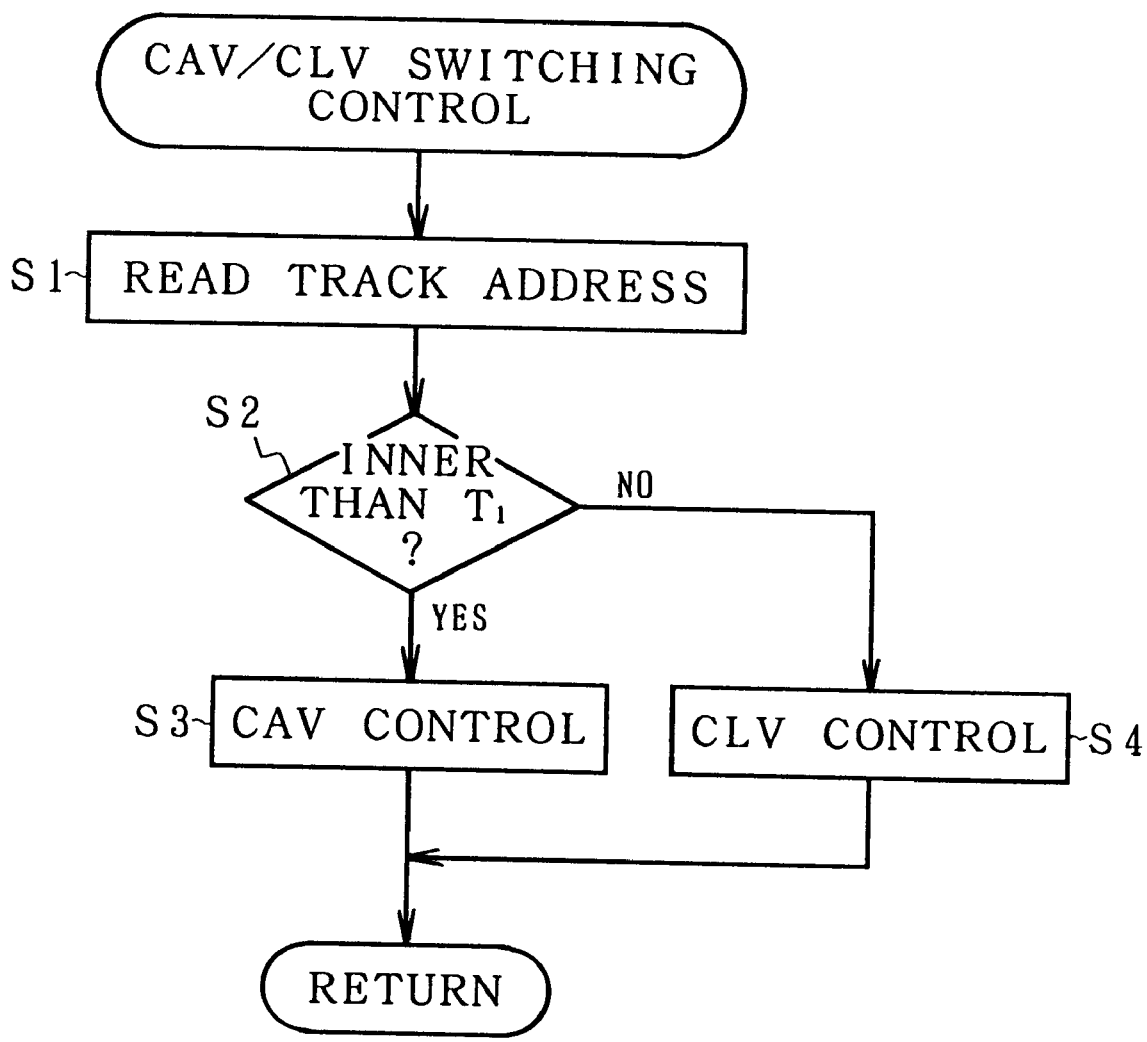
FIG. 48 is a flowchart for a switching control of CAV and CLV in FIG. 47.

FIG. 48 is a flowchart for the switching process between the CAV control and the CLV control according to the track position of FIG. 47. First, when a command interruption based on the read request of the CD from the host computer is performed, the CAV/CLV switching control is activated. In step S1, a track address given by the command is read. In step S2, a check is made to see if the designated track address is located on the inner side than the switching track T1 in FIG. 47. If YES, step S3 follows and the CAV control of, for example, 2000 r.p.m. which is determined by the spindle rotational speed of the CAV control at the switching position is executed. When the track address is located on the outer side, step S4 follows and, for example, the CLV control of the 4-times speed is performed. In this manner, by setting the control mode to the CAV control on the inner side and to the CLV control on the outer side upon reproduction of the CD, when the CAV control is executed in a range up to the outer rim side, a situation such that the frequency of the read signal on the outer rim side increases and exceeds the processing ability of the CD decoder can be certainly prevented. By the CAV control on the inner rim side, the acceleration and deceleration of the spindle motor according to the track position, namely, the pickup position are unnecessary. There is an advantage such that the electric current consumption can be reduced. Particularly, in the CD-ROM which is commercially available at present, the number of disks in which data has been written to a region exceeding the intermediate position is actually not so large. Therefore, the reproducing operation of most of the CD-ROMS is executed by the CAV control on the inner side.

Although the switching between the CAV control and the CLV control of the CD mentioned above has been described with respect to the CAV control corresponding to the 4-times speed of the CLV control as an example, a switching control can be similarly executed with respect to an arbitrary-times speed of CD as necessary. Although the invention has been described with respect to the case where the switching position was set to the intermediate track as an example, the position of the switching track can be also properly determined as necessary.

In the optical disk apparatus of the invention as mentioned above, the MO cartridge as a cartridge enclosing medium is inserted as it is, the CD as an exposed medium is mounted on the CD carrier and the CD carrier is inserted, the turntable for CD having the same structure as that of the coupling hub of the MO cartridge with respect to the coupling with the spindle side is enclosed in the CD carrier, and the CD is set onto the turntable and is loaded. Therefore, the disk drive mounted on the CD carrier can be easily and certainly loaded to the hub on the spindle motor side adapted to the standardized MO cartridge.

Thus, a common structure for the same driving mechanism of the MO cartridge and the CD can be accomplished. Quite a unique peripheral apparatus with an extremely high generality such that when the CD is inserted, it operates as a CD player and when the MO cartridge is inserted, it operates as an MO drive can be realized. Further, by individually providing the CD carrier and the CD turntable, the apparatus can be used for insertion and ejection of the non-hub medium to/from the disk apparatus.

What is claimed is:

1. An optical disk apparatus comprising:

a common processing mechanism for commonly performing processing on both a cartridge enclosed medium and an exposed medium which is not enclosed in a cartridge, and said common processing mechanism including a recording and/or reproducing mechanism having a spindle motor with a rotary shaft, wherein the cartridge enclosed medium is a medium with a hub for being attached to said spindle motor, the exposed medium is a non-hub medium; and a carrier detachable from an apparatus main body for mounting said non-hub exposed medium and inserting and ejecting said non-hub exposed medium into/from said common processing mechanism, said carrier having an upward facing opening, said carrier including a holder for enclosing and protecting said non-hub exposed medium and a turntable enclosed in said holder, said turntable including:

a holding table having an upper portion and a lower portion, said non-hub exposed medium being mounted on said holding table;

a first hub, provided on said upper portion of said holding table, for fitting into a hole of said non-hub exposed medium; and a second hub which is provided on said lower portion of said holding table and is detachably attached to a medium rotation driving unit of said spindle motor.

2. An apparatus according to claim 1, wherein:

the exposed medium is a compact disc, and when said compact disc is mounted to said carrier and is loaded, said common processing mechanism operates as a CD player; and the cartridge enclosed medium is an optical disk cartridge, and when the optical disk cartridge is loaded, said common processing mechanism operates as an optical disk drive.

3. An apparatus according to claim 2, wherein said holder further covers a portion of the compact disc and protects the compact disc; and wherein said turntable further is rotatably attached to said holder and is completely detachable from said optical disk apparatus.

4. An apparatus according to claim 3, wherein said holding table is a support disk so that said turntable further includes:

said support disk to support the compact disc and having a first surface defining said upper portion of said holding table and a second opposing surface defining said lower portion of said holding table;

said first hub attaching the compact disc to an upper portion of said support disk to mount the compact disc; and said second hub attaching a lower portion of said support disk to the spindle motor of said recording and reproducing mechanism.

5. An apparatus according to claim 4, wherein said first hub of said turntable further includes:

a shaft portion adapted to fit an attaching hole of said compact disc;

a plurality of latch balls at least partially buried at a plurality of positions around said shaft portion, said plurality of latch balls being configured and arranged to appear and disappear by being spring-biased; and wherein when the compact disc is attached to said first hub, the compact disc is sandwiched and fixed between said latch balls and said support disk.

6. An apparatus according to claim 4, wherein the support disk of said turntable has nonslip structure on a mounting surface for the compact disc.

7. An apparatus according to claim 4, wherein said second hub of said turntable further defines a rotary attachment hole for attaching to said rotary shaft of said spindle motor, and further includes a magnetic hub member adapted to be attracted to a magnetic hub on a spindle motor side of said turntable, said magnetic hub member being provided around said rotary attachment hole.

8. An apparatus according to claim 7, wherein said second hub of said turntable has the same structure and dimensions as those of the hub of the optical disk medium enclosed in said optical disk cartridge.

9. An apparatus according to claim 7, wherein said optical disk cartridge is an optical disk cartridge based on the ISO, and said second hub of said turntable has a structure and dimensions according to a hub of said ISO.

10. An apparatus according to claim 3, wherein said holder includes:

an opening window for exposing a disk seeking region to a lower portion in a state in which the compact disc is attached;

a positioning hole provided in correspondence to a positioning hole of said optical disk cartridge;

a detecting hole indicative of medium information of a medium mounted on said carrier; and a turntable enclosing unit for rotatably enclosing said turntable so as to be vertically exposed.

11. An apparatus according to claim 10, wherein in said holder, a guide spring portion which elastically come into sliding contact with a guide surface and executes a holding of a posture and a positioning when the compact disc is inserted and ejected to/from said recording and reproducing mechanism is further arranged so as to be projected.

12. An apparatus according to claim 10, wherein said holder further has a reverse insertion preventing member for blocking reverse insertion of said carrier.

13. An apparatus according to claim 1, wherein said optical disk cartridge is a magneto-optical disk cartridge of 3.5 inches based on the ISO.

14. An apparatus according to claim 2, wherein the compact disc is a compact disc of 120 mm for a read only memory or a compact disc of 120 mm for digital audio.

15. An apparatus according to claim 2, wherein the compact disc is a compact disc of 80 mm for digital audio.

16. An apparatus according to claim 2, wherein the compact disc is a digital versatile disc.

17. A medium carrier for mounting a disk medium without a hub and for inserting and ejecting the disk medium, in place of a cartridge, to/from an optical disk apparatus having a spindle motor with a rotary shaft, said medium carrier being detachable from the optical disk apparatus, wherein said medium carrier comprises:

a holder for covering portions of said disk medium and protecting the disk medium; and a turntable which is enclosed in said holder, including:

a holding table having an upper portion and a lower portion, said disk medium being mounted on said holding table, a first hub, provided on said upper portion of said holding table, for fitting into a hole of said disk medium, and a second hub which is provided on said lower portion of said holding table and is detachably attached to a medium rotation driving unit of said spindle motor.

18. A medium carrier according to claim 17, wherein said holding table is a support disk, said support disk defining said upper portion and said lower portion of the turntable so that said first hub attaches the disk medium to said upper portion of said support disk to mount the disk medium, and said second hub attaches said lower portion of said support disk to the spindle motor of said optical disk apparatus.

19. A medium carrier according to claim 18, wherein said first hub of said turntable includes:

a shaft portion adapted to fit an attachment hole of the disk medium;

a plurality of latch balls at least partially buried at a plurality of positions around said shaft portion, said plurality of latch balls being configured and arranged to as to appear and disappear by being spring biased; and wherein when the disk medium is attached to said first hub, the disk medium is sandwiched and fixed between said latch balls and said support disk.

20. A medium carrier according to claim 18, wherein said support disk of said turntable has a nonslip structure on a mounting surface for the disk medium.

21. A medium carrier according to claim 18, wherein said second hub of said turntable further defines a rotary attachment hole to attach to said rotary shaft, and further includes a magnetic hub member adapted to be attracted to a magnetic hub on the spindle motor side, said magnetic hub member being provided around said rotary attachment hole of said second hub.

22. A medium carrier according to claim 21, wherein the optical disk apparatus includes a common processing mechanism for commonly performing data processing of both a cartridge enclosed medium and an exposed medium which is not enclosed in a cartridge, and wherein said second hub of said turntable has the same structure and dimensions as those of a motor hub of a disk medium enclosed in said cartridge.

23. A medium carrier according to claim 22, wherein the cartridge enclosed medium is an optical disk cartridge based on the ISO, and said second hub of said turntable has a structure and dimensions according to a hub of said ISO.

24. A medium carrier according to claim 22, wherein said holder includes:

an opening window for exposing a disk seeking region to a lower portion in a state in which the disk medium is attached;

a positioning hole provided in correspondence to a positioning hole of said optical disk cartridge;

a detecting hole indicative of medium information of a medium mounted on said carrier; and a turntable enclosing unit for rotatably enclosing said turntable so as to be vertically exposed.

25. A medium carrier according to claim 24, wherein in said holder, a guide spring portion which elastically come into sliding contact with a guide surface of an upper portion and executes a holding of a posture and a positioning when the compact disc is inserted and ejected to/from said optical disk apparatus is further arranged so as to be projected.

26. A medium carrier according to claim 24, wherein said holder has a reverse insertion preventing member for blocking reverse insertion of the carrier.

27. A medium turntable which is detachably provided for an optical disk apparatus having a medium rotation driving unit with a rotary shaft and on which a disk medium is attached and which inserts and ejects the disk medium to/from the medium rotation driving unit of the optical disk apparatus, said disk medium being a medium without a hub, said medium turntable comprising:

a holding table on which a disk medium is mounted;

a first hub, provided on an upper portion of said holding table, for fitting into a hole of said disk medium; and a second hub which is provided on a lower portion of said holding table and is detachably attached to said medium rotation driving unit of a motor.

28. A medium turntable according to claim 27, wherein said first hub includes:

a shaft portion adapted to fit an attachment hole of the disk medium;

a plurality of latch balls buried at a plurality of positions around said shaft portion, said plurality of latch balls being configured and arranged to appear and disappear by being spring-biased; and wherein when the disk medium is attached to said first hub, the compact disk medium is sandwiched and fixed between said latch balls and said holding table.

29. A medium turntable according to claim 27, wherein said second hub has a rotary attachment hole to attach to a rotary shaft of said rotation driving unit of said optical disk apparatus, and a magnetic hub member adapted to be attracted to a magnetic hub on said lower portion is provided around said rotary attachment hole.

30. A medium turntable according to claim 29, wherein the support disk of said turntable has a nonslip structure on a mounting surface for the disk medium.

31. A medium turntable according to claim 27, wherein said optical disk apparatus includes:

a common processing mechanism for commonly performing processing on both a cartridge enclosed medium and an exposed medium which is not enclosed in a cartridge; and wherein said second hub of said turntable has the same structure and dimensions as those of a hub of said cartridge enclosed medium.

32. A medium turntable according to claim 31, wherein said cartridge enclosed medium is an optical disk cartridge based in the ISO, and said second hub has structure and dimensions based in the ISO.

33. A medium carrier according to claim 17 detachably provided for an optical disk apparatus and having a disk medium mounted on the medium carrier for inserting and ejecting the disk medium to/from the optical disk apparatus, said medium carrier comprising:

a holder for enclosing and protecting said disk medium;

a turntable enclosed in said holder and having an upper portion and a lower portion, said disk medium being attached on said upper portion and said lower portion being detachably attached to a medium rotation driving unit of said optical disk apparatus; and a plurality of guide springs arranged in both right and left sides of said holder, each said guide spring having two ends, a center and a buckled shape such that said center of each said guide spring is projected from a carrier surface.

34. A carrier according to claim 33, wherein each said guide spring further includes a plate bent to form two inclined portions converging at said center to form an upward pointing peak, and wherein said holder further defines a rectangular groove configured and disposed so that both said ends of each said spring are enclosed and fixed in said groove.

35. A carrier according to claim 33, wherein said holder further has a positioning hole for detecting a position of said carrier in which a center of the turntable can be attached to a spindle motor of the drive.

36. A medium carrier detachably provided for an optical disk apparatus and having a disk medium mounted on the medium carrier for inserting and ejecting the disk medium to/from the optical disk apparatus, said medium carrier comprising:

a holder for enclosing and protecting said disk medium;

a turntable enclosed in said holder and having an upper portion and a lower portion, said disk medium being attached on said upper portion and said lower portion being attached to a medium rotation driving unit of said optical disk apparatus; and a reverse insertion preventing member, provided on a corner portion on the ejection side of said holder, for blocking the insertion of said carrier into said optical disk apparatus when a front and a rear side of the carrier are reversed relative to the position of said front and rear sides when said carrier is properly positioned for insertion into said optical disk apparatus.

37. A carrier according to claim 36, wherein the optical disk apparatus further includes a loading roller, and wherein said holder further includes a guide taper configured and disposed at one corner on an insertion side of said holder so that said guide taper enables loading by pushing said loading roller to the outside of a path for insertion of said carrier when the medium is properly inserted and disables loading when a left side and a right side of said carrier are reversed relative to a proper position of said left side and said right side for insertion of said carrier.

* * * * *

UNITED STATES PATENT AND TRADEMARK OFFICE
CERTIFICATE OF CORRECTION

PATENT NO. : 6,064,640  
DATED : May 16, 2000  
INVENTOR(S) : Shinoda et al.

It is certified that error appears in the above-indentified patent and that said Letters Patent is hereby corrected as shown below:

On the Title page:

Under "[56] References Cited, Foreign Patent Documents" please delete "0366118  5/1989" and insert --0366118  5/1990-- therefor Under "[56] References Cited, Foreign Patent Documents" please delete "0623441  1/1995" and insert --0632441  1/1995-- therefor

UNITED STATES PATENT AND TRADEMARK OFFICE
CERTIFICATE OF CORRECTION

PATENT NO. : 6,064,640
DATED : May 16, 2000
INVENTOR(S) : Shinoda et al.

It is certified that error appears in the above-identified patent and that said Letters Patent is hereby corrected as shown below:

In the Claims:

In claim 11 (originally filed as claim 12), line 2, delete "come" and insert --comes-- therefor In claim 25 (originally filed as claim 26), line 2, please delete "come" and insert --comes-- therefor In claim 26 (originally filed as claim 27), line 2, after "holder" insert --further--

In claim 36, line 1, after "carrier" insert --according to claim 17--

Signed and Sealed this

Tenth Day of April, 2001

Attest:

NICHOLAS P. GODICI

*Attesting Officer*   *Acting Director of the United States Patent and Trademark Office*